(12) United States Patent
Conrad et al.

(10) Patent No.: US 11,499,272 B2
(45) Date of Patent: Nov. 15, 2022

(54) PATIO BLOCKS WITH EDGE BLOCKS

(71) Applicant: Omachron Intellectual Property Inc., Hampton (CA)

(72) Inventors: Wayne Ernest Conrad, Hampton (CA); Nina Conrad, Hampton (CA); Dave Petersen, Bowmanville (CA)

(73) Assignee: Omachron Intellectual Property Inc., Hampton (CA)

( * ) Notice: Subject to any disclaimer, the term of this patent is extended or adjusted under 35 U.S.C. 154(b) by 133 days.

(21) Appl. No.: 16/987,761

(22) Filed: Aug. 7, 2020

(65) Prior Publication Data

US 2021/0047786 A1 Feb. 18, 2021

Related U.S. Application Data

(63) Continuation-in-part of application No. 16/726,061, filed on Dec. 23, 2019, now abandoned, which is a continuation-in-part of application No. 16/540,560, filed on Aug. 14, 2019, now Pat. No. 11,332,892.

(51) Int. Cl.
*E01C 5/00* (2006.01)

(52) U.S. Cl.
CPC ............ *E01C 5/00* (2013.01); *E01C 2201/06* (2013.01); *E01C 2201/12* (2013.01)

(58) Field of Classification Search
None
See application file for complete search history.

(56) References Cited

U.S. PATENT DOCUMENTS

| | | | |
|---|---|---|---|
| 2,918,151 A | 12/1959 | Kennedy | |
| 4,167,599 A | 9/1979 | Nissinen | |
| 4,921,741 A * | 5/1990 | Mullen | E01C 13/045 428/188 |
| 4,963,054 A | 10/1990 | Hayashi | |
| 5,234,738 A * | 8/1993 | Wolf | E01C 13/045 428/44 |
| 5,323,575 A | 6/1994 | Yeh | |
| 5,443,545 A | 8/1995 | Weber | |
| 5,487,526 A | 1/1996 | Hupp | |
| 5,527,128 A | 6/1996 | Rope et al. | |
| 5,594,961 A | 1/1997 | Yokoi et al. | |
| 5,713,175 A * | 2/1998 | Mitchell | E04F 15/10 52/584.1 |
| 5,833,386 A | 11/1998 | Rosan et al. | |
| 6,221,445 B1 | 4/2001 | Jones | |
| 7,114,298 B2 | 10/2006 | Kotler | |
| 7,344,334 B2 | 3/2008 | Thorkelson | |
| 7,637,688 B2 | 12/2009 | Riccobene | |
| 7,950,191 B2 * | 5/2011 | Brouwers | E01C 9/004 52/180 |
| 7,955,025 B2 | 6/2011 | Murphy et al. | |
| 8,070,382 B2 * | 12/2011 | Prinz | E01C 13/045 404/35 |
| 8,282,311 B2 | 10/2012 | Chow | |
| 8,336,146 B1 * | 12/2012 | Berbash | E01C 5/00 404/34 |
| 8,807,865 B1 | 8/2014 | Modrono | |
| 9,010,060 B2 | 4/2015 | Rapaz | |
| 9,512,623 B1 * | 12/2016 | Prinz | E01C 13/045 |

(Continued)

*Primary Examiner* — Abigail A Risic
(74) *Attorney, Agent, or Firm* — Philip C. Mendes da Costa; Bereskin & Parr LLP/S.E.N.C.R.L., s.r.l.

(57) ABSTRACT

A kit including a plurality of interior paving blocks and a plurality of edge paving blocks.

18 Claims, 71 Drawing Sheets

(56) References Cited

U.S. PATENT DOCUMENTS

| | | |
|---|---|---|
| 9,528,277 B2 | 12/2016 | Prati |
| 9,670,624 B1 | 6/2017 | Stiles |
| 10,036,559 B2 | 7/2018 | Szekely |
| 10,066,343 B2 | 9/2018 | Gasparovic et al. |
| 10,094,073 B2 | 10/2018 | Barth et al. |
| 10,697,130 B2 * | 6/2020 | Jones .................... E01C 11/222 |
| 2003/0136070 A1 | 7/2003 | Ku |
| 2005/0066607 A1 * | 3/2005 | Hagenah ................... E01C 5/06 |
| | | 52/596 |
| 2008/0010936 A1 * | 1/2008 | Vaughan ............... E04F 15/105 |
| | | 52/588.1 |
| 2017/0167084 A1 | 6/2017 | Sawyer et al. |
| 2018/0371705 A1 | 12/2018 | Macdonald et al. |
| 2020/0385935 A1 * | 12/2020 | Szönyi .............. E04F 15/02005 |

\* cited by examiner

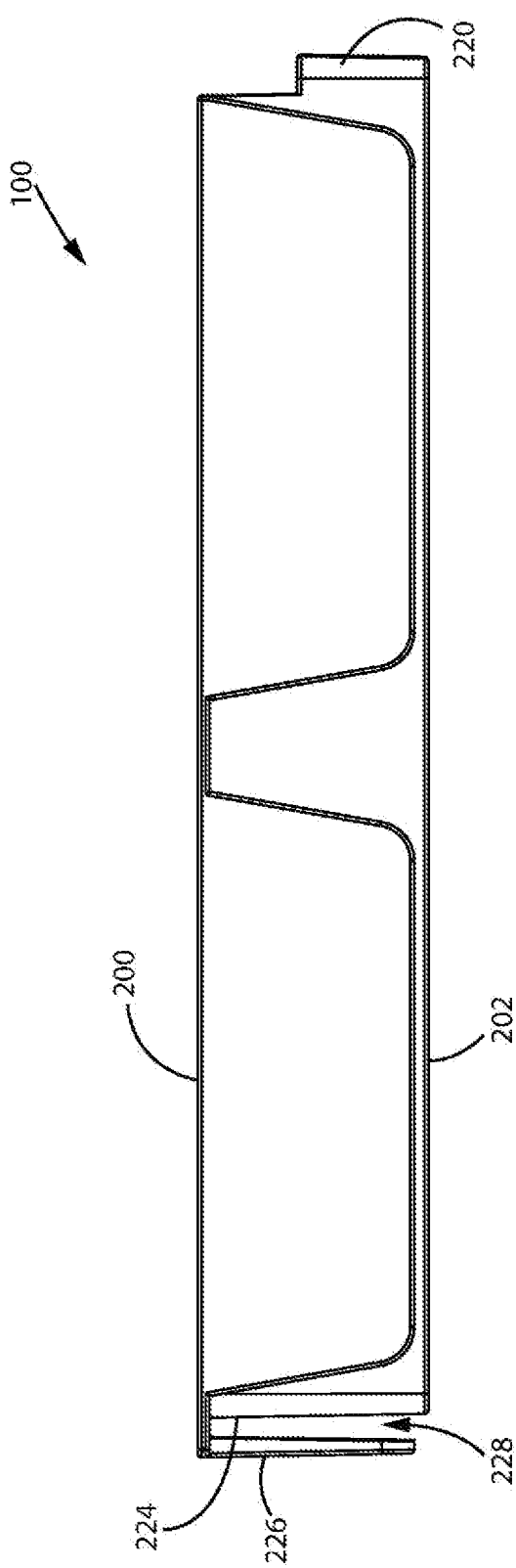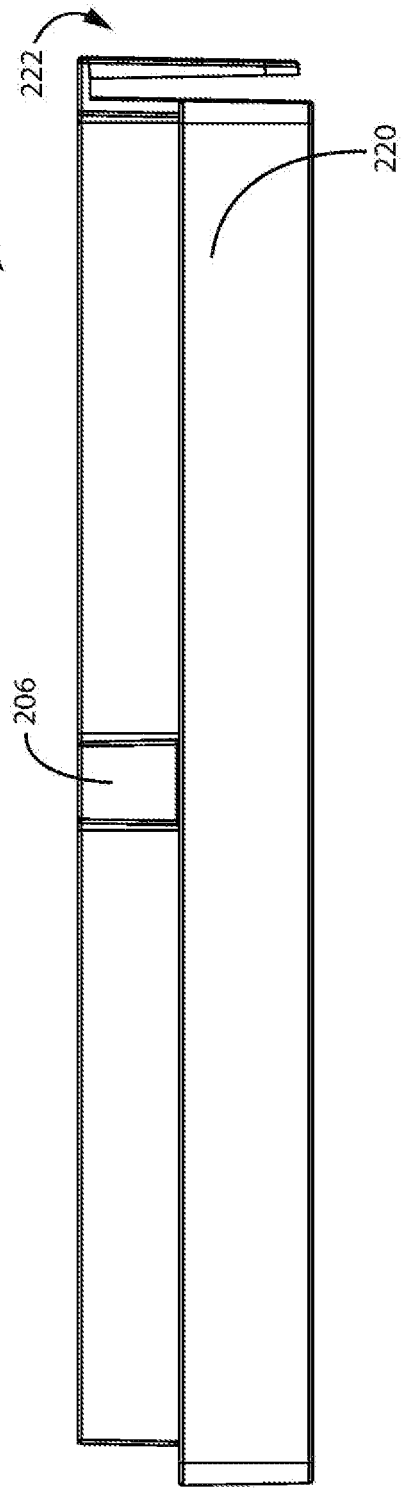
FIG. 24A
FIG. 24B

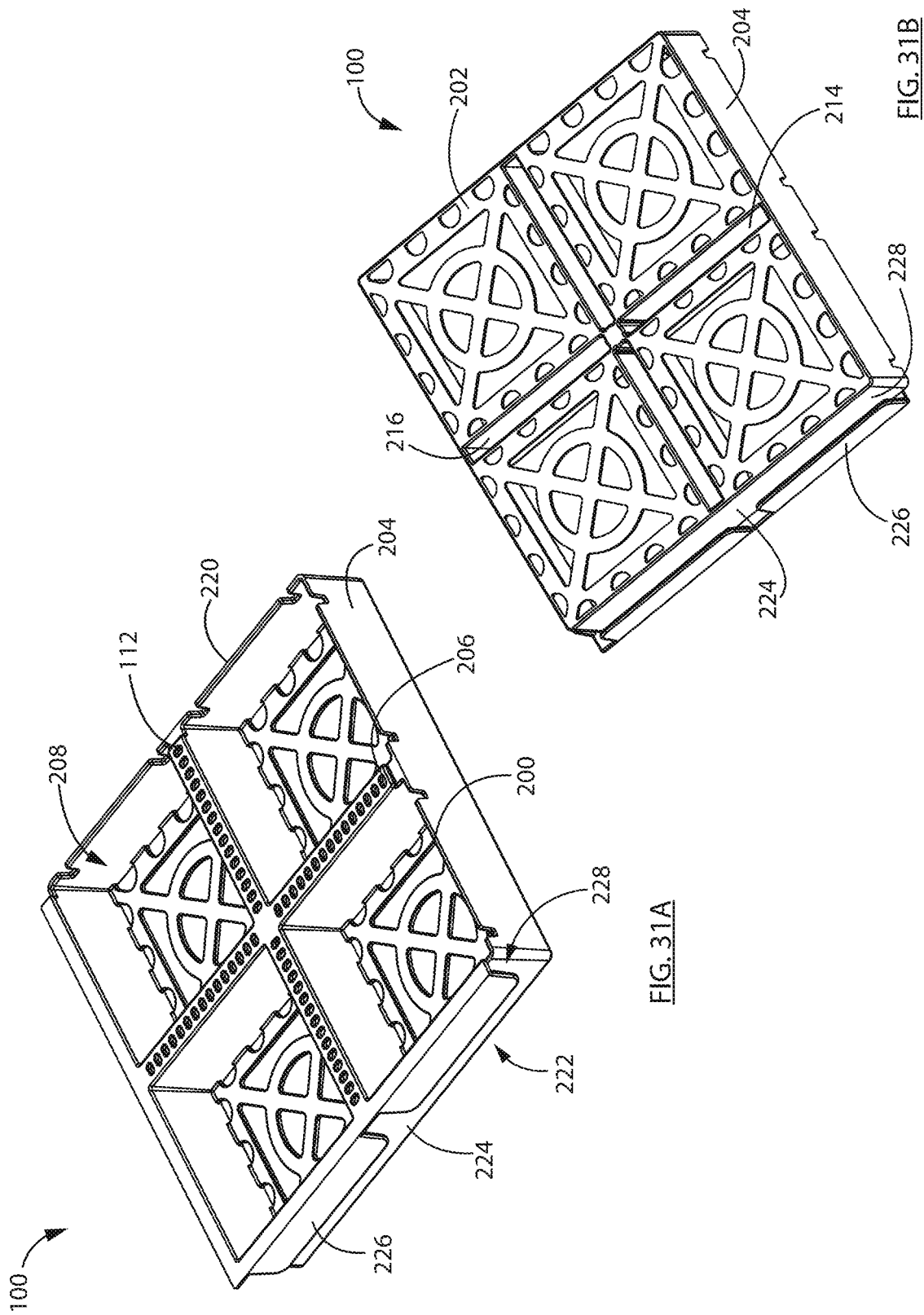

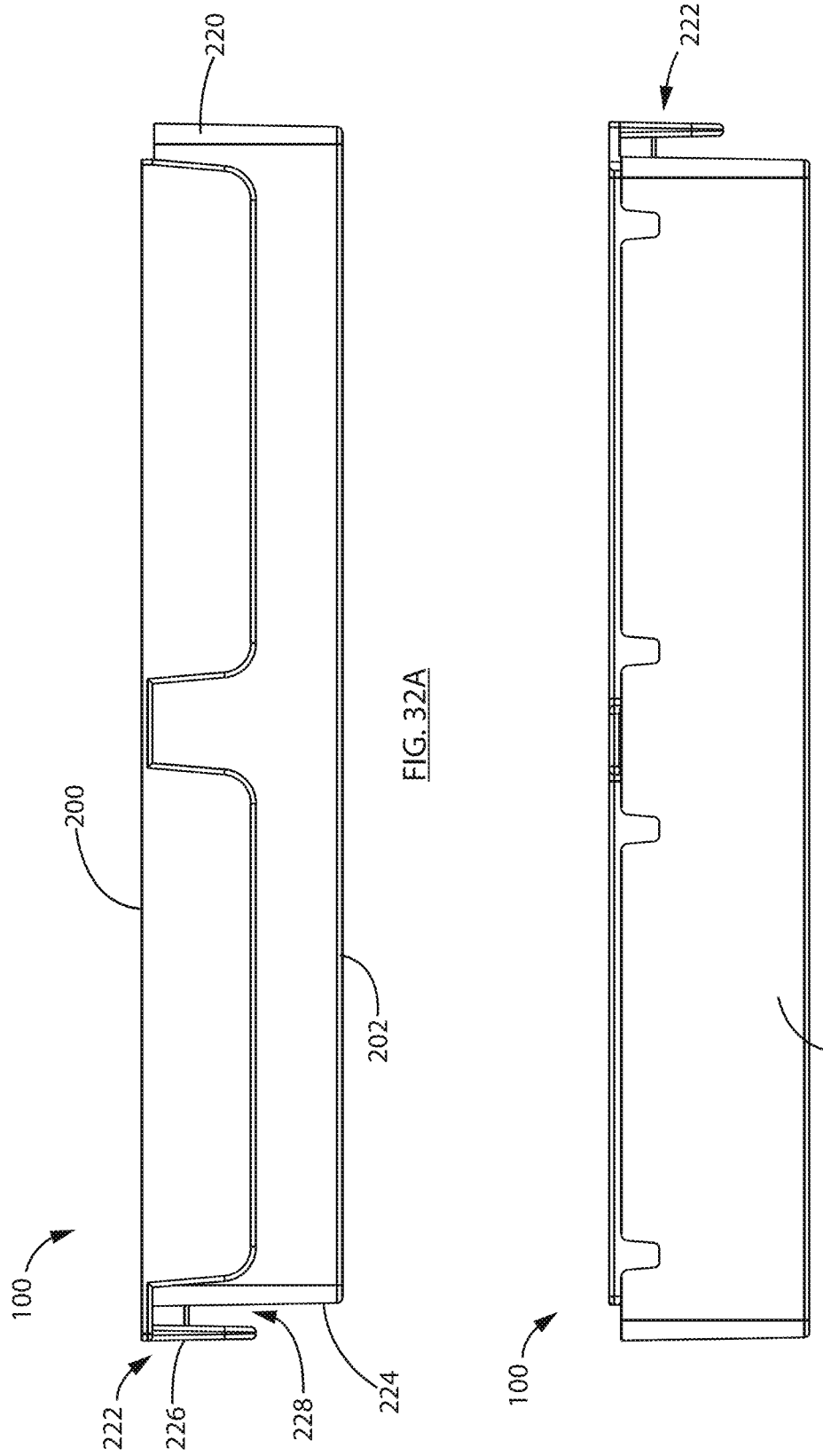

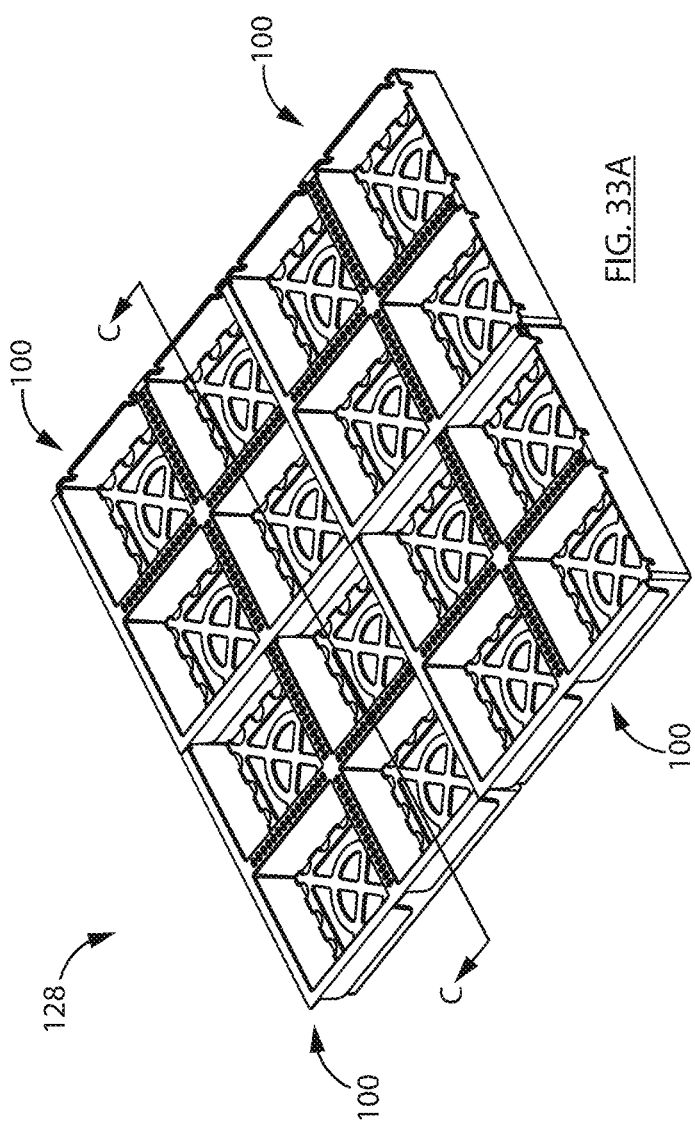
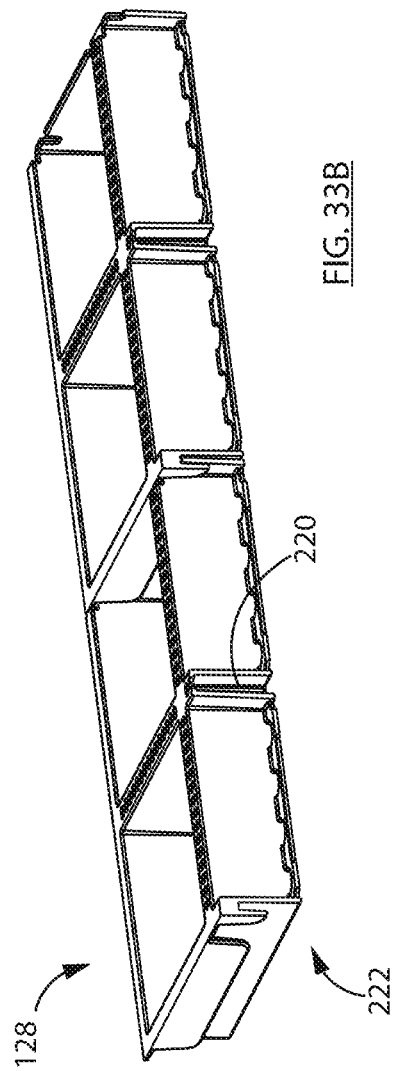

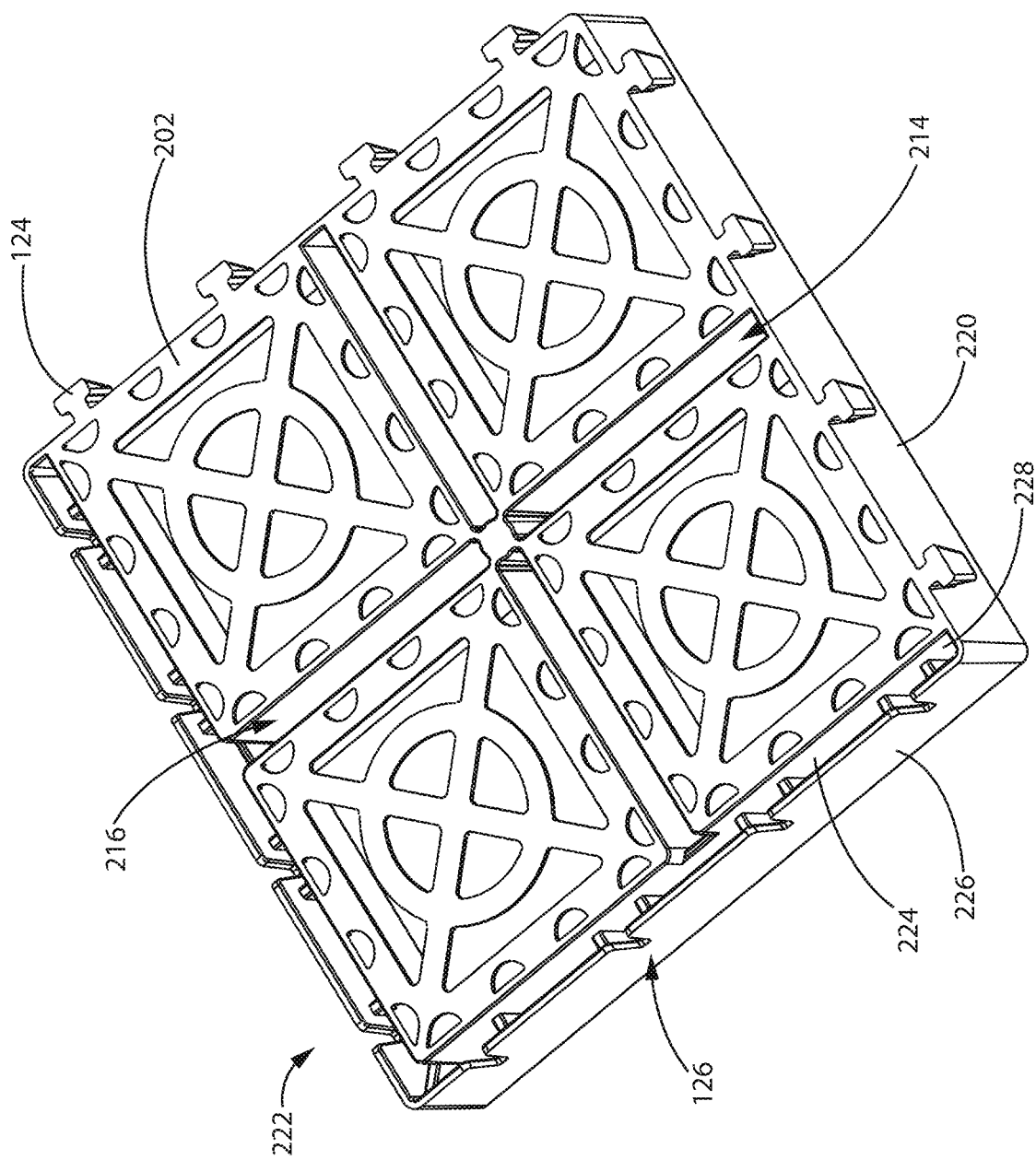

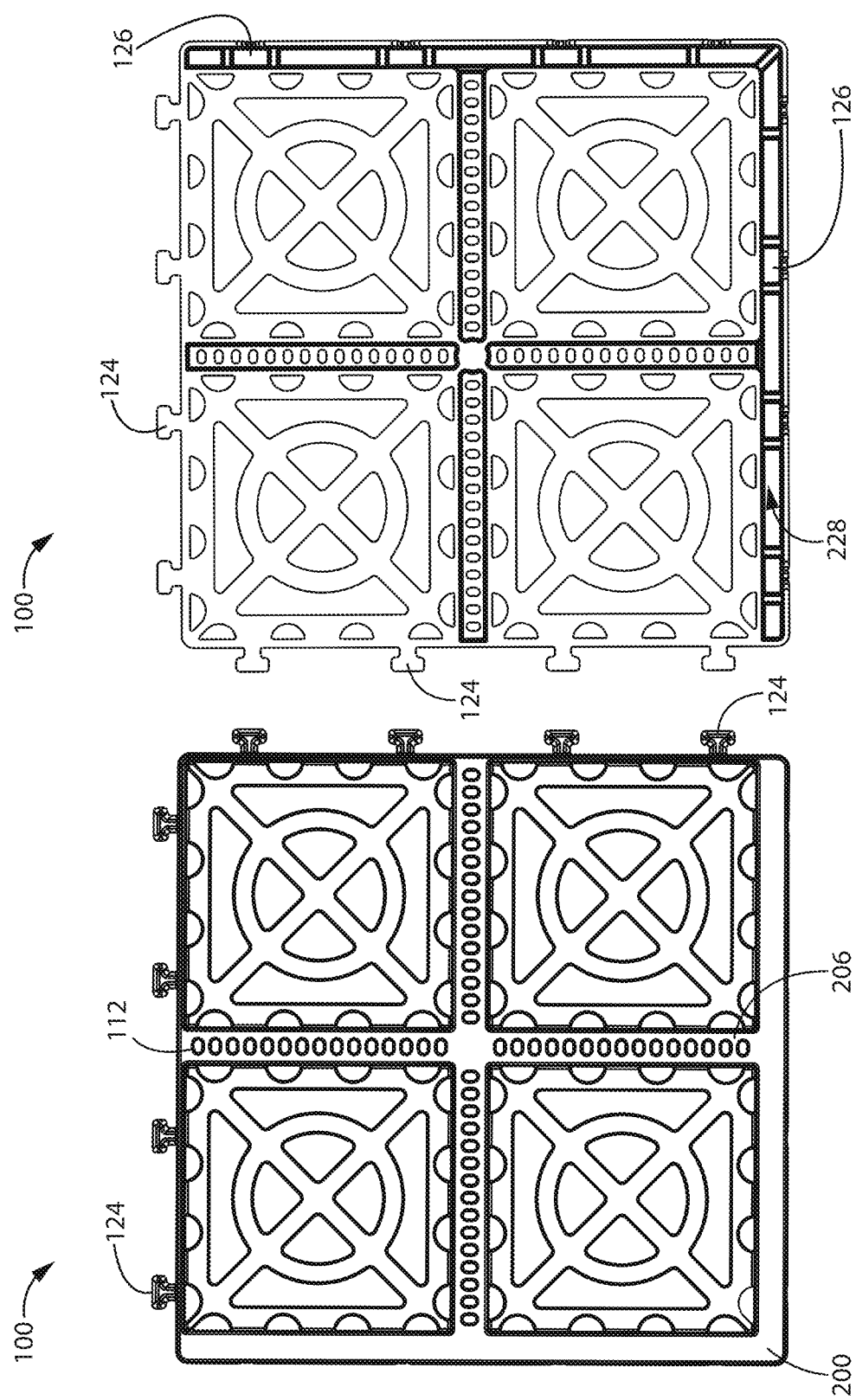

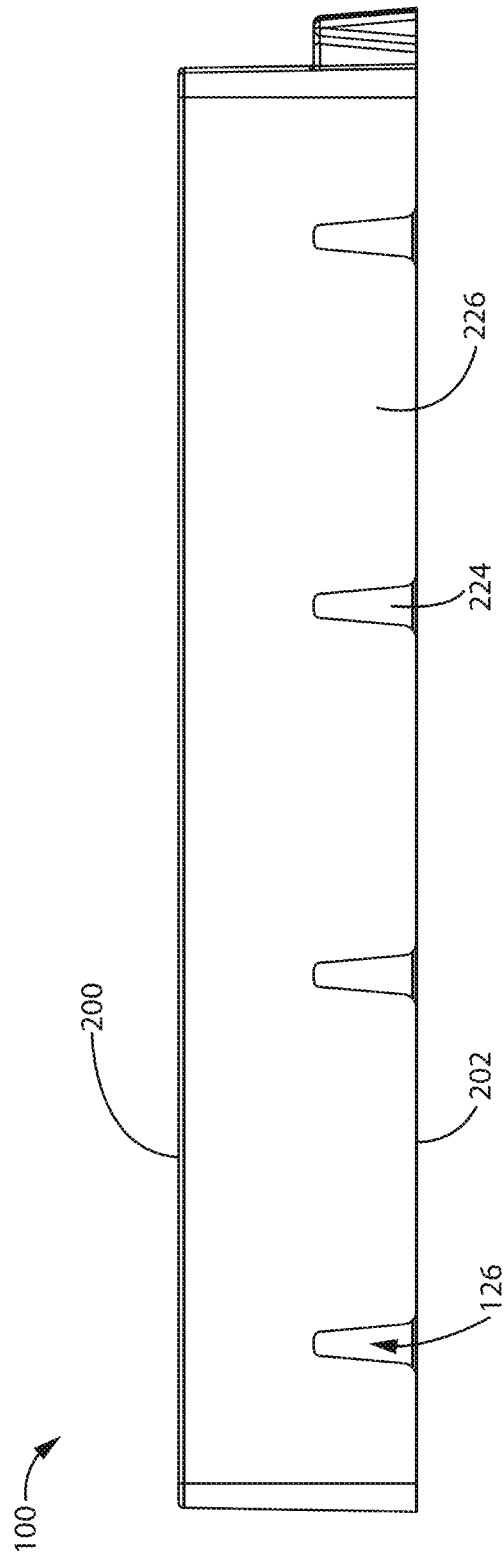
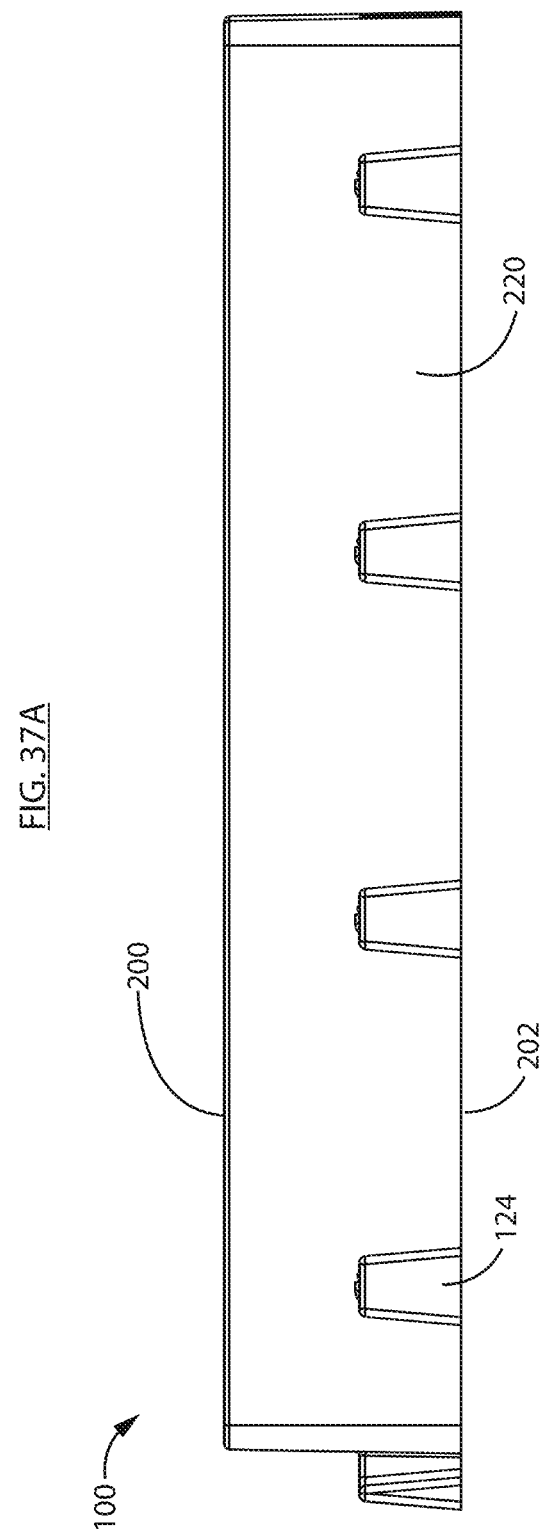

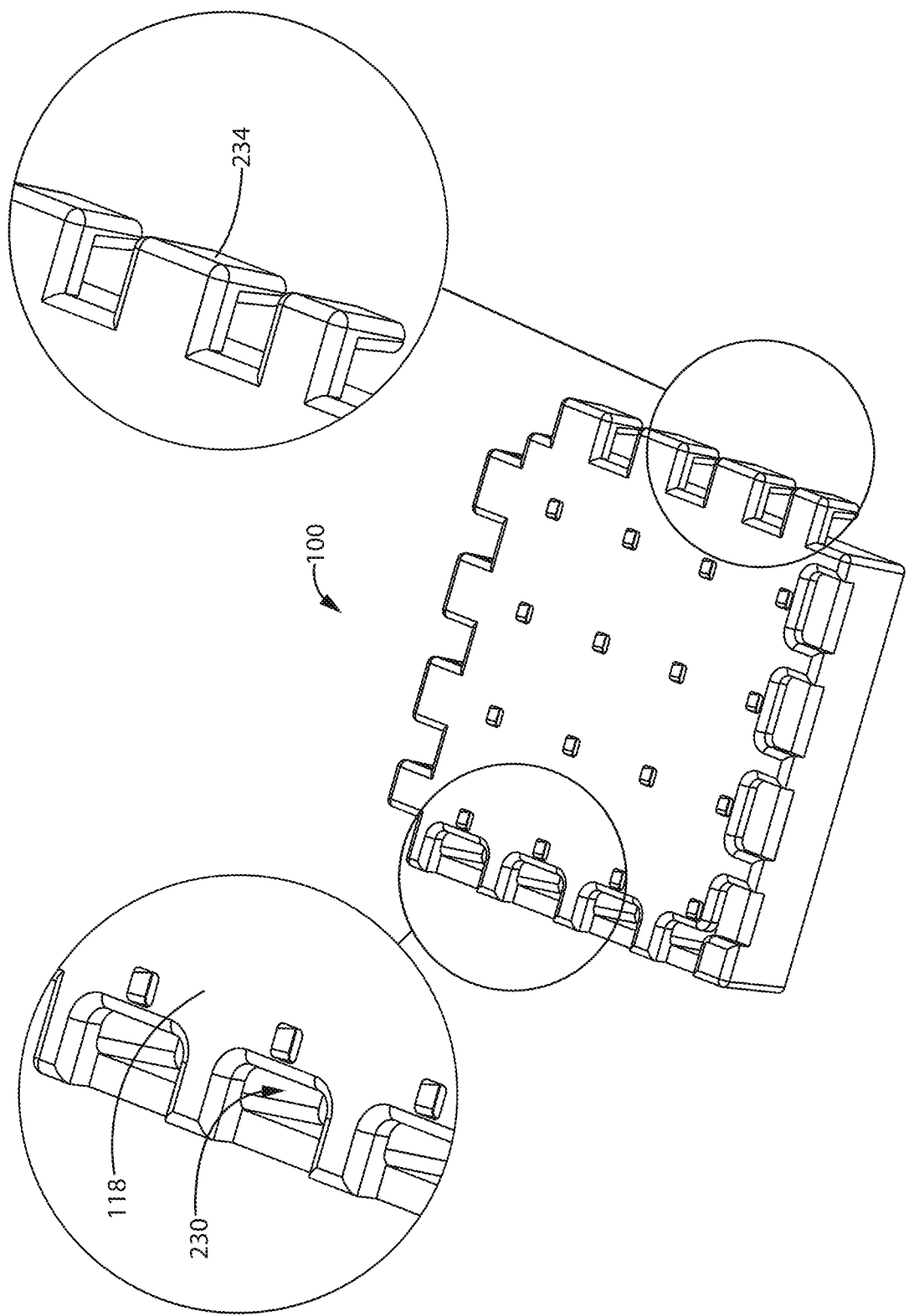

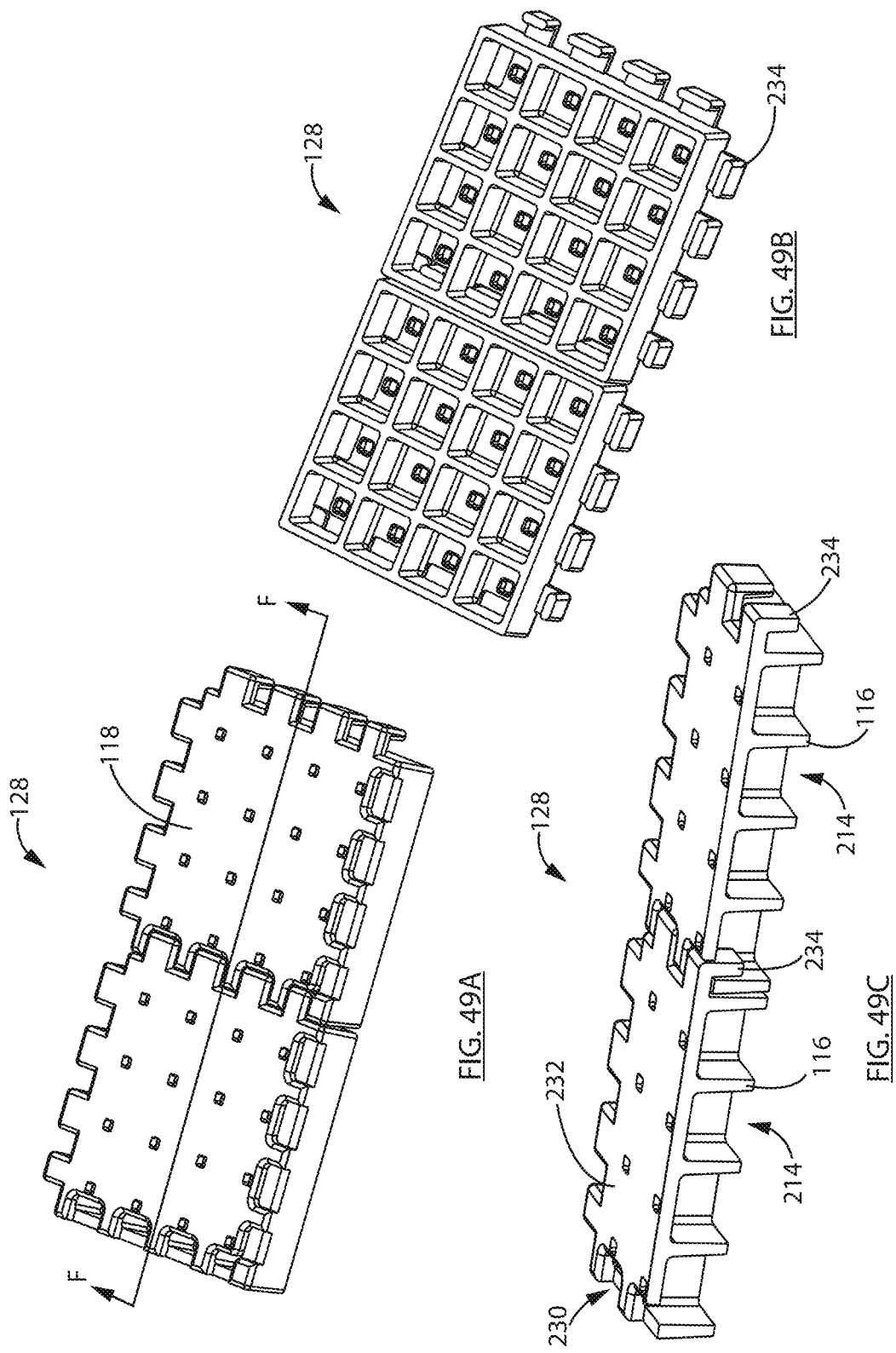

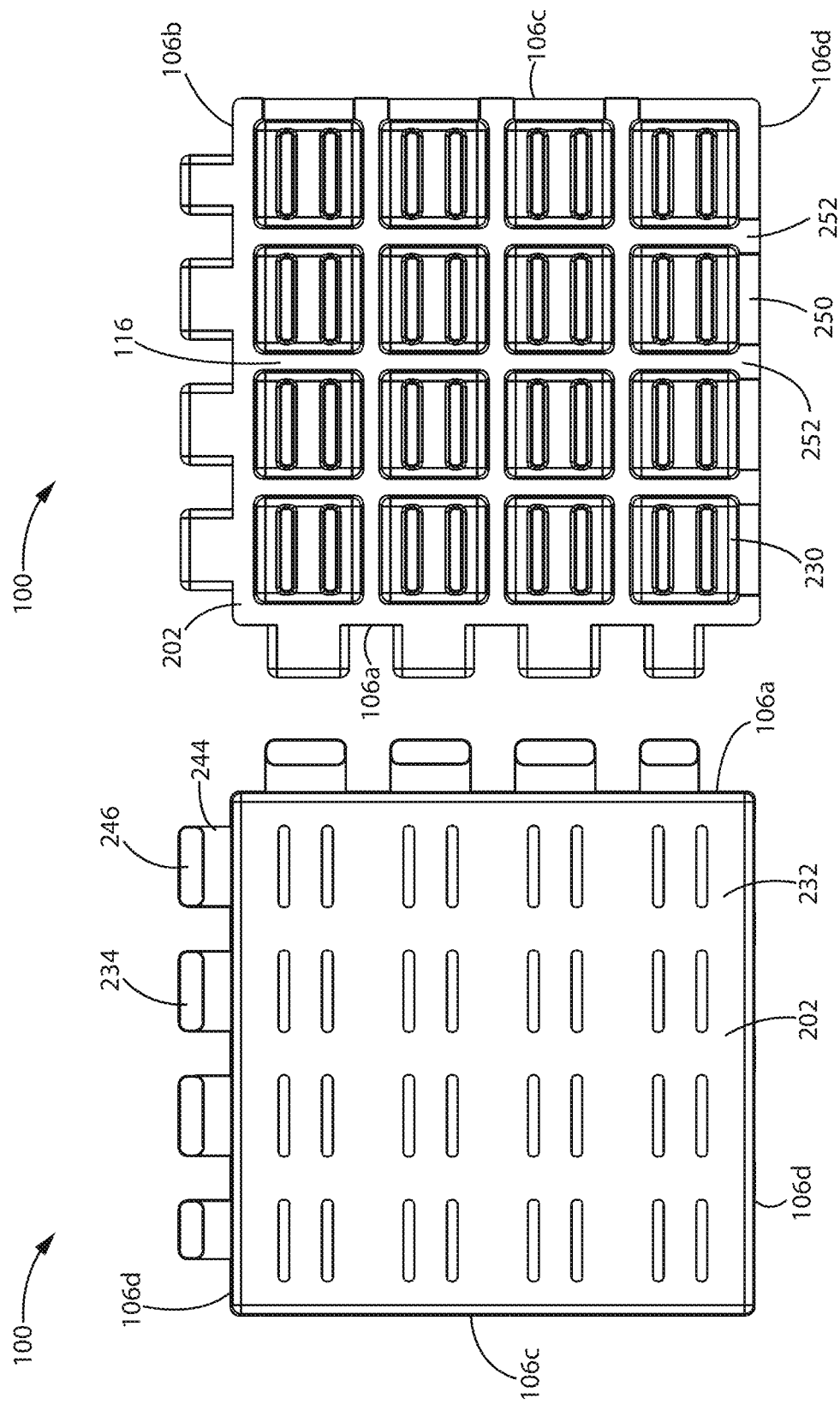

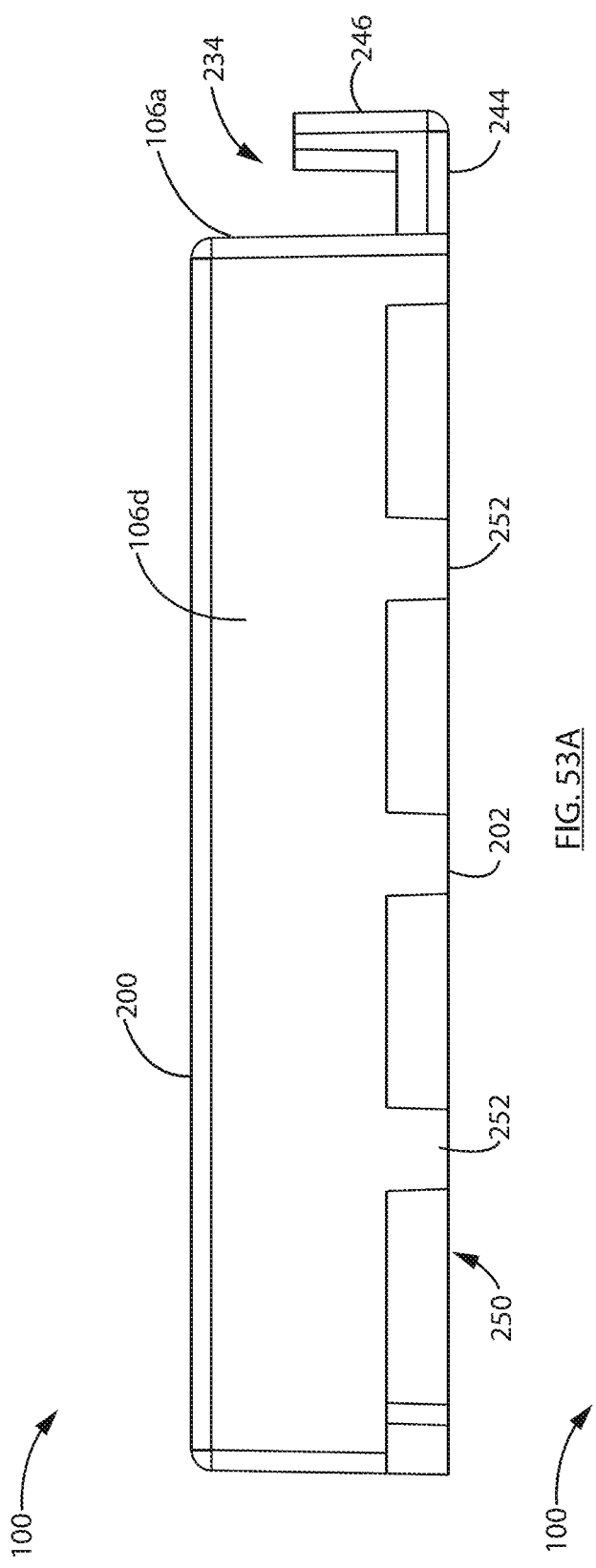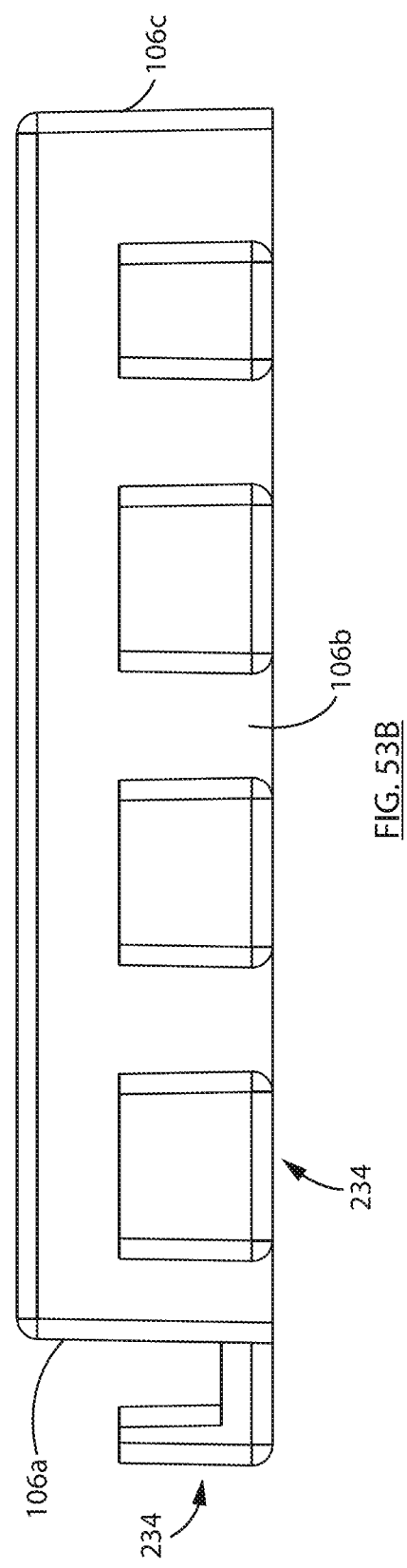

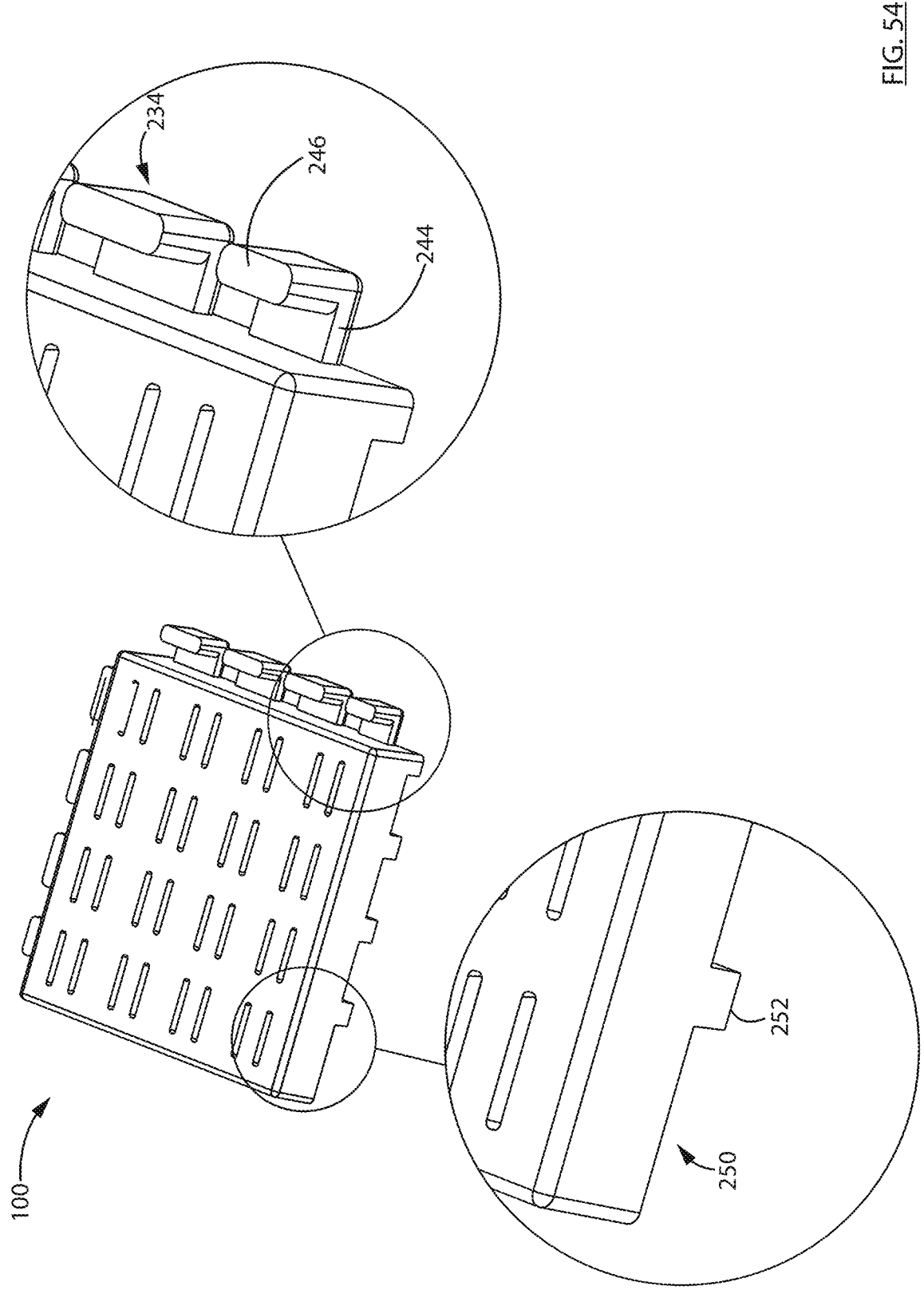

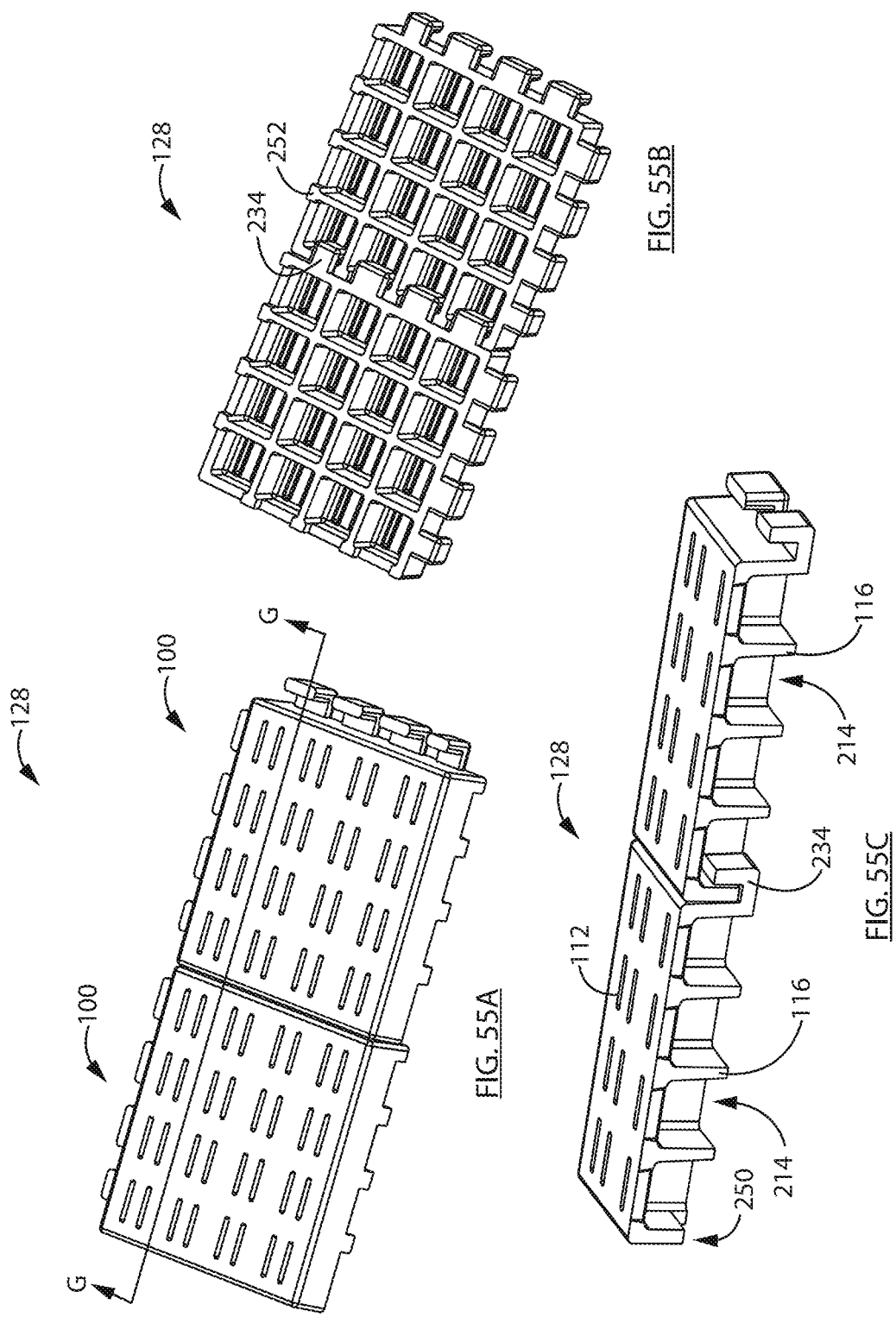

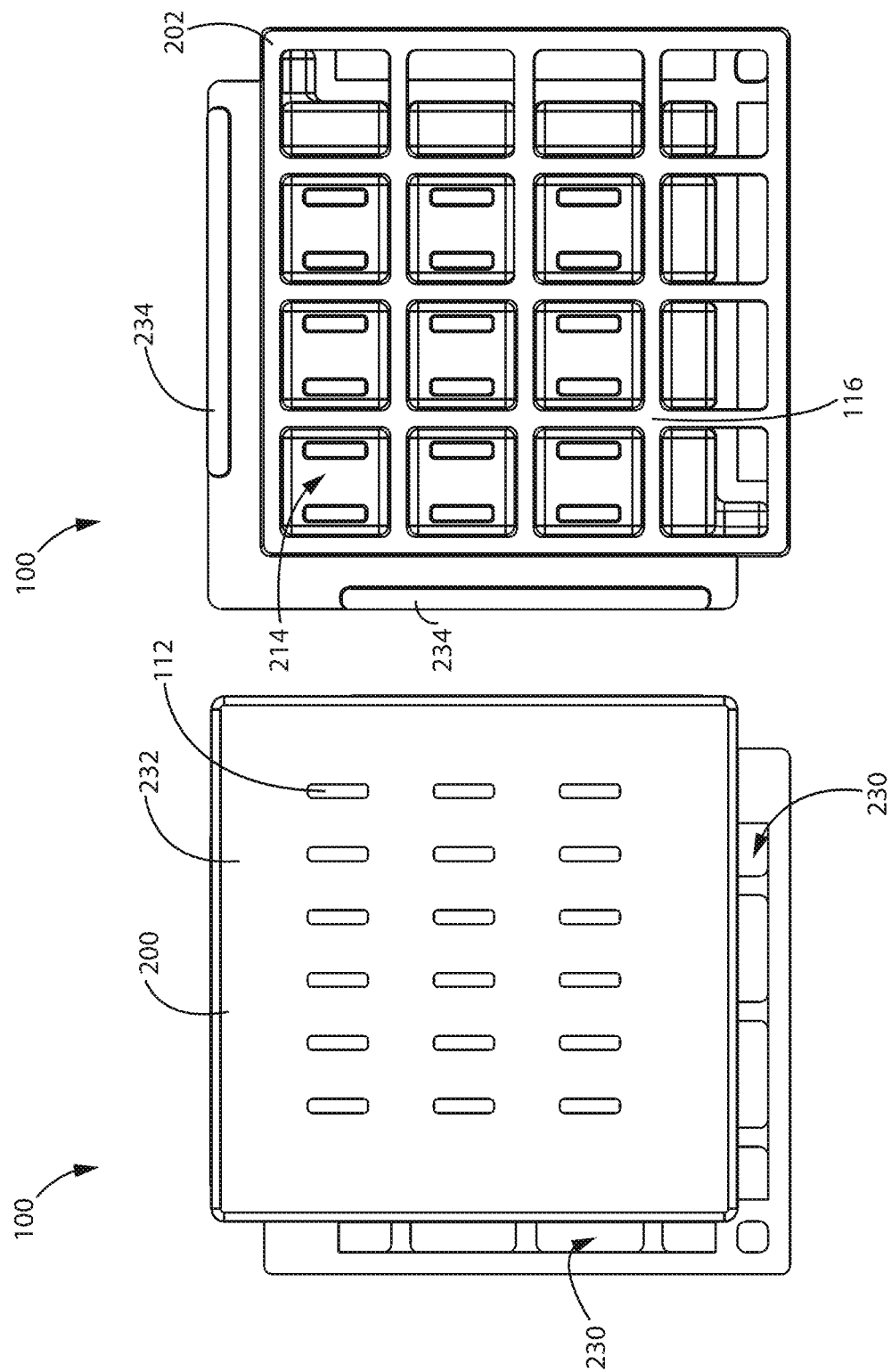

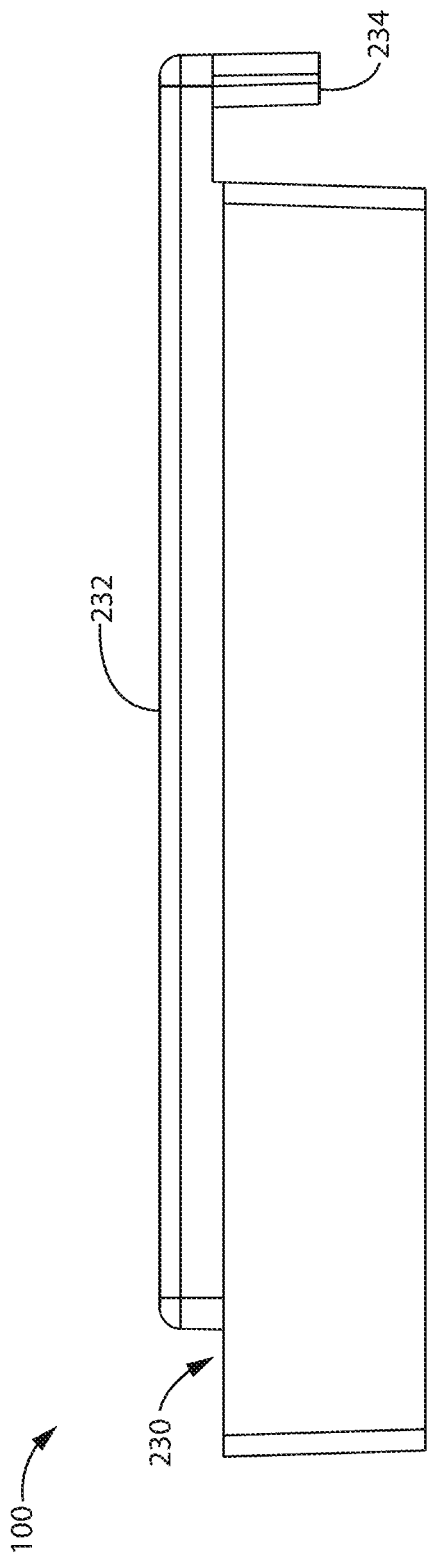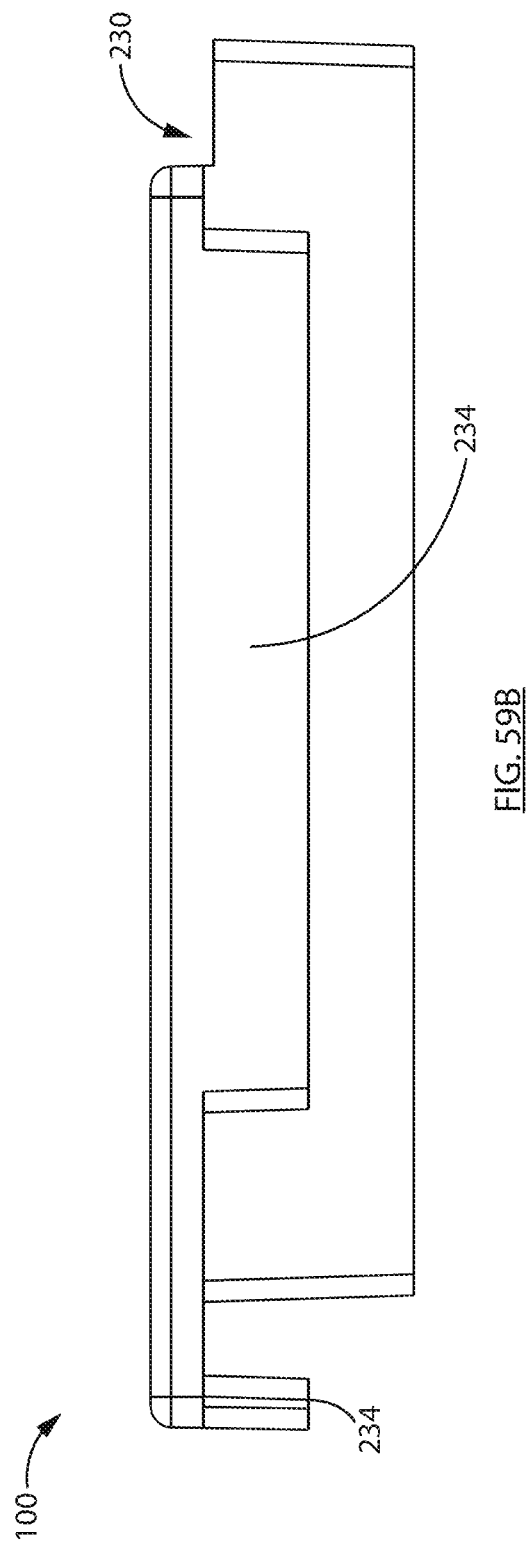

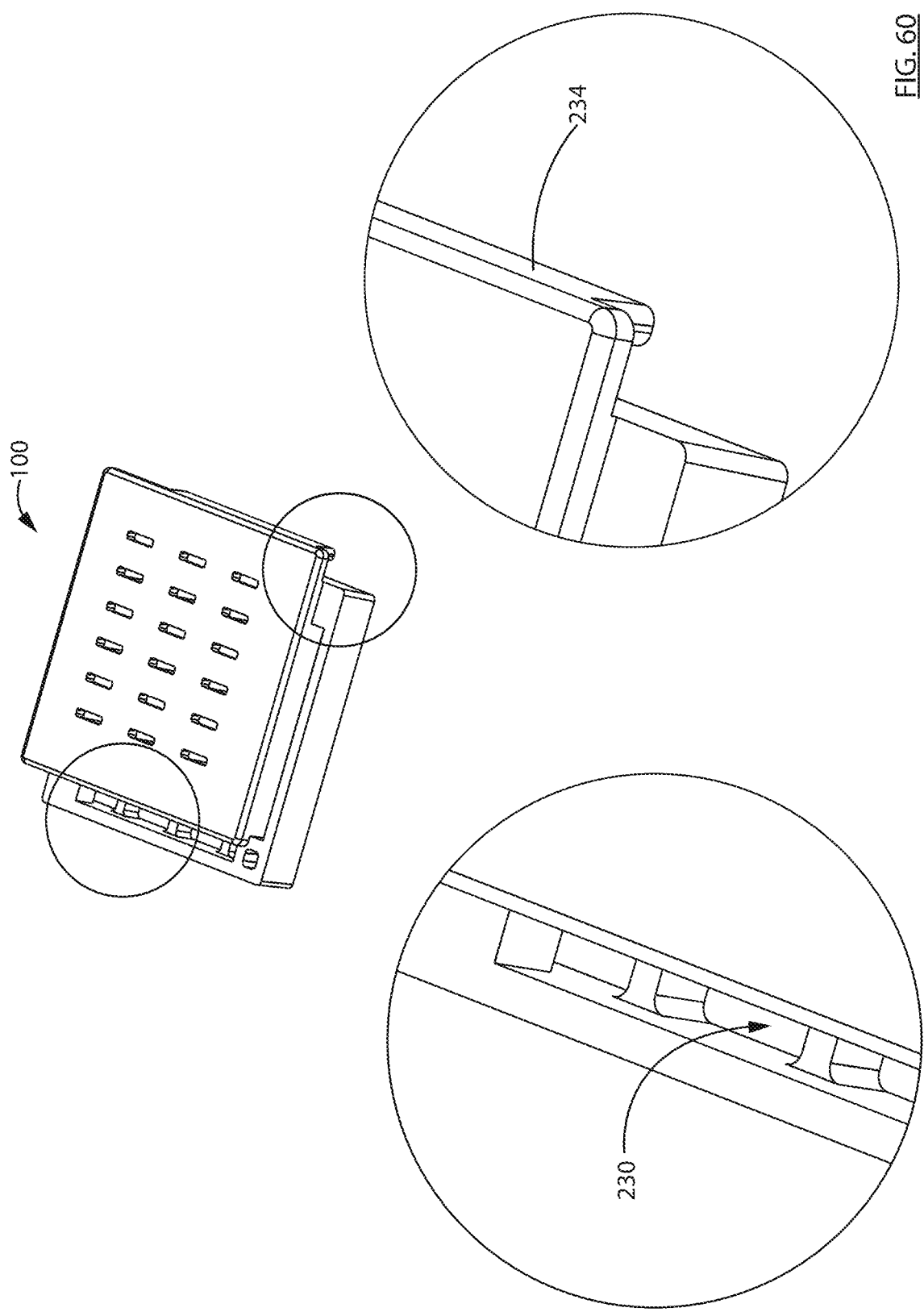

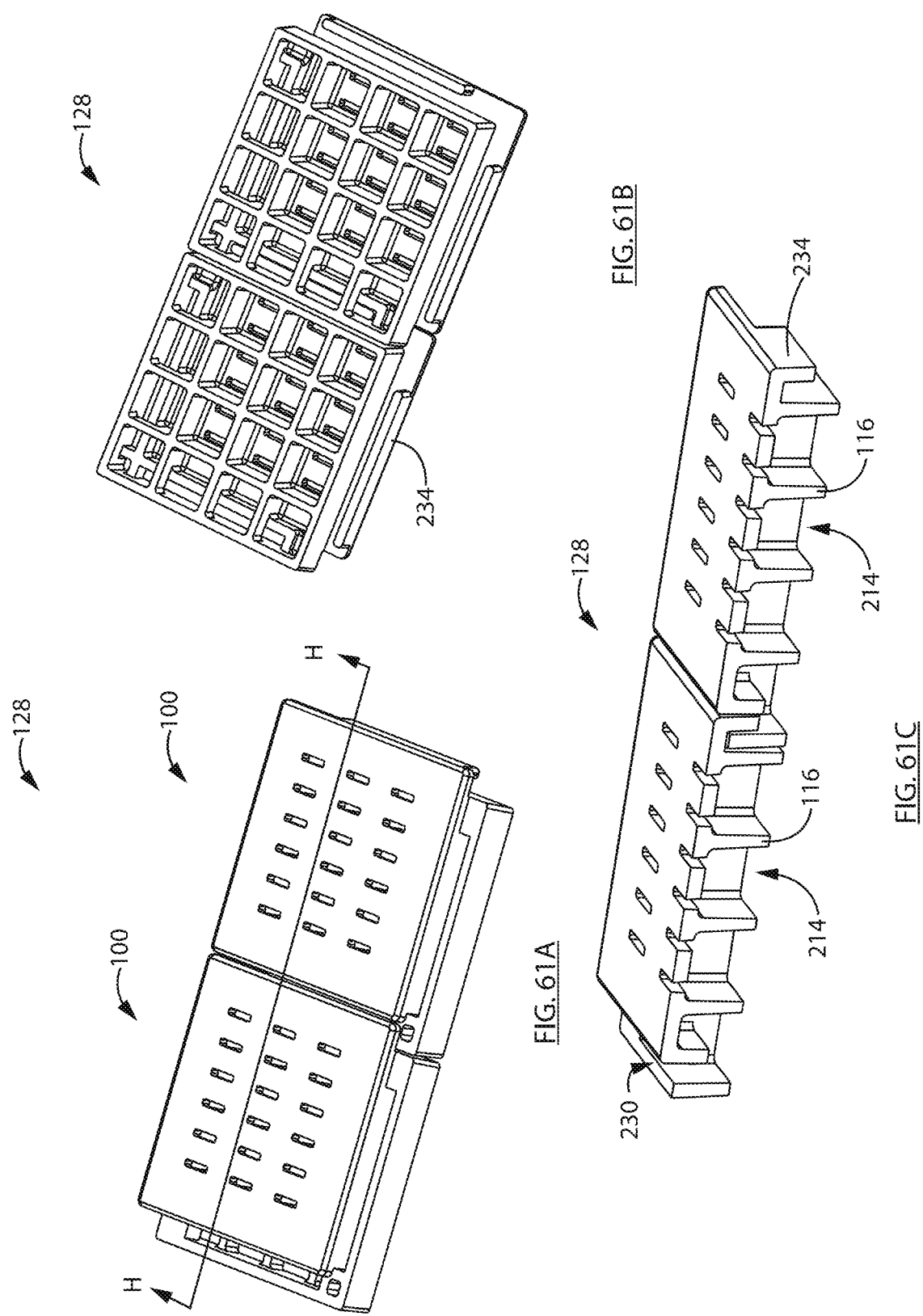

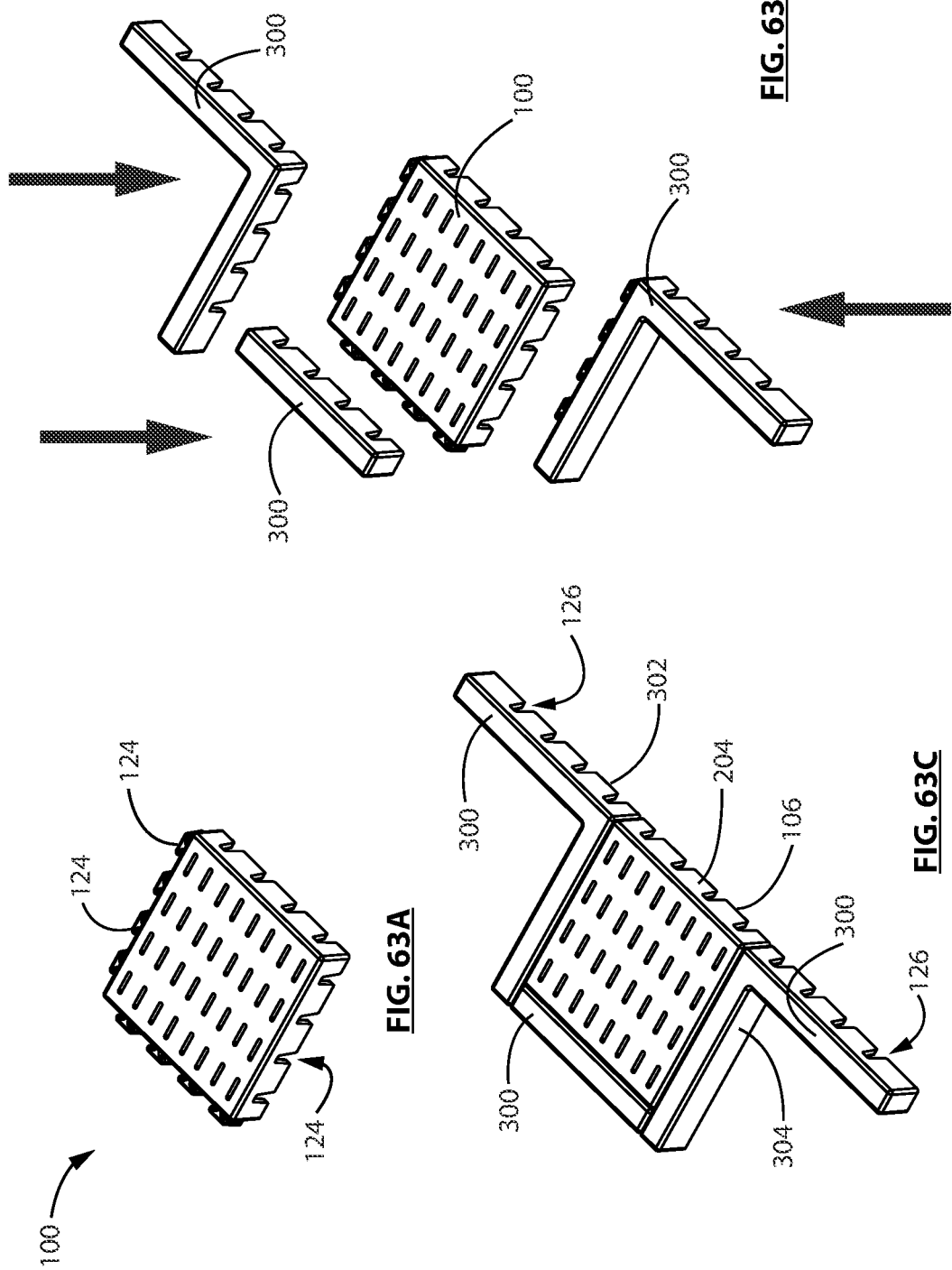

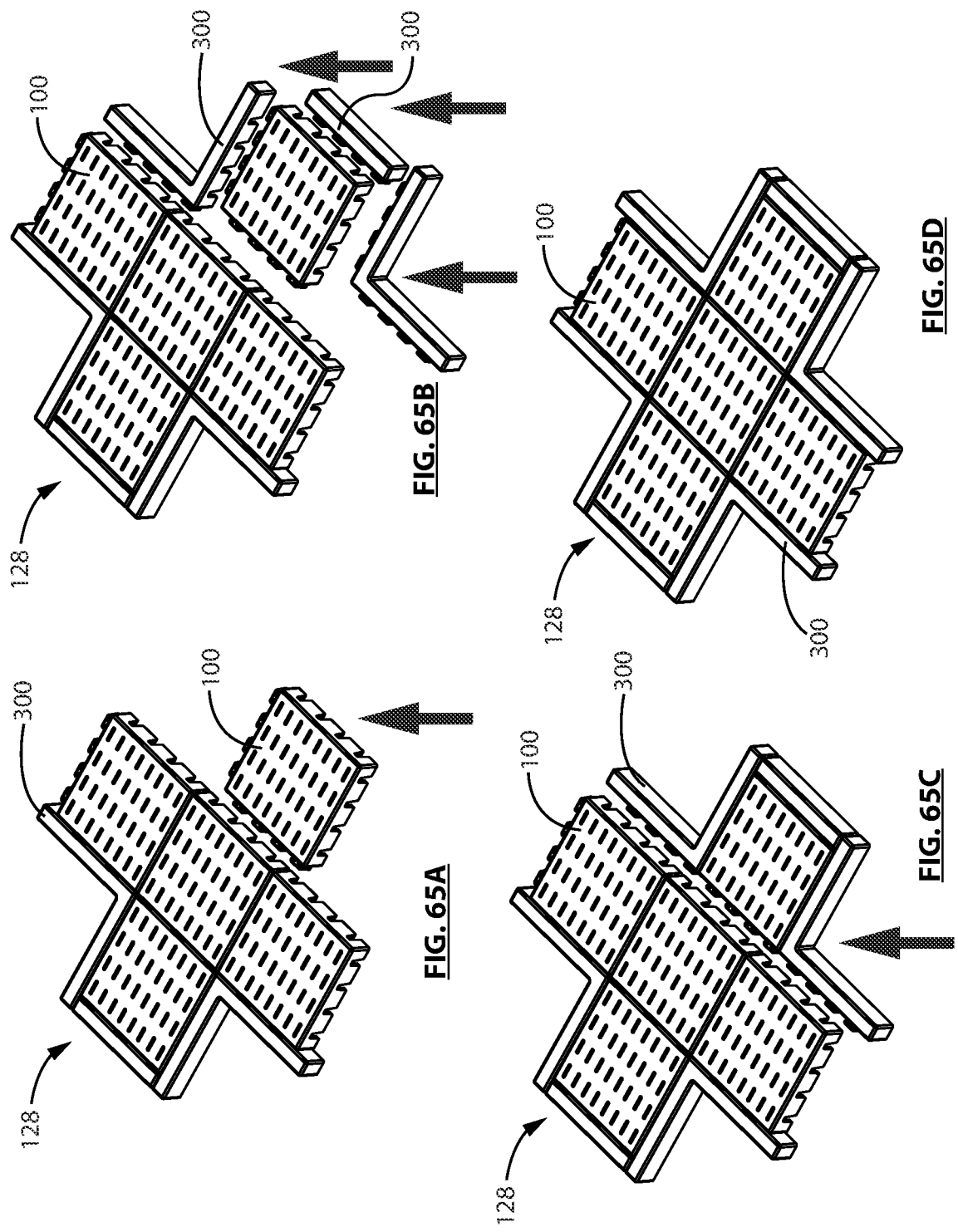

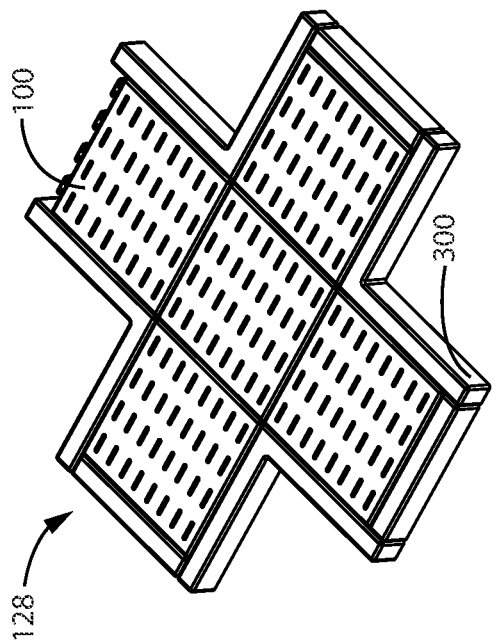
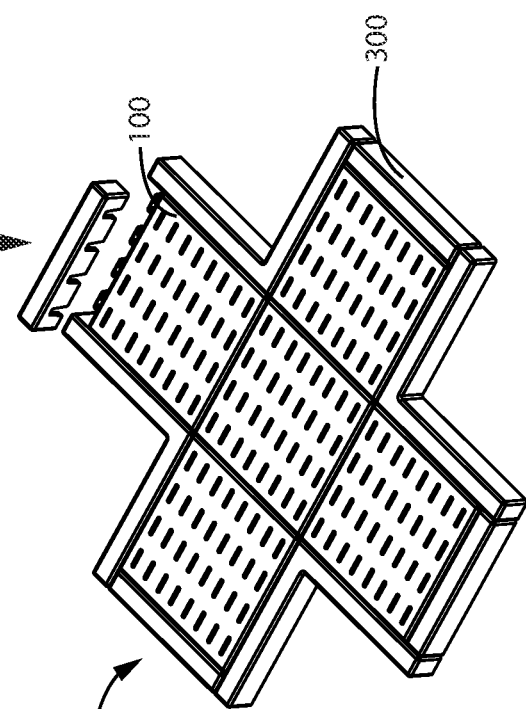
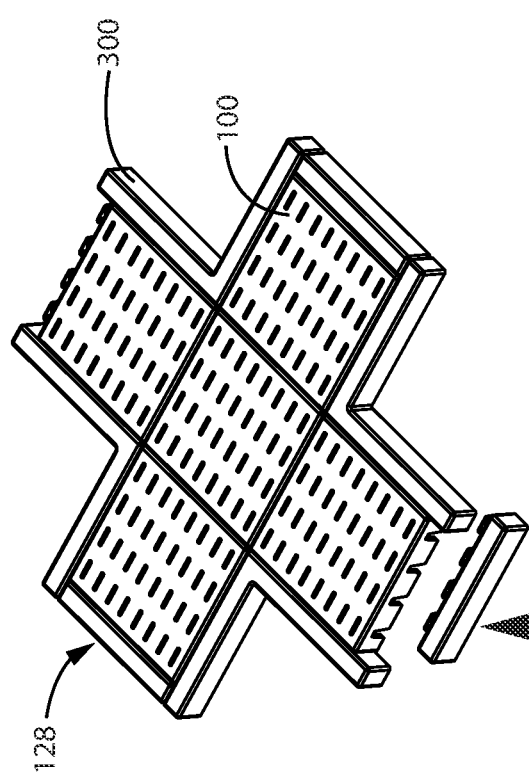
FIG. 66B
FIG. 66C
FIG. 66A

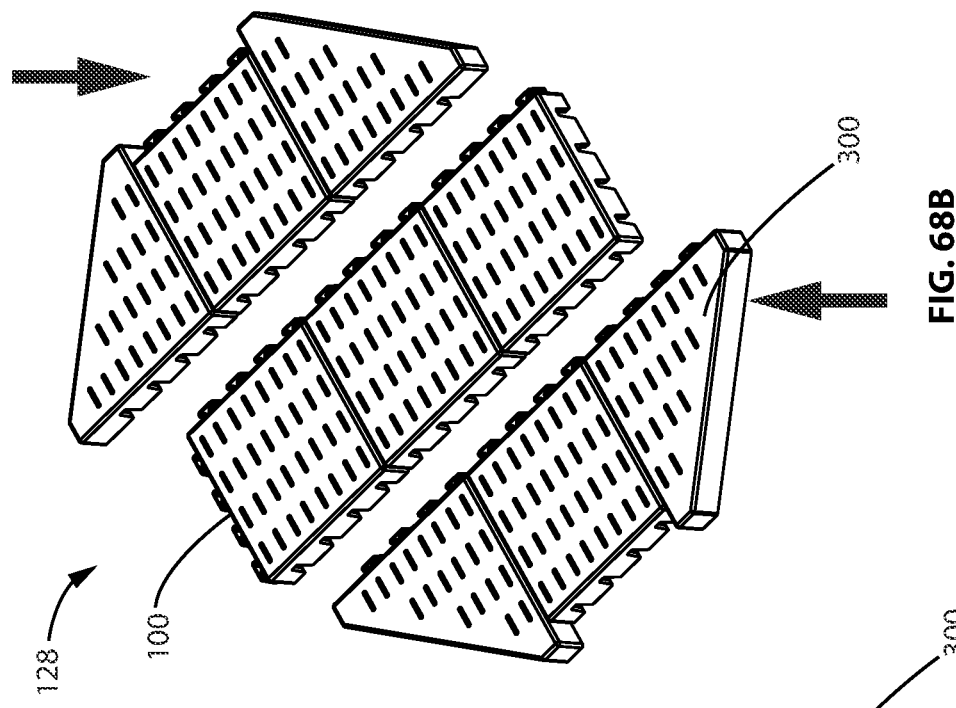
FIG. 68B
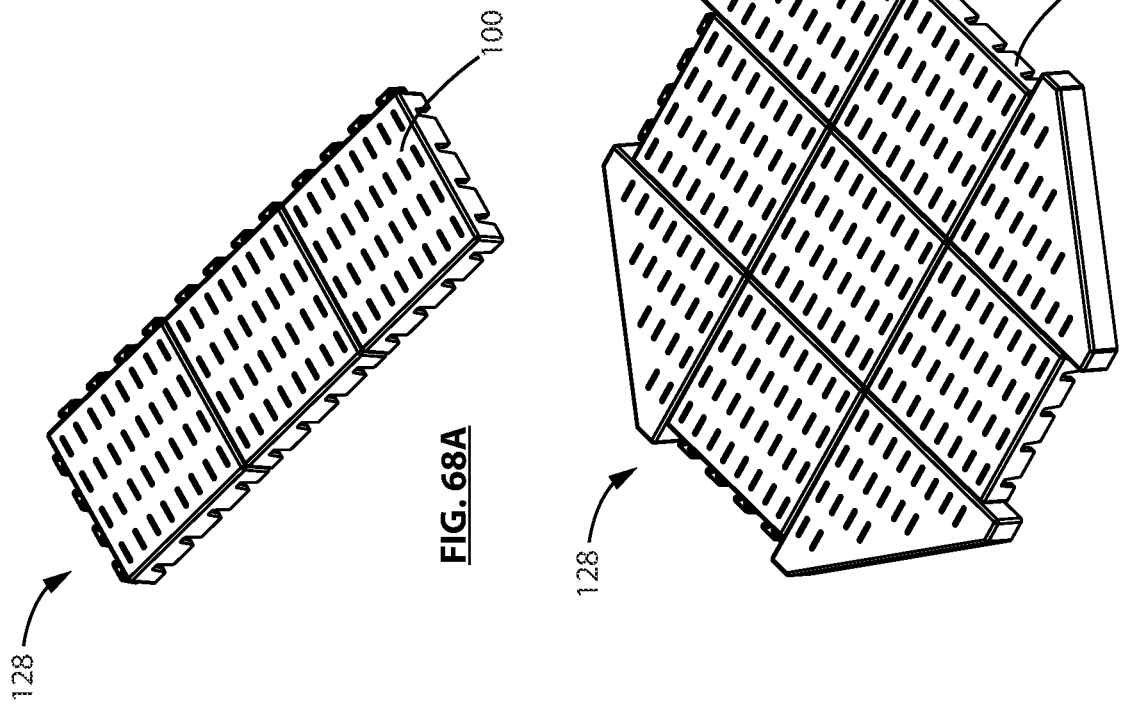
FIG. 68A
FIG. 68C

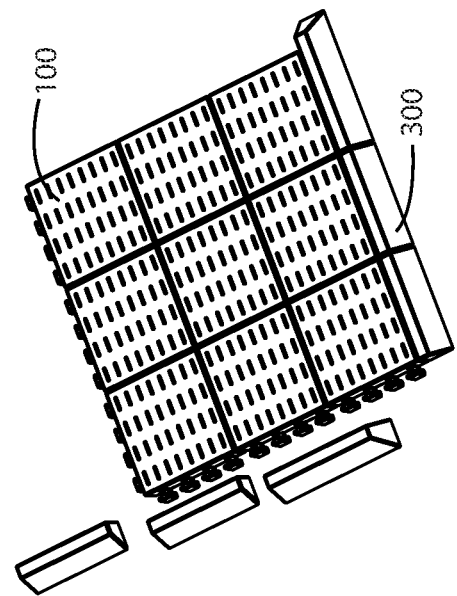
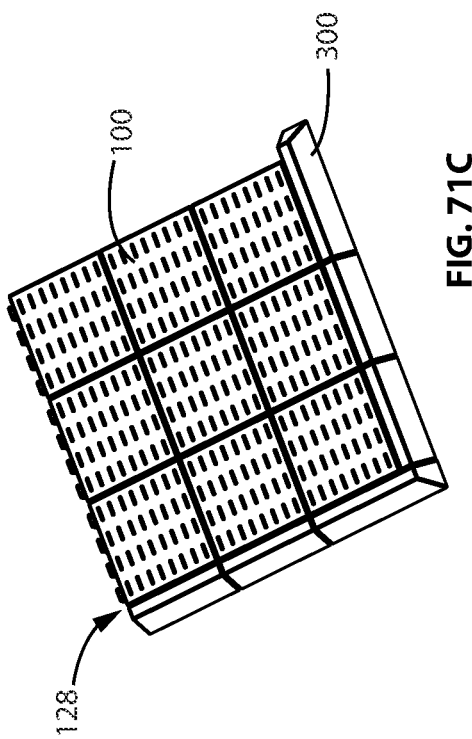
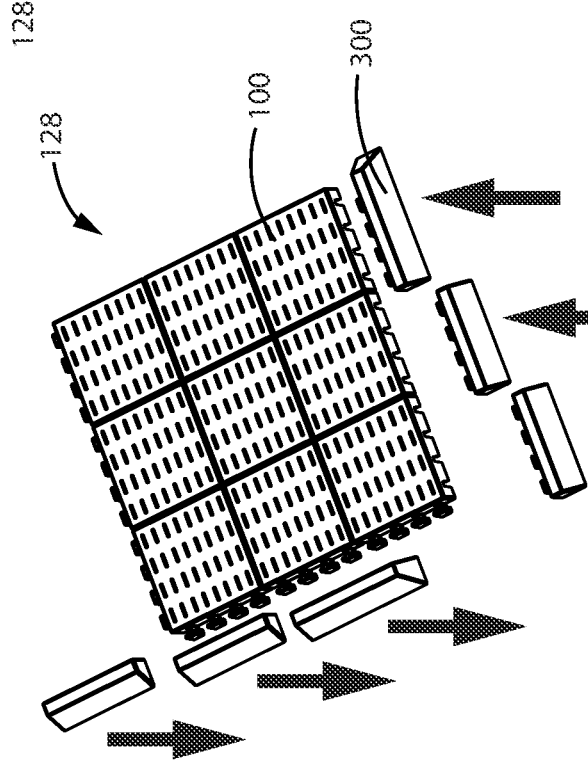
FIG. 71B
FIG. 71C
FIG. 71A

PATIO BLOCKS WITH EDGE BLOCKS

CROSS-REFERENCE TO RELATED APPLICATIONS

This application is a continuation-in-part of co-pending U.S. patent application Ser. No. 16/726,061, filed on Dec. 23, 2019, which itself is a continuation-in-part of co-pending U.S. patent application Ser. No. 16/540,560, filed on Aug. 14, 2019, the entirety of each of which is hereby incorporated by reference.

FIELD

This disclosure relates generally to blocks such as patio pavers, and in particular to interlocking blocks having a drainage channel.

INTRODUCTION

The following is not an admission that anything discussed below is part of the prior art or part of the common general knowledge of a person skilled in the art.

Various types of blocks are known, including patio pavers and other outdoor surface blocks and including blocks comprising recycled or virgin plastics or metals. Further, various designs for blocks are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is provided a kit including a plurality of interior paving blocks and a plurality of edge paving blocks. The interior paving blocks have first engagement members that are inter-engageable with mating second engagement members on the edge paving blocks. An advantage of this design is that the interior paving blocks may be the same size and shape and may be used in many different arrays. The edge paving blocks may then be used to finish the array to close the edges and protect the engagement members of the interior paving blocks. Additionally, the use of edge paving blocks may allow the array to be customized for each desired use while using interior paving blocks of the same size and shape.

In accordance with this broad aspect, there is provided a kit comprising:
  (a) a plurality of interior paving blocks, each interior paving block having an upper side having a walking surface, a lower side and an outer frame member extending between the upper and lower sides, the outer frame member extending around a perimeter of the paving block, the outer frame member having first engagement members; and,
  (b) a plurality of edge paving blocks, each edge paving block having an upper side having a walking surface, a lower side, an inner side and an opposed outer side, each of the inner and outer side extending between the upper and lower sides of the edge paving block, the outer side has a smooth surface and the inner side comprises mating second engagement members whereby the first engagement members of one of the interior paving blocks is inter-engageable with the mating second engagement members of one of the edge paving blocks.

In any embodiment, the mating second engagement members of one of the edge paving blocks may inter-engage in a downward direction when one of the interior paving blocks is positioned on the ground.

In any embodiment, the first engagement members may comprise male engagement members and the mating second engagement members may comprise female engagement members.

In any embodiment, the mating second engagement members may comprise generally V-shaped recesses.

In any embodiment, the outer frame of one of one of the interior paving blocks may comprise a side face that inter-engages with the inner side of one of the edge paving blocks and the inner side of one of the edge paving blocks may be longer than the side face.

In any embodiment, the first engagement members may comprise female engagement members and the mating second engagement members may comprise male engagement members.

In any embodiment, the mating second engagement members may comprise generally V-shaped recesses.

In accordance with another aspect of this disclosure, there is provided a kit including a plurality of interior paving blocks and a plurality of edge paving blocks. The outer frame of one of the interior paving blocks comprises a side face that inter-engages with the inner side of one of the edge paving blocks and the inner side of one of the edge paving blocks is longer than the side face. An advantage of this design is that edge paving blocks of various lengths may be used to provide a flush, finished surface to an array of paving blocks.

In accordance with this broad aspect, there is provided a kit comprising:
  (a) a plurality of interior paving blocks, each interior paving block having an upper side having a walking surface, a lower side and an outer frame member extending between the upper and lower sides, the outer frame member extending around a perimeter of the paving block, the outer frame member having first engagement members; and,
  (b) a plurality of edge paving blocks, each edge paving block having an upper side having a walking surface, a lower side, an inner side and an opposed outer side, each of the inner and outer side extending between the upper and lower sides of the edge paving block, the inner side comprises mating second engagement members whereby the first engagement members of one of the interior paving blocks is inter-engageable with the mating second engagement members of one of the edge paving blocks,
      wherein the outer frame of one of one of the interior paving blocks comprises a side face that inter-engages with the inner side of one of the edge paving blocks and the inner side of one of the edge paving blocks is longer than the side face.

In any embodiment, the mating second engagement members of one of the edge paving blocks may inter-engage in a downward direction when one of the interior paving blocks is positioned on the ground.

In any embodiment, the first engagement members may comprise male engagement members and the mating second engagement members may comprise female engagement members.

In any embodiment, the mating second engagement members comprise generally V-shaped recesses.

In any embodiment, the first engagement members may comprise female engagement members and the mating second engagement members may comprise male engagement members.

In any embodiment, the mating second engagement members may comprise generally V-shaped recesses.

In accordance with one aspect of this disclosure, which may be used alone or in combination with any other aspect, there is provided a paving block having an interior drainage channel. Interior drainage allows the block to provide a walking surface, or be filled with a material to provide a walking surface, while still allowing drainage through the block. By having an interior drainage channel, the outer walls of the block may be a single wall, since a drainage channel is already provided interiorly. Using single, outer walls may require less material to create the block. The interior drainage channel may prevent water damage to the block, reduce ice formation on the walking surface, and provide a more environmentally-friendly paving system.

In accordance with this broad aspect, there is provided a paving block having an upper side and a lower side and comprising:

an outer frame member extending around a perimeter of the paving block, the paving block having an interior area defined by the perimeter; and, at least one interior member subdividing the interior area into at least two interior regions, wherein the dividing member comprises first and second opposed spaced apart walls and an upper connecting wall that connects an upper end of each of the first and second opposed spaced apart walls, a drainage channel provided between the first and second spaced apart walls and the upper connecting wall having a plurality of drainage openings communicating with the drainage channel.

In any embodiment, the first and second opposed spaced apart walls may define a volume located between the first and second opposed spaced apart walls and the drainage channel may comprise the volume.

In any embodiment, the volume may have at least one drainage opening in the bottom thereof.

In any embodiment, the volume may have an open bottom.

In any embodiment, a plurality of interior members may sub-divide the interior area into four interior regions, the plurality of interior members providing the upper connecting wall, whereby drainage openings are provided between adjacent interior regions. In any embodiment, at least a portion of the outer frame member may comprise a single wall outer frame.

In any embodiment, at least a portion of the outer frame member may comprise a double walled outer frame.

In any embodiment, the double walled outer frame may be provided with a first engagement member and the single wall outer frame may be provided with a mating second engagement member whereby the first engagement member of one paving block is inter-engageable with the mating second engagement member of a second paving block.

In any embodiment, the double walled outer frame may comprise two spaced apart walls that are connected at their upper ends and open at the bottom so as to form the first engagement member, the first engagement member thereby having an open bottom and an interior volume positioned between the two spaced apart walls, and the single wall outer frame may be shaped to seat within the interior volume and defines the mating second engagement member.

In any embodiment, the first engagement member that is provided on the double walled outer frame may comprise a male engagement member and the mating second engagement member that is provided on the single wall outer frame may comprise a female engagement member.

In any embodiment, a first portion of the outer frame may be provided with a first engagement member and a second portion of the outer frame may be provided with a mating second engagement member whereby the first engagement member of one paving block is inter-engageable with the mating second engagement member of a second paving block.

In any embodiment, the first portion of the outer frame and the second portion of the outer frame may comprise a single walled outer frame. In any embodiment, the first engagement member provided on the double walled outer frame may comprise a plurality of openings located in an upper surface of the paving block and the mating second engagement member provided on the single wall outer frame may comprise a plurality of downwardly extending flanges receivable in the openings of the second paving block.

In any embodiment, a first portion of the outer frame may be provided with a first engagement member comprising at least one upwardly extending flange, the upwardly extending flange may comprise an outwardly extending first portion that extends outwardly from the first portion of the outer frame and an outer upwardly extending portion and a second portion of the outer frame may be provided with a mating second engagement member comprising at least one recess provided in a lower surface thereof wherein the outwardly extending first portion seats in the recess of a second paving block.

In accordance with another aspect of this disclosure, which may be used alone or in combination with any other aspect, it may be desirable to provide engagement members on single walls and double walls of the outer frame to allow a plurality of paving blocks to be coupled together while reducing the material required to create the block.

In accordance with this broad aspect, there is provided a paving block having an upper side and a lower side and comprising:

an outer frame member extending around a perimeter of the paving block, the paving block having an interior area defined by the perimeter, at least a portion of the outer frame member comprises a single wall outer frame and at least a portion of the outer frame member comprises a double walled outer frame; and, at least one interior member subdividing the interior area into at least two interior regions, wherein the double walled outer frame is provided with a first engagement member and the single wall outer frame is provided with a mating second engagement member whereby the first engagement member of one paving block is inter-engageable with the mating second engagement member of a second paving block.

In any embodiment, the double walled outer frame may be provided with a first engagement member and the single wall outer frame may be provided with a mating second engagement member whereby the first engagement member of one paving block is inter-engageable with the mating second engagement member of a second paving block.

In any embodiment, the double walled outer frame may comprise two spaced apart walls that are connected at their upper ends and open at the bottom so as to form the first engagement member, the first engagement member thereby having an open bottom and an interior volume positioned between the two spaced apart walls, and the single wall outer frame may be shaped to seat within the interior volume and defines the mating second engagement member.

In any embodiment, the first engagement member provided on the double walled outer frame may comprise a male engagement member and the mating second engagement member provided on the single wall outer frame may comprise a female engagement member.

In any embodiment, the first engagement member may comprise a plurality of openings located in an upper surface of the paving block and the mating second engagement member may comprise a plurality of downwardly extending flanges receivable in the openings of the second paving block.

In accordance with another aspect of this disclosure, which may be used alone or in combination with any other aspect, it may be desirable to provide engagement members on the outer frame of the block to allow a plurality of paving blocks to be coupled together.

In accordance with this broad aspect, there is provided a paving block having an upper side and a lower side and comprising:
  an outer frame member extending around a perimeter of the paving block, the paving block having an interior area defined by the perimeter; and,
  at least one interior member subdividing the interior area into at least two interior regions,
  wherein a first portion of the outer frame is provided with a first engagement member comprising at least one upwardly extending flange, the upwardly extending flange comprising a outwardly extending first portion that extends outwardly from the first portion of the outer frame and an outer upwardly extending portion and a second portion of the outer frame is provided with a mating second engagement member comprising at least one recess provided in a lower surface thereof wherein the outwardly extending first portion seats in the recess of a second paving block.

In accordance with another aspect of this disclosure, which may be used alone or in combination with any other aspect, a plastic block may be treated using heat to embed a UV resistant material. A plastic block such as a patio paver may be exposed to prolonged UV radiation, which may result in deterioration of the block. Embedding a UV resistant material may provide a degree of protection from degradation due to UV radiation. Treatment using heat may result in at least a portion of the plastic block being softened so as to facilitate embedding of the UV resistant material in a top (outer exposed when installed) face.

The coating may be applied to an existing walking surface (e.g., a patio or sidewalk). Accordingly, an existing patio may be rejuvenated by applying the coating. The UV coating may also be used to adjust (change) the colour of the exposed surface of the patio. In particular, the coating material may be selected to provide a desired colour on the treated patio blocks. Alternately, or in addition, the coating which is applied may be used to only change the colour and may not add significant UV protection.

The UV resistant material may be embedded into an outer face of the plastic block as a coating on the outer face. Embedding the UV resistant material as a coating may simplify treating an installed patio since only the top surface of the blocks need to be available for treatment.

Examples of UV resistant material include sand, titanium dioxide, crushed glass, a metallic powder, pumice, a UV stabilized plastic, concrete particulate material and pebbles. Optionally, the UV coating consists of or consists essentially of sand. A UV resistant material coating may also result in a more textured or natural surface of the plastic block.

In accordance with this broad aspect, there is provided a method for treating a plastic block comprising using heat to embed a UV resistant material into an outer face of the plastic block wherein, once embedded, the UV resistant material provides a coating on the outer face.

In any embodiment, the outer face may be first heated to a temperature at which the UV resistant material is embeddable in the outer face and then the UV resistant material is embedded into the outer face.

In any embodiment, the UV resistant material may be provided on the outer face once the outer face has been heated to a temperature at which the UV resistant material is embeddable in the outer face.

In any embodiment, the outer face may be heated to a temperature at which the UV resistant material is embeddable in the outer face but below the melting point of the plastic block.

In any embodiment, the outer face may be heated to a temperature which is from 40 to 5° C. below the melting point of the plastic block.

In any embodiment, only the upper portion of the plastic block, which comprises the outer face, may be heated to a temperature about or above the melting point of the plastic block.

In any embodiment, only the upper 10% of the height of the plastic block, which comprises the outer face, may be heated to a temperature about or above the melting point of the plastic block.

In any embodiment, the upper portion of the plastic block may be subjected to heating for up to 10 seconds to heat the upper portion to a temperature about or above the melting point of the plastic block.

In any embodiment, the UV resistant material may be provided on the outer face once the outer face has been heated.

In any embodiment, the UV resistant material may be heated to obtain heated UV resistant material and the method may further comprise providing the heated UV resistant material to the outer face. In such an embodiment, the heated UV resistant material may provide at least 75% of the heat or may provide at least substantially all of the heat.

In any embodiment, the UV resistant material may be pressed into the outer face.

In any embodiment, the UV resistant material may be delivered under force to the outer face.

In any embodiment, the UV resistant material may be conveyed by an air stream to the outer face.

In any embodiment, the air stream may be produced by a compressed gas.

In any embodiment, the UV resistant material may be ejected from an apparatus towards the outer face.

In any embodiment, the method may further comprise selecting the UV resistant material from sand, titanium dioxide, crushed glass, a metallic powder, pumice, a UV stabilized plastic, concrete particulate material and pebbles.

In any embodiment, the UV resistant material may comprise sand.

In accordance with another aspect of this disclosure, which may be used alone or in combination with any other aspect, it may be desirable to treat a plastic block using compressive force to embed a UV resistant material into an outer face of the plastic block. This may reduce or eliminate the need for heat.

In accordance with this broad aspect, there is provided a method for treating a plastic block comprising using compressive force to embed a UV resistant material into an outer face of the plastic block wherein, once embedded, the UV resistant material provides a coating on the outer face.

In accordance with another aspect of this disclosure, which may be used alone or in combination with any other aspect, a plastic block may be formed with a UV coating applied only to the face with will be the outer (exposed) face when the block is installed to form a walking surface. Embedding the UV resistant material as a coating may allow the block to comprise materials such as mixed or recycled plastics having a lower UV resistance than the UV resistant material.

In accordance with this aspect of this disclosure, a plastic block may be molded with a UV resistant material forming a coating on an outer face of the plastic block. Molding a plastic block may include placing a UV resistant material into a side of a mold which forms an outer face of the plastic block, introducing plastic into the mold, and molding the plastic block.

In some embodiments, the blocks include a low melting temperature plastic such as high density polyethylene or low density polyethylene, which may be an upper layer, when the block is installed to form a walking surface. This may facilitate retreatment of the block. For example, the outer surface may be retreated after the blocks have been installed for a period of time to change the colour of the walking surface and/or to rejuvenate the UV coating by applying a new UV coating.

In accordance with this broad aspect, there is provided a method of molding a plastic block using a mold wherein one side of a mold forms an outer face of the plastic block, the method comprising;
 (a) placing a UV resistant material into a mold whereby the UV resistant material is on the side of the mold;
 (b) introducing plastic into the mold; and,
 (c) molding the plastic block,
 wherein the UV resistant material forms a coating on the outer face of the plastic block.

In any embodiment, the plastic may be introduced to the mold from a location above the UV resistant material.

In any embodiment, the plastic may be introduced to the mold by extrusion.

In any embodiment, step (c) may comprise compressing the plastic in the mold.

In any embodiment, the plastic may be subjected to a pressure in the mold at which the UV resistant material is only partially embedded in the outer face of the plastic block.

In any embodiment, the UV resistant material may have a thickness and the plastic may be subjected to a pressure in the mold at which up to 90% of the thickness of the UV resistant material is embedded in the outer face of the plastic block.

In any embodiment, the method may further comprise selecting the UV resistant material from sand, titanium dioxide, crushed glass, a metallic powder, pumice, a UV stabilized plastic, concrete particulate material and pebbles.

In any embodiment, the UV resistant material may comprise sand.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 24A is a first side view of the block of FIG. 21;

FIG. 24B is a second side view of the block of FIG. 21;

FIG. 31A is a top perspective view of another paving block;

FIG. 31B is a bottom perspective view of the block of FIG. 31;

FIG. 32A is a first side view of the block of FIG. 31;

FIG. 32B is a second side view of the block of FIG. 31;

FIG. 33A is an array of blocks of FIG. 31;

FIG. 33B is a sectional view of two blocks of FIG. 31 along the line C-C in FIG. 33A;

FIG. 35 is a bottom perspective view of the block of FIG. 34;

FIG. 36A is a top view of the block of FIG. 34;

FIG. 36B is a bottom view of the block of FIG. 34;

FIG. 37A is a first side view of the block of FIG. 34;

FIG. 37B is a second side view of the block of FIG. 34;

FIG. 48 is a perspective view of the block of FIG. 44 showing enlarged regions;

FIG. 49A is a top perspective view of the two blocks of FIG. 44;

FIG. 49B is a bottom perspective view of the two blocks of FIG. 49A;

FIG. 49C is a sectional view of the two blocks of FIG. 49A along the line F-F in FIG. 49A;

FIG. 52A is a top view of the block of FIG. 50;

FIG. 52B is a bottom view of the block of FIG. 50;

FIG. 53A is a first side view of the block of FIG. 50;

FIG. 53B is a second side view of the block of FIG. 50;

FIG. 54 is a perspective view of the block of FIG. 50 showing enlarged regions;

FIG. 55A is a top perspective view of the two blocks of FIG. 50;

FIG. 55B is a bottom perspective view of the two blocks of FIG. 50;

FIG. 55C is a sectional view of the two blocks of FIG. 55A along the line G-G in FIG. 55A;

FIG. 58A is a top view of the block of FIG. 56;

FIG. 58B is a bottom view of the block of FIG. 56;

FIG. 59A is a first side view of the block of FIG. 56;

FIG. 59B is a second side view of the block of FIG. 56;

FIG. 60 is a perspective view of the block of FIG. 56 showing enlarged regions;

FIG. 61A is a top perspective view of the two blocks of FIG. 56;

FIG. 61B is a bottom perspective view of the two blocks of FIG. 60;

FIG. 61C is a sectional view of the two blocks of FIG. 61A along the line H-H in FIG. 61C;

FIGS. 63A-63C show the array of FIG. 62 in various states of assembly;

FIGS. 65A-65D show the array of FIG. 62 in further various states of assembly;

FIGS. 66A-66C show the array of FIG. 62 in further various states of assembly;

FIGS. 68A-68C show the array of FIG. 67 in various states of assembly;

FIGS. 71A-71C are top perspective views of another embodiment of an array of a plurality of interior blocks and a plurality of edge paving blocks in various states of assembly;

FIGS. 72A-27B are top perspective views of another embodiment of an array of a plurality of interior blocks and a plurality of edge paving blocks in various states of assembly;

Figure 1:
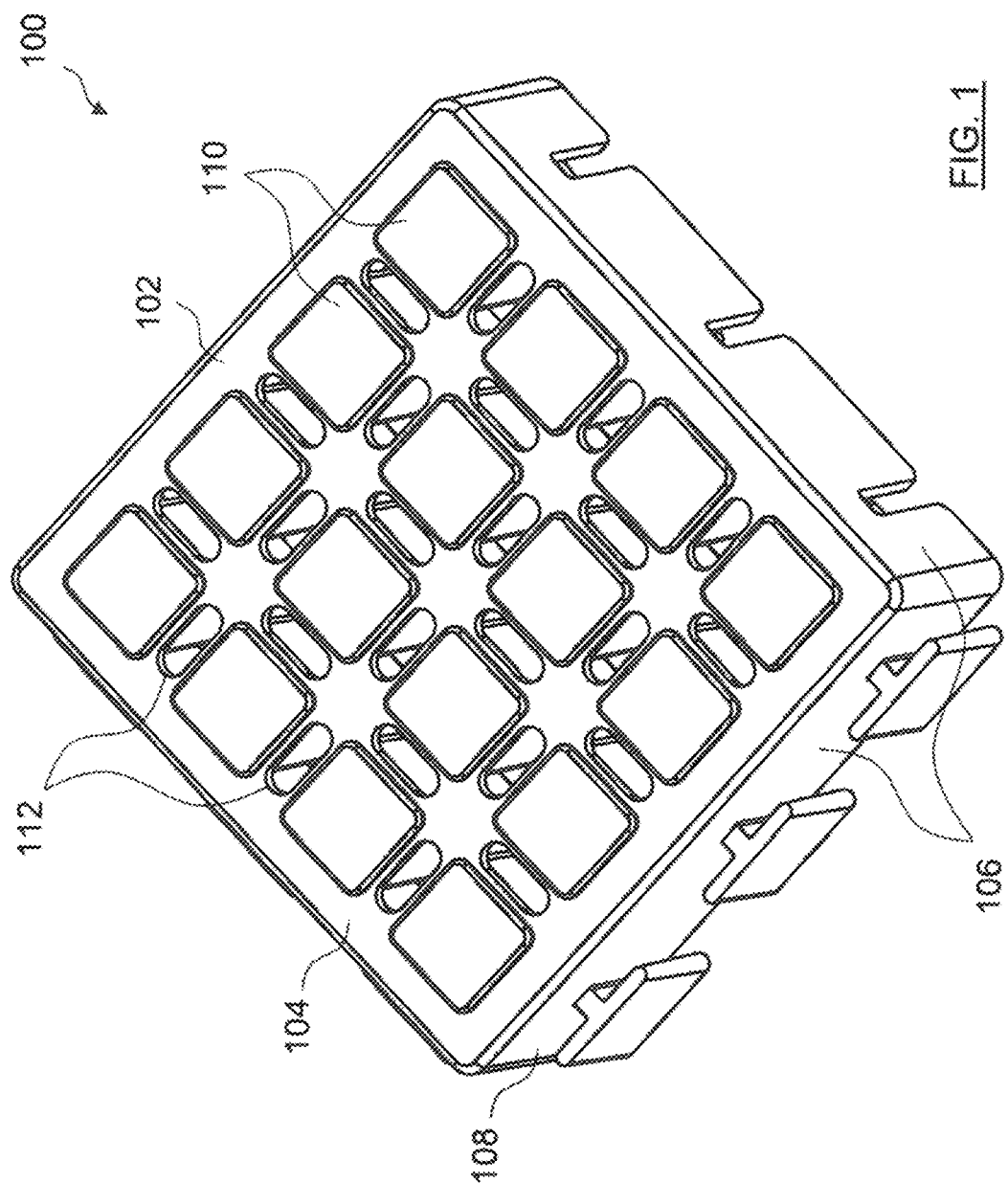
FIG. 1 is a top perspective view of a plastic block.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

General Description of a Block

Referring to FIG. 1, an exemplary embodiment of a plastic block is shown generally as 100. Plastic block 100 includes an outer face 102. In the illustrated example, outer face 102 is a face of top panel 104. A set of sidewalls 106 form a skirt 108 extending from the periphery of the top panel 104.

Figure 20:
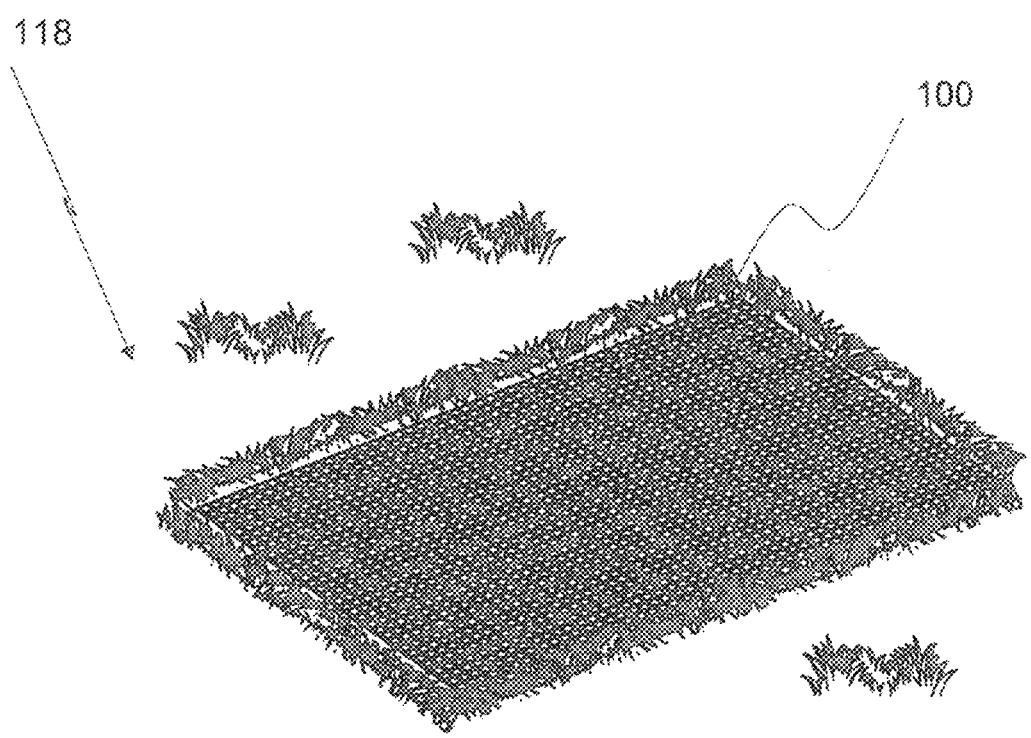
Figure 21:
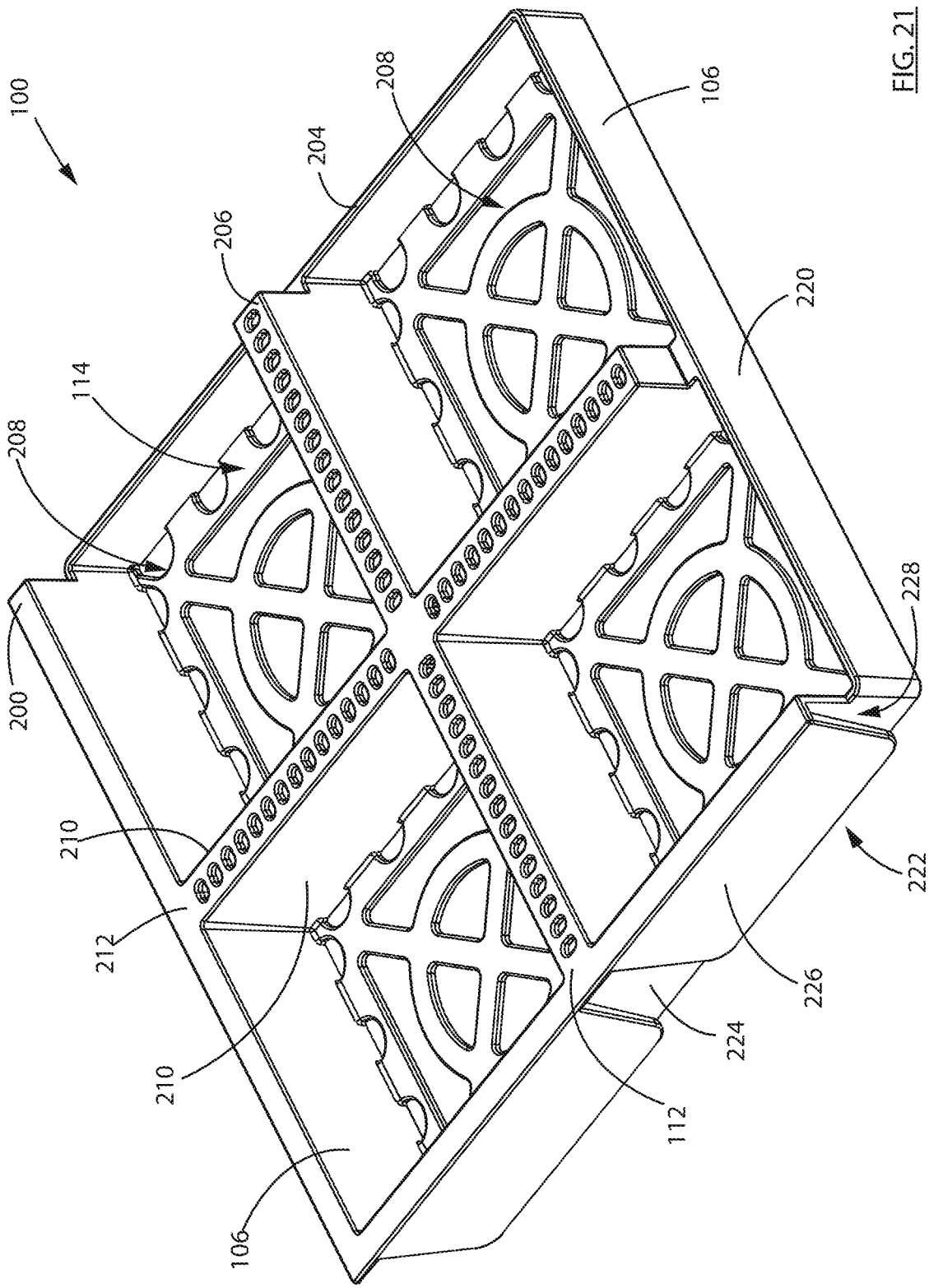
FIG. 21 is a top perspective view of another paving block.
Figure 22:
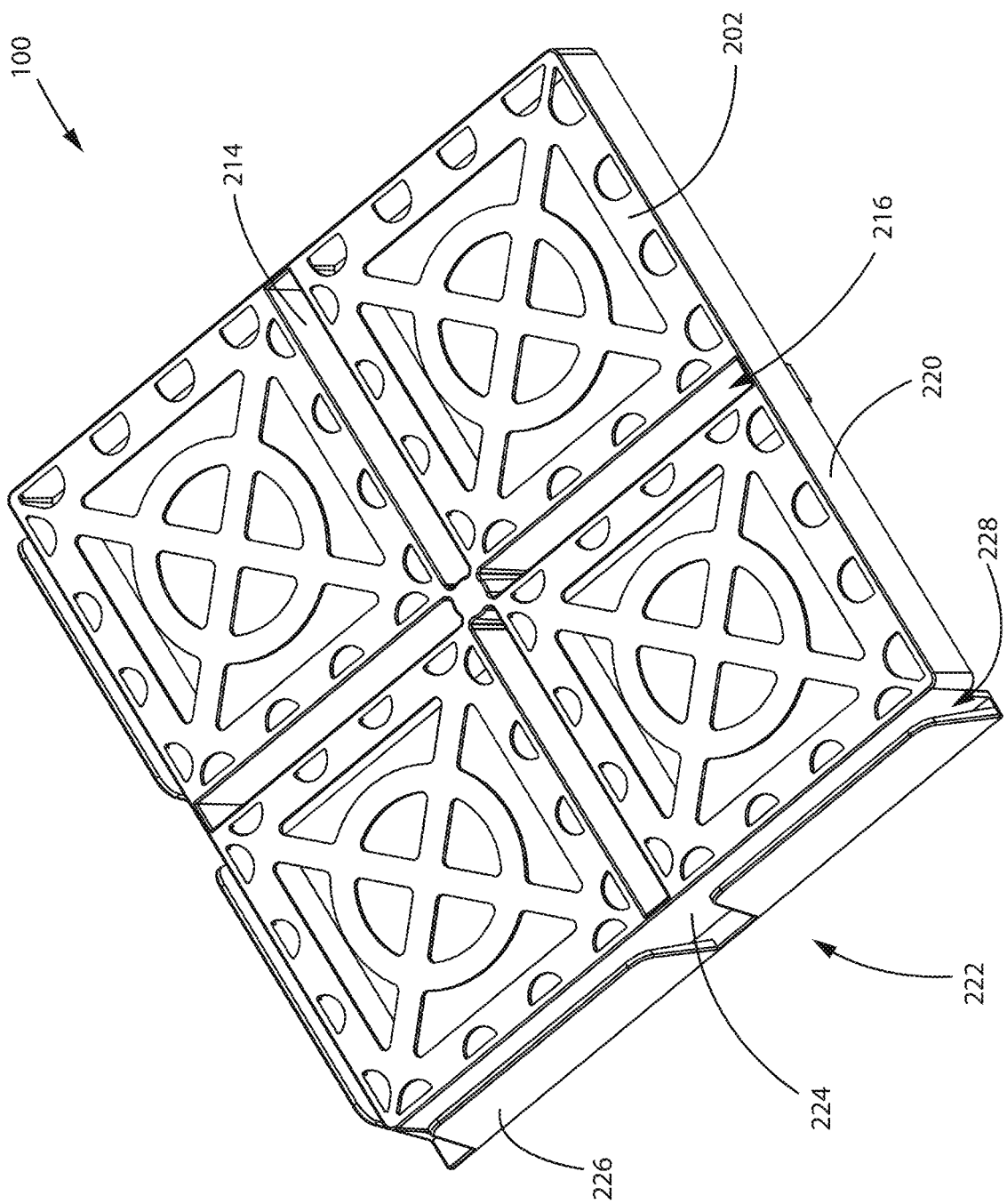
FIG. 22 is a bottom perspective view of the block of FIG. 21.
Figures 23A, 23B:
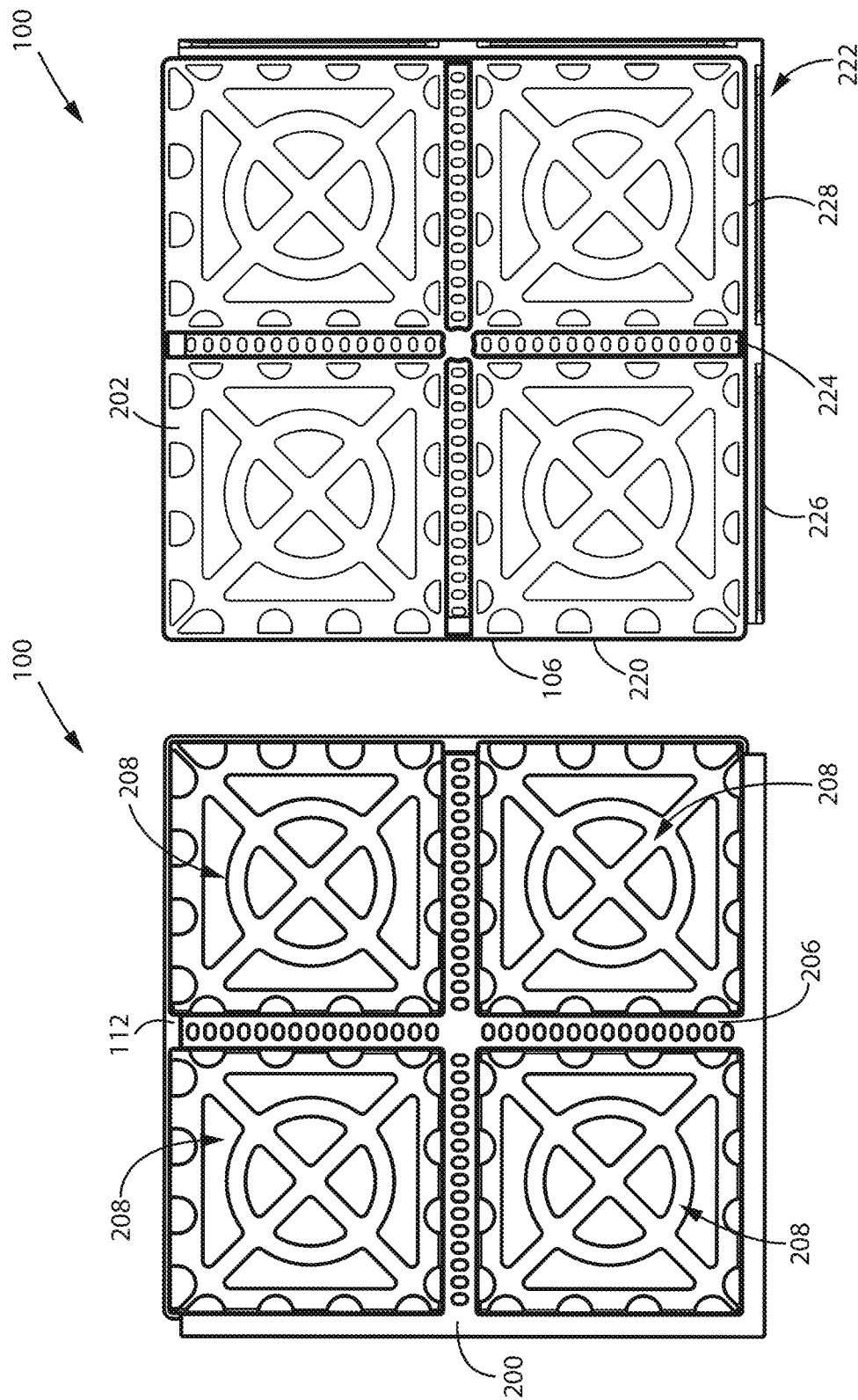
FIG. 23A is a top view of the block of FIG. 21.
FIG. 23B is a bottom view of the block of FIG. 21.
Figure 25:
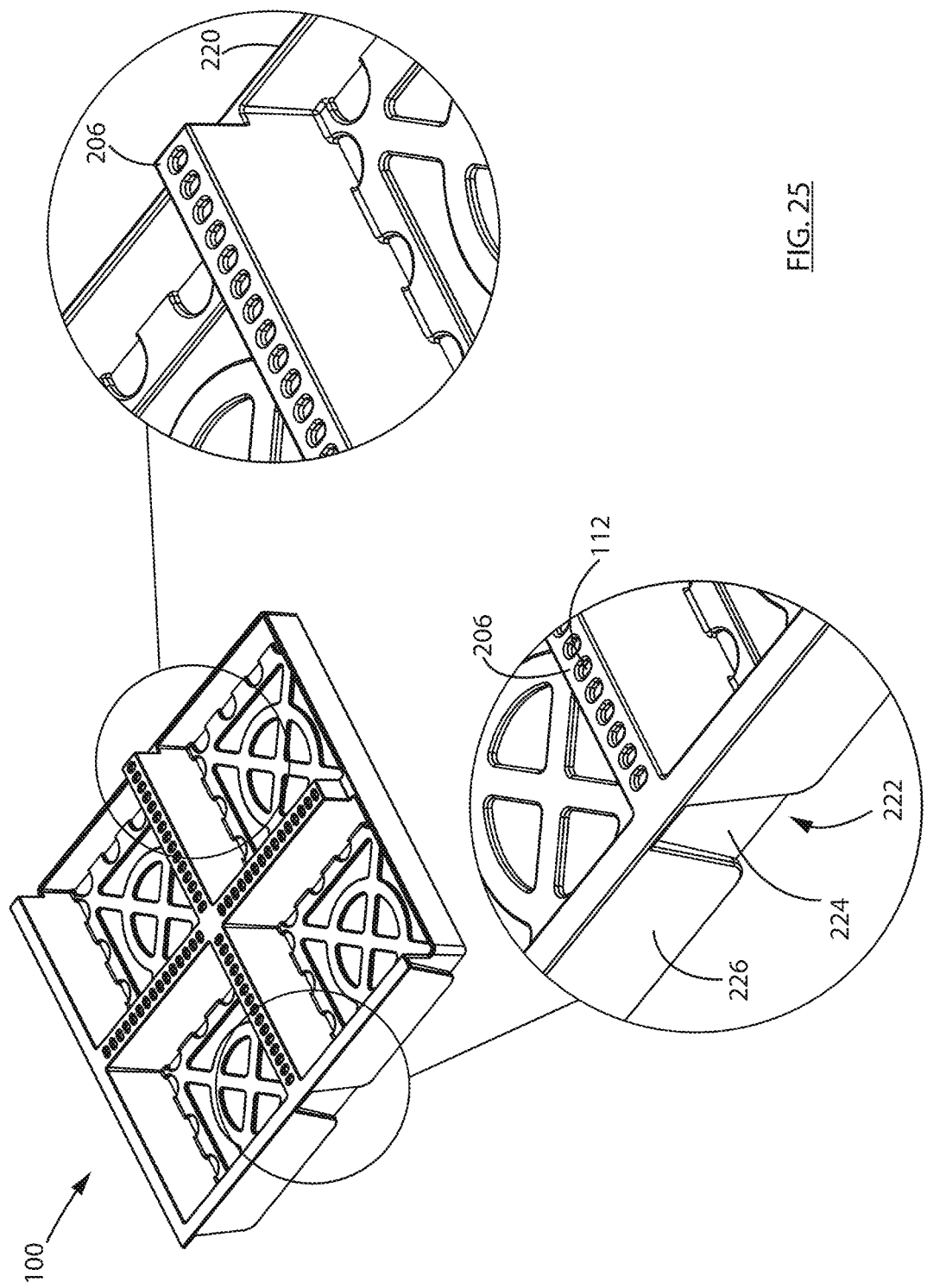
FIG. 25 is a perspective view of the block of FIG. 21 showing enlarged regions.
Figure 26:
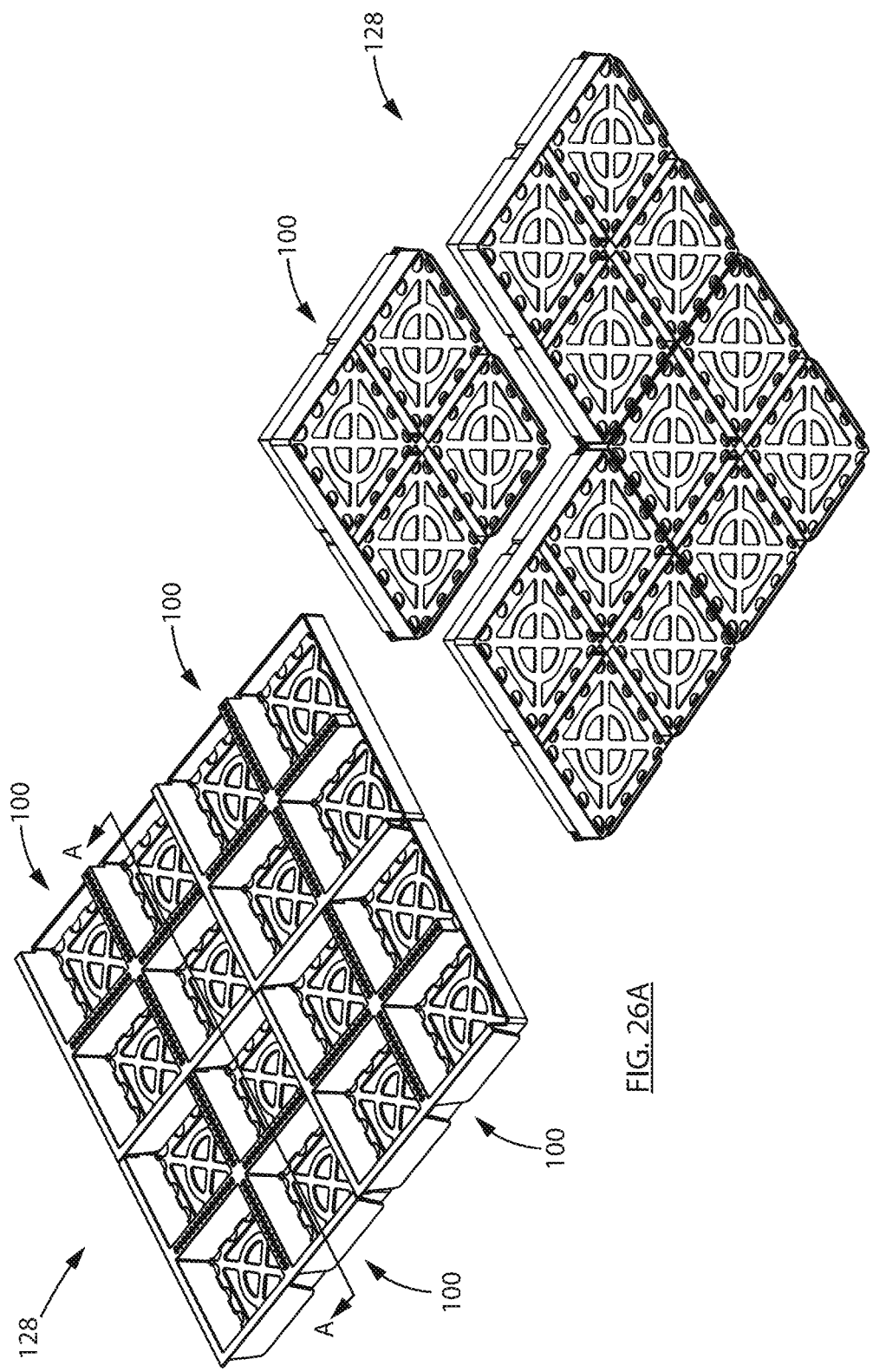
FIG. 26A is a top perspective view of an array of blocks of FIG. 21.
FIG. 26B is a bottom perspective view of an array of blocks of FIG. 21 with one block removed.
Figure 27:
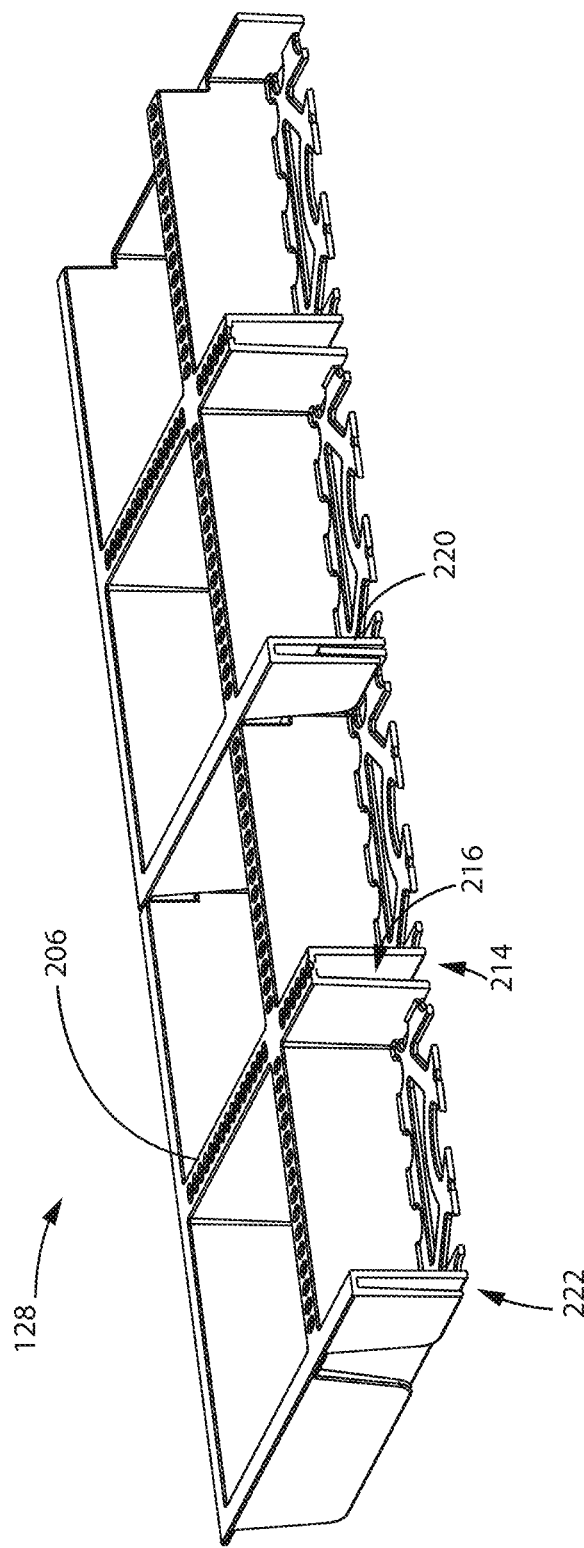
FIG. 27 is a sectional view of the array of blocks of FIG. 26A along the line A-A in FIG. 26A.
Figure 28:
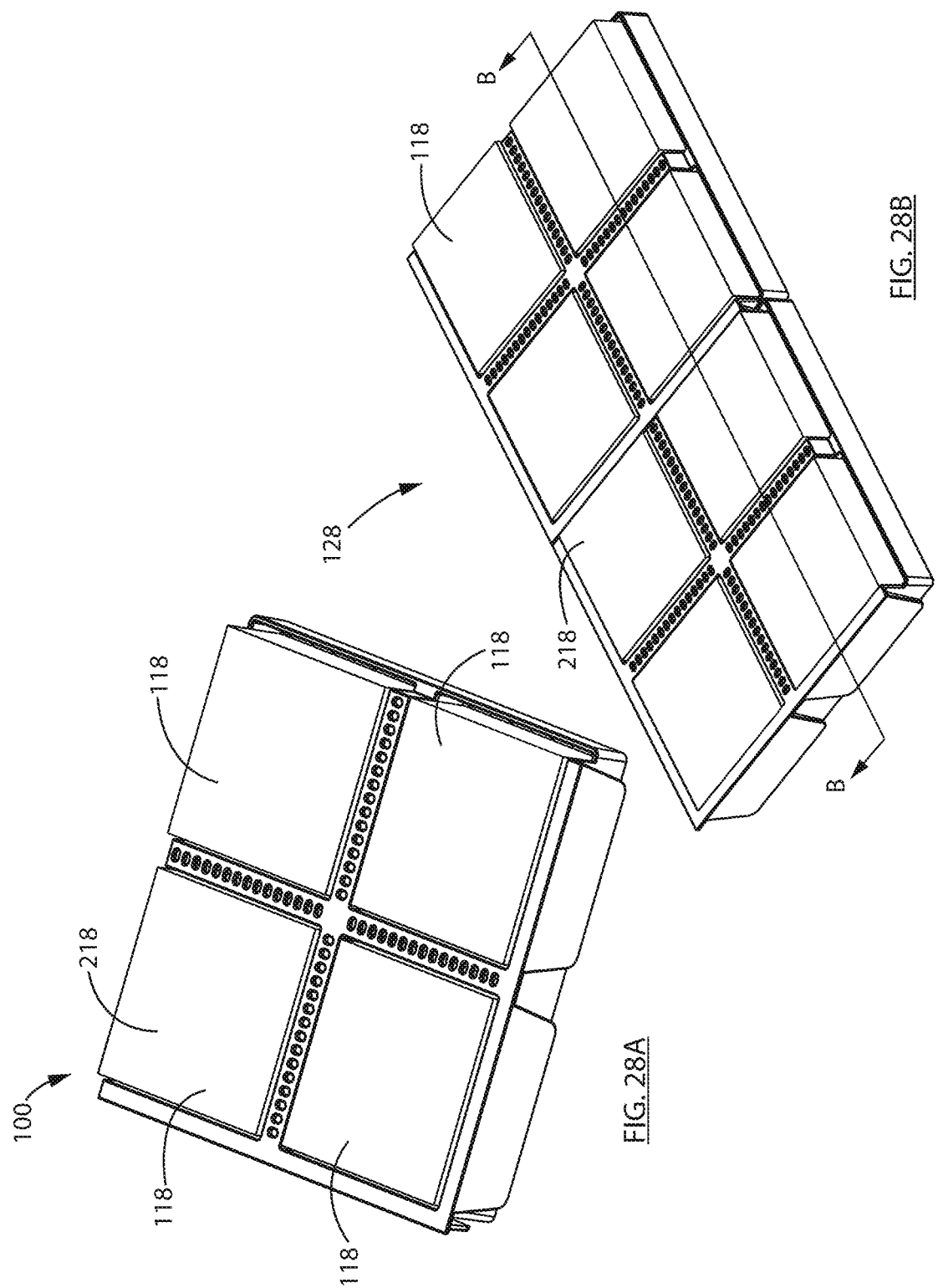
FIG. 28A is a top perspective view of the block of FIG. 21 with bricks inserted into the block.
FIG. 28B is a top perspective view of two interconnected blocks of FIG. 21 with bricks inserted into the blocks.
Figure 29:
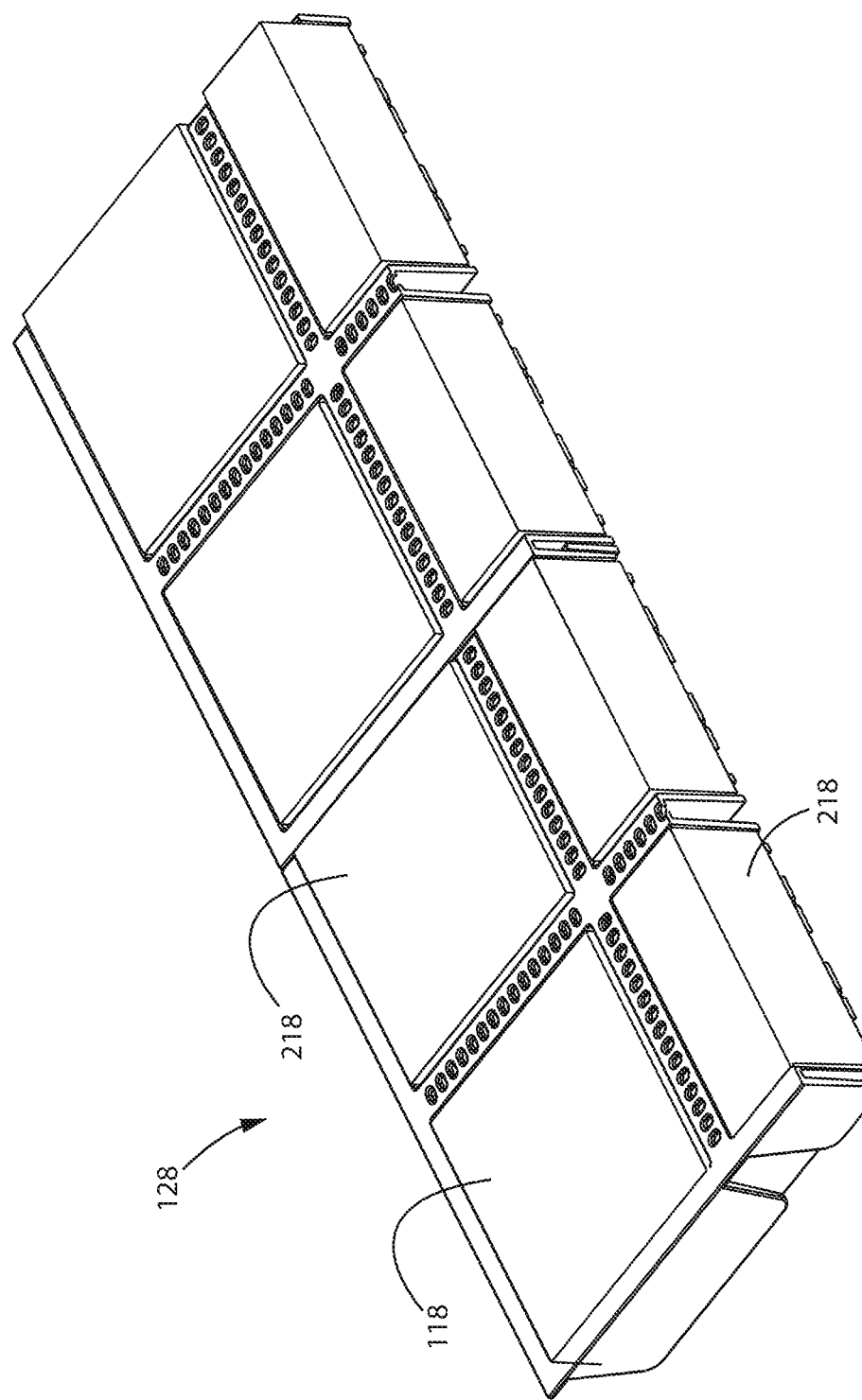
FIG. 29 is a sectional view of the two blocks of FIG. 28B along the line B-B in FIG. 28B.

As exemplified in FIG. 20, a plurality of blocks 100 may be used to provide a walking surface 118 (such as a patio, a walkway around a pool, a sidewalk, etc.). It will be appreciated that the blocks 100 may be secured together by any means known in the art. As exemplified in FIG. 2, the illustrated example block 100 is rectangular and has four sidewalls. Block 100 includes at least one first engagement member, exemplified as male interlocking features 124 projecting from two sidewalls 106 and at least one mating second engagement member, exemplified as female interlocking features 126 formed in the other two sidewalls 106. Male and female interlocking features 124, 126 may be used to interlock block 100 with adjacent similarly-shaped blocks to form an array of blocks. Several example engagement means are discussed subsequently.

Figure 5:
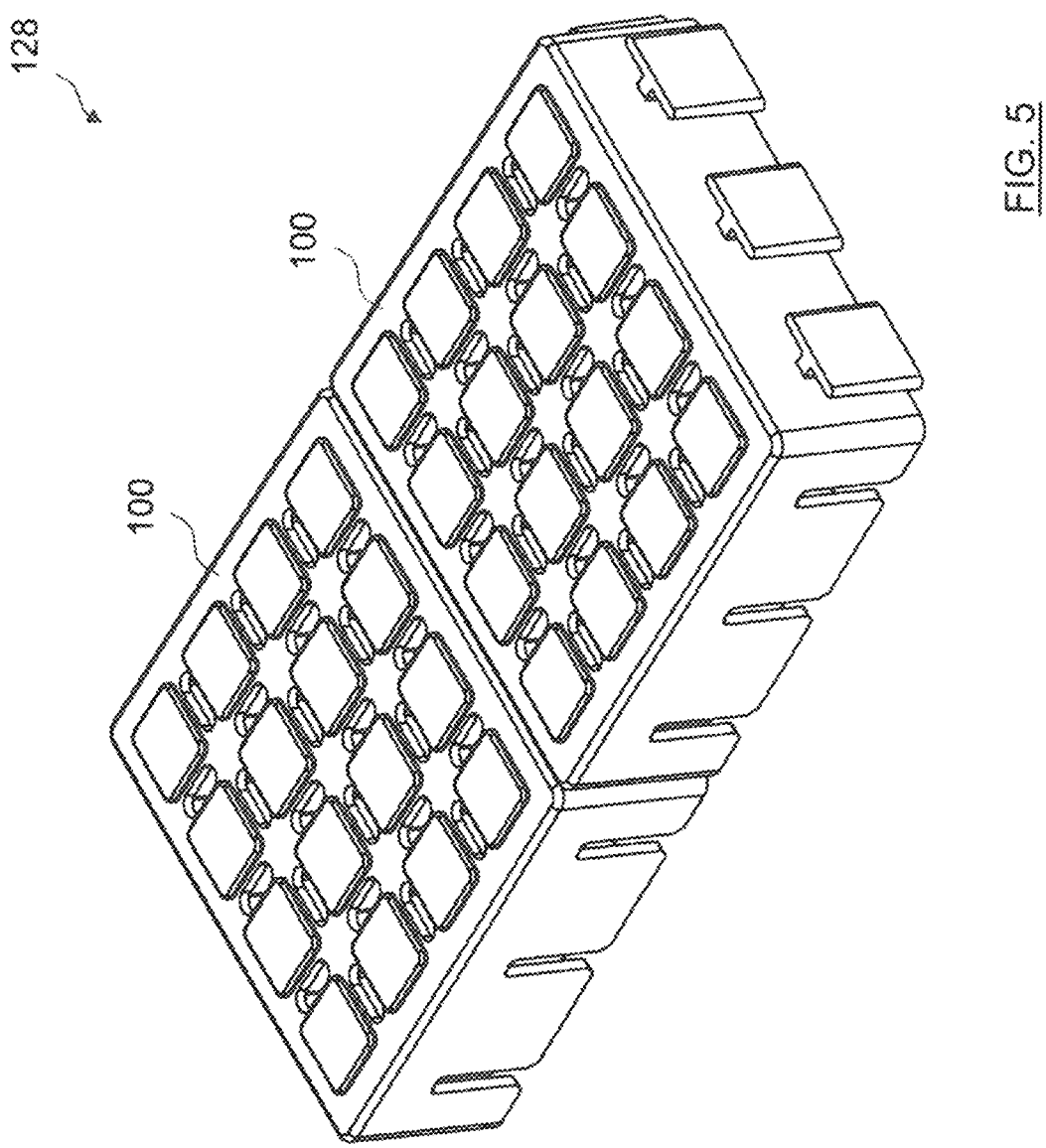
FIG. 5 is a top perspective view of an array of plastic blocks.
Figure 6:
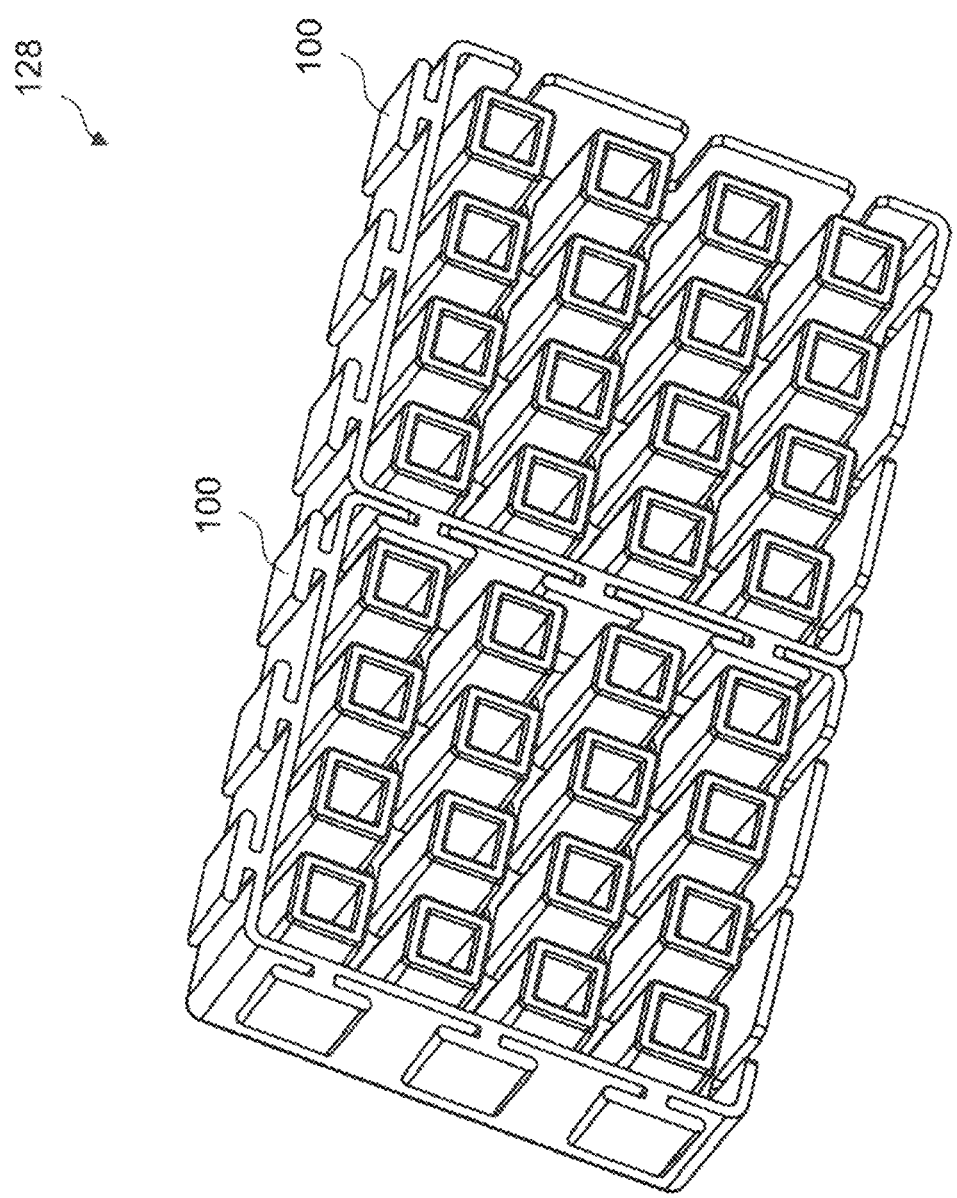
FIG. 6 is a bottom perspective view of the array of plastic blocks of FIG. 5.

Any number of blocks 100 may be used. As exemplified in FIGS. 5 and 6, an array 128 of blocks 100 may include two blocks. In the illustrated example, two blocks 100 are interconnected, with male interlocking features 124 of one block directly coupled to female interlocking features 126 of the other block. It will be appreciated that further blocks 100 may be added to the edges of array 128 to increase the size of the array 128 and the available top surface. Additional blocks 100 may be attached using the same or a different method.

It will also be appreciated that the blocks 100 may be set into any surface that will support the blocks to provide a walking surface. The blocks 100 may be permanently positioned in the ground (e.g., by being set in cement) of they may be removable (e.g., the may be set in sand).

In other embodiments, another panel or wall or a combination of panels and/or walls may form an outer face of the blocks 100 when the blocks will installed. For example, a sidewall of the blocks 100 may be exposed, e.g., if the blocks 100 are used to build a retaining wall of the like. In any such case, the outer wall or walls may be treated as disclosed herein.

The outer surface may have any desired profile. For example, if the block 100 is for use to form a walking surface 118, then all or the uppermost portions of the block (when installed) may have a planar surface. In the exemplified embodiment, top panel 104 includes a plurality of raised surface features or areas 110. In the illustrated example, raised areas 110 are rectangular projections. It will be appreciated that raised areas 110 may be provided, for example, for tactile or aesthetic purposes.

The raised areas 110 are vertically positioned above the remainder of outer face 102. As exemplified, optionally a plurality of drainage holes 112 distributed across the lower portion of outer face 102. Drainage holes may be openings that lead to an interior of block 100. Accordingly, when it rains, water may flow through the drainage holes 112 to travel through the walking surface 118 to the ground, thereby inhibiting the formation of puddles on walking surface 118.

Optionally, when installed, only the raised areas 110 may be visible. The remainder of the upper face 102 may be covered, e.g., with sand, soil or the like, so as to overlie the lower portion of upper surface 102 that has the drainage holes 112.

The interior 114 of block 100 may be of any design. If block 100 is to be load bearing (e.g. a walking surface 118), then the interior 114 may be constructed to provide support for the upper surface 102. Further, if drainage holes 112 are provided, then the interior 114 of the block may be configured to provide drainage channels to enable water to flow through drainage holes 112 and out the bottom of the block 100. Several example drainage means are discussed subsequently.

Figure 2:
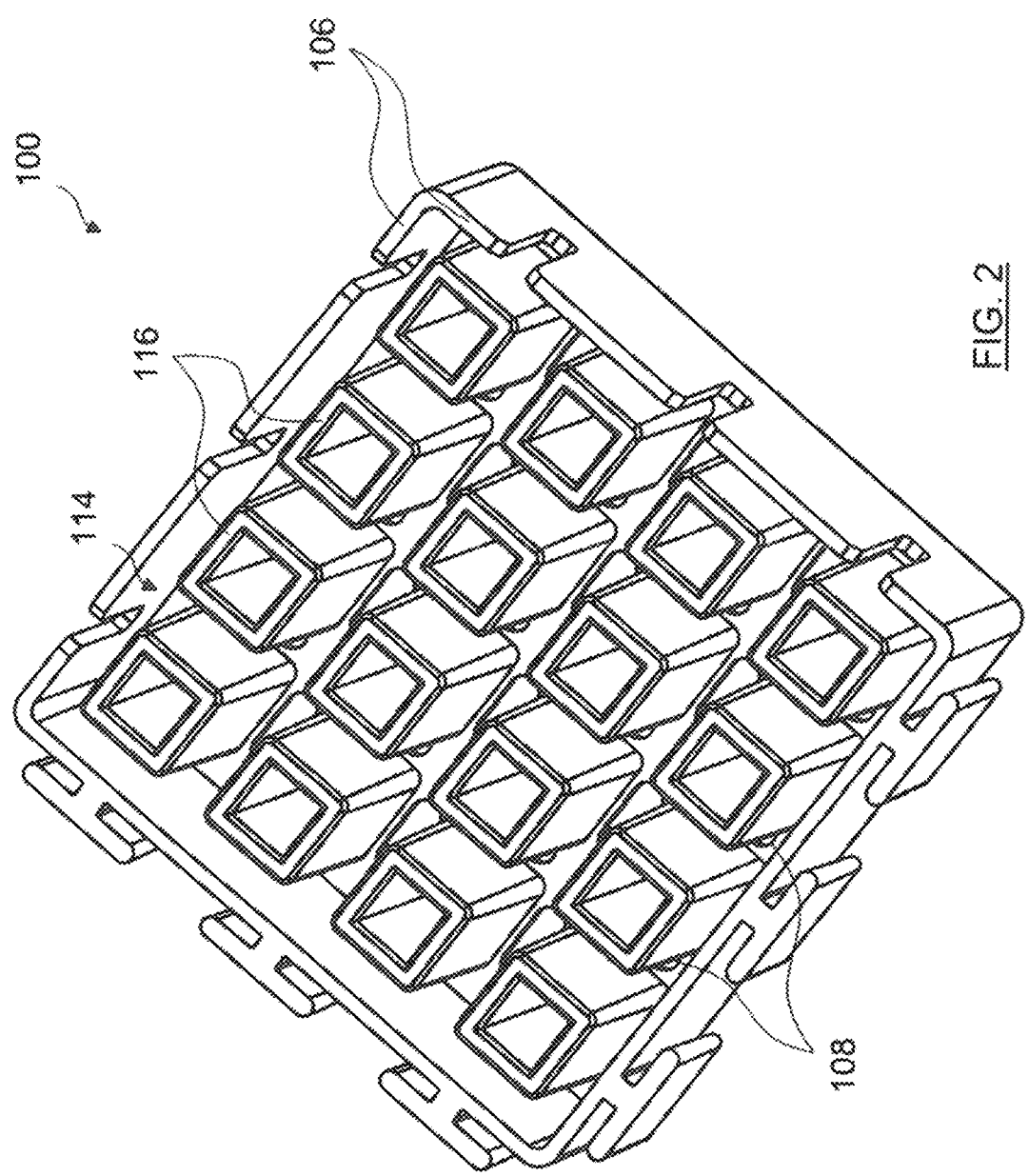
FIG. 2 is a bottom perspective view of the plastic block of FIG. 1.

As exemplified in FIG. 2, an interior 114 of block 100 is defined by sidewalls 106 and a plurality of internal supports 116 depending downwardly from the inner surface of top panel 104. In the example embodiment, a bottom of block 100 is open to allow easy drainage out of the interior 114. While internal supports 116 may be of any shape, they are exemplified as rectangular supports projecting from the inner surface or underside of top panel 104 and optionally are each opposite a surface feature 110. The internal supports 116 may be spaced apart to define flow channels for water. Also, when set in the ground, material, e.g., sand, may be received inside the channels between adjacent internal supports 116, as well as within internal supports 116 if internal supports 116 are hollow.

Coating for a Block

A coating 120 may be provided on outer face or faces of the block which are exposed once installed. In the illustrated examples, coating 120 is formed on a top of plastic block 100, however in other embodiments coating 120 may be formed on another outer face in addition to or in alternative to a top surface. For example, coating 120 may be formed on a bottom and/or side of plastic block 100.

Figure 3:
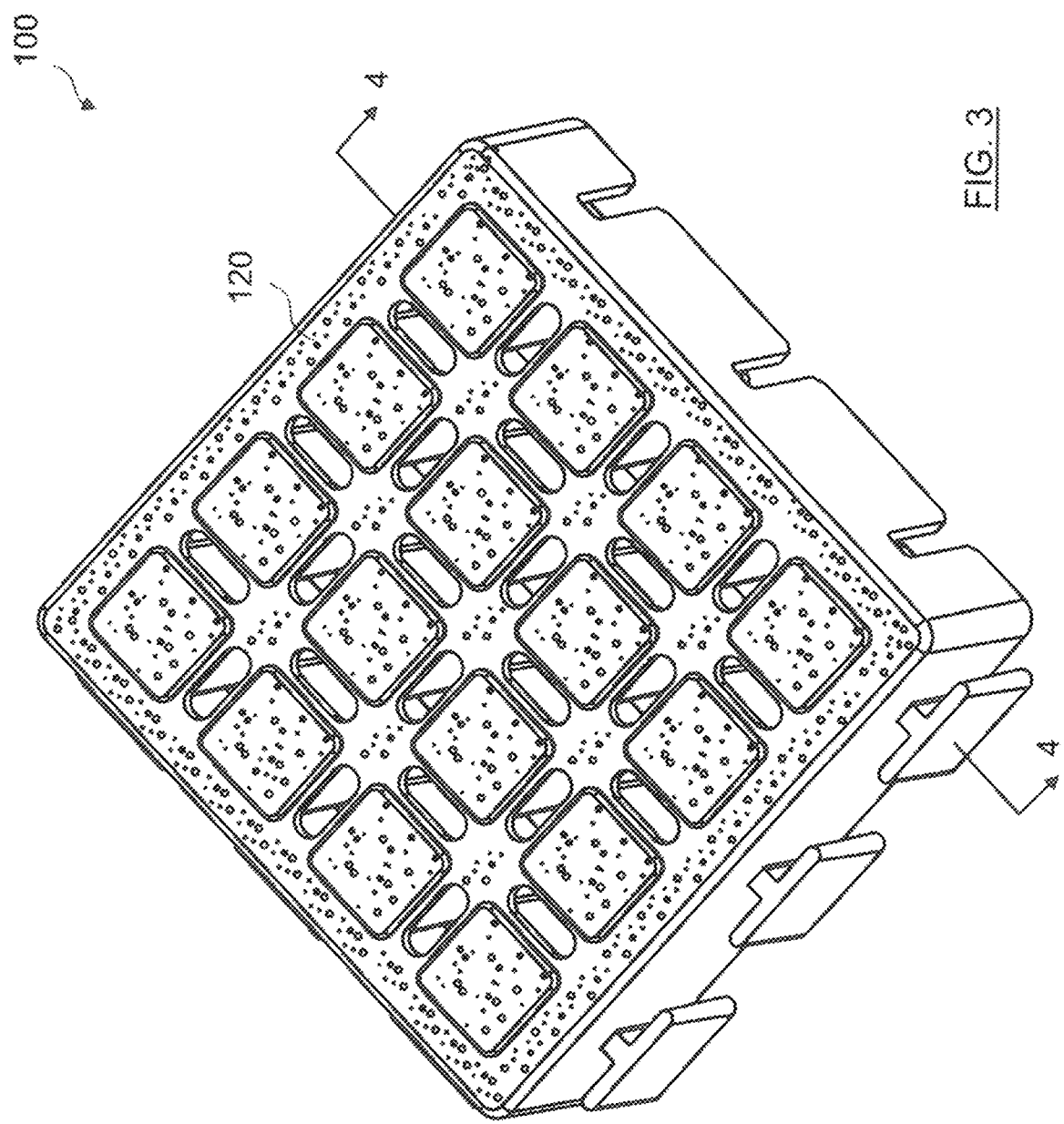
FIG. 3 is a top perspective view of the plastic block of FIG. 1, with a coating of UV resistant material applied to all upper surfaces.
Figure 7:
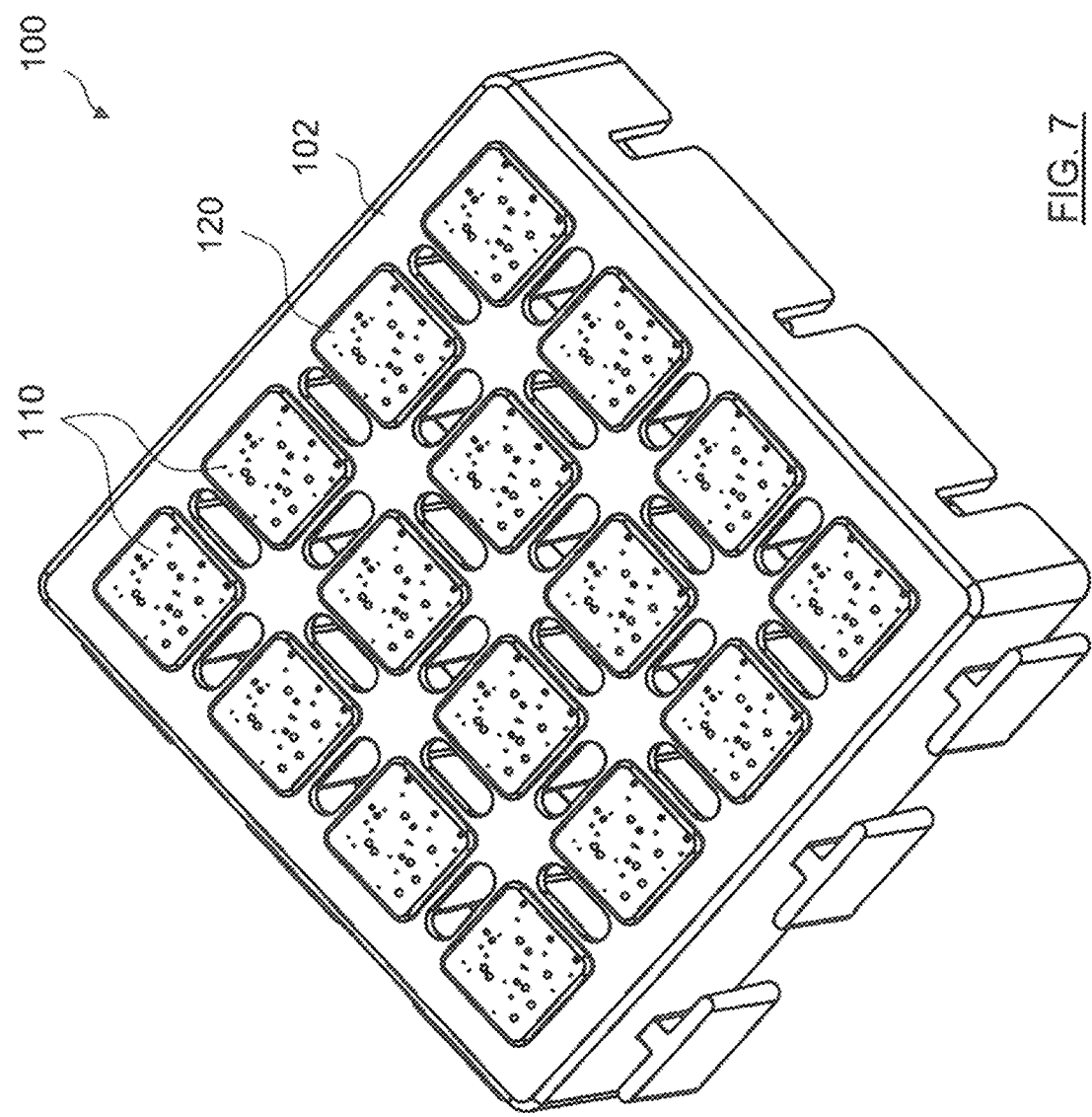
FIG. 7 is a top perspective view of the plastic block of FIG. 1, with a coating of UV resistant material applied only to the uppermost portions of the plastic block.

As exemplified in FIG. 3, coating 120 extends across the entire outer face 102 to protect the outer face 102, however in other embodiments a coating may coat only a portion of an outer face 102 or only a few areas of outer face 102. For example, as exemplified in FIG. 7, the UV resistant coating 120 is applied only to the raised areas 110. Optionally, coating 120 may only be applied to raised areas which are expected to be subject to a greater amount of UV radiation than surrounding areas and/or are to be exposed to a load (e.g., a person walking thereon). Accordingly, as exemplified in FIG. 7, coating 120 is applied to raised surface features 110.

Coating 120 includes a UV resistant material 108 that is provided on the outer surface(s) of plastic block 100. Examples of UV resistant material 108 include sand, titanium dioxide, crushed glass, a metallic powder, pumice, a UV stabilized plastic, concrete particulate material, pebbles, and fibers. Optionally, the UV coating comprises sand and one or more of titanium dioxide, crushed glass, a metallic powder, pumice, a UV stabilized plastic, concrete particulate material, pebbles, and fibers. Optionally, the UV coating consists essentially of or consists of sand.

Figure 4:
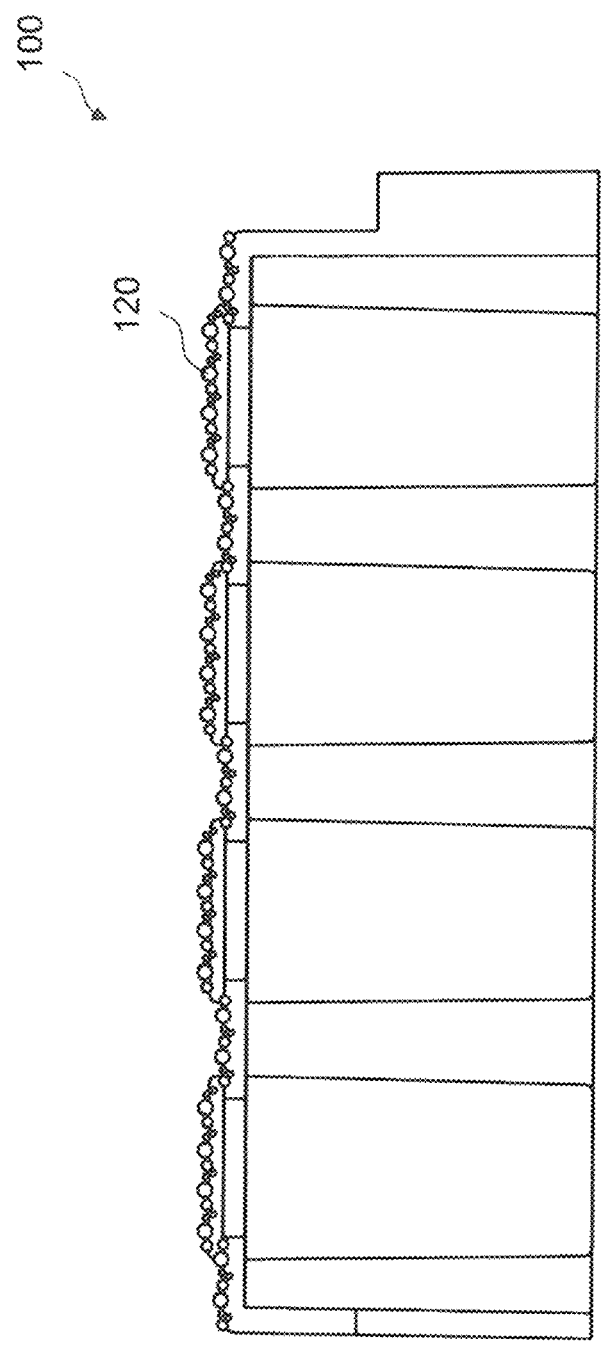
FIG. 4 is a cross-section view of the plastic block of FIG. 3, taken along line 4-4 of FIG. 3.

The coating 120 may be secured to the exposed face by various means. As exemplified in FIG. 4, the UV resistant material 108 is embedded in the exposed face (outer face 102) of block 100. While the UV resistant material 108 is embedded into the exposed face, it will be appreciated that part of the UV resistant material may be embedded into the material of block 100 and part may be positioned exterior to the exposed face. For example, 25%, 50% or 75% of the thickness of the UV resistant material 108 may be positioned internal of the material of the block 100 and the remainder may be positioned exterior thereto. Therefore, part of the material will remain visible and may form the outer exposed surface of block 100. In other embodiments, most or all of the UV resistant material 108 may be positioned into the exposed surface of the block 100.

A block 100 may be prepared (e.g., molded) as a single unitary structure. The entirety of the structure may be made of the same material (e.g., the block may have a homogeneous composition throughout). Alternately, only the exposed (e.g., upper) surface may be formed or a material designed to or capable of receiving the UV resistant material 108. For example, the block 100 may be made of, e.g., one or more of concrete, metal, a high melting point plastic, and the exposed surface may be provided with a layer which will receive the UV resistant material 108. For example, if the block is made of metal or concrete, then a layer of plastic may be provided to form part or all of the exposed surface. Alternately, if the block is made of a plastic, then a layer of lower melting point plastic may be provided to form part or all of the exposed surface.

Optionally, block 100 may comprise, consist essentially of or consist of one or more virgin plastic and/or one or more recycled plastic. In some embodiments, plastic block 100 includes a mix of two or more plastics each having a different melting temperature. In some embodiments, a temperature sufficient to melt plastic block 100 is a temperature sufficient to melt the plastic in a mix of plastics which has the highest melting temperature. In other embodiments, a temperature sufficient to melt plastic block 100 is a temperature sufficient to melt the plastic in a mix of plastics which has the lowest melting temperature or the lower melting temperatures.

As discussed previously, in some embodiments, block 100 may have a layer of plastic over a body of another material, and a temperatures sufficient to melt plastic block 100 is a temperature sufficient to melt the plastic layer. For example, a block 100 may have a body composed of metal or mixed plastic and a layer of virgin plastic for the exposed surface. An advantage of using virgin plastic is that it will have a known melting temperature.

In some embodiments, plastic block 100 includes a block body on which a plastic layer is applied as a coating, such as by spraying the block body with plastic layer when the plastic binder is in a heated and fluid state. UV resistant material 108 may be embedded in the plastic layer coating to form a coating of UV resistant coating 120 embedded in the plastic layer.

Plastic block 100 is illustrated as a patio paver. However plastic block 100 may also be formed in many other shapes. For example, plastic block 100 may be formed as a roof tile, roofing sheet, roofing shingle, evestrough, plastic window, skylight, siding, brick, block, interlocking brick, interlocking block, indoor flooring, water pipe, sewer pipe, electrical conduit, bumper, watercraft, hat, helmet, protective clothing, clothing, car body part, dock, railway tie, chock, speed bump, lumber, or furniture item. Outer face 102 may include any one or more surface of a block 100 that is exposed when installed.

Method of Making a Block

Figure 8:
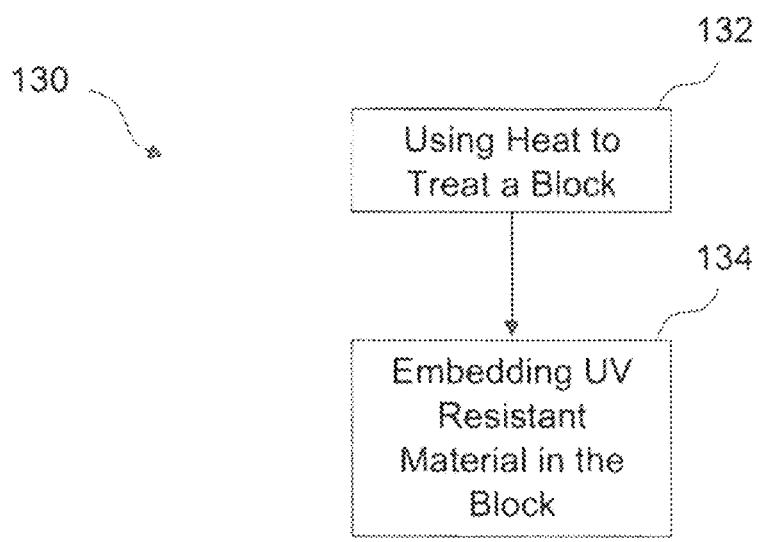
FIG. 8 is a flow diagram of a method of treating a plastic block using heat.

Various methods may be used to provide the UV resistant material 108. Several example methods are discussed subsequently. Optionally, as exemplified in FIG. 8, the method 130 comprises providing heat to an existing block (e.g., a block which has been installed) at step 132 to provide a layer of plastic that has softened to an extent such that the UV resistant material 108 may be applied thereto (step 134).

Alternately, the UV resistant material 108 may be provided during the manufacture of a block 100 such that the UV resistant material 108 is provided only on the intended exterior face of the block 100 or not to the entirety of the material used to form the block 100.

The heat is optionally provided so as not to compromise the structural integrity of a block. For example, if the entirety of a block is heated, then the block may deform prior to or as the coating is applied. Alternately, or in addition, the block may shrink or deform in shape. Therefore, if a coating is applied to an existing block, optionally heat is provided essentially only to heat the portion of the block that is to receive the coating. Accordingly, in some embodiments, only an upper portion 140 of the plastic block, which comprises the outer face 102, is heated to a temperature about or above the melting point of the plastic block 100. For example, only the upper 5%, 10%, 15%, 20% of the thickness (height) of the plastic block 100, which comprises the outer face 102, may be heated to a temperature about or above the melting point of the plastic block.

Figure 9A:
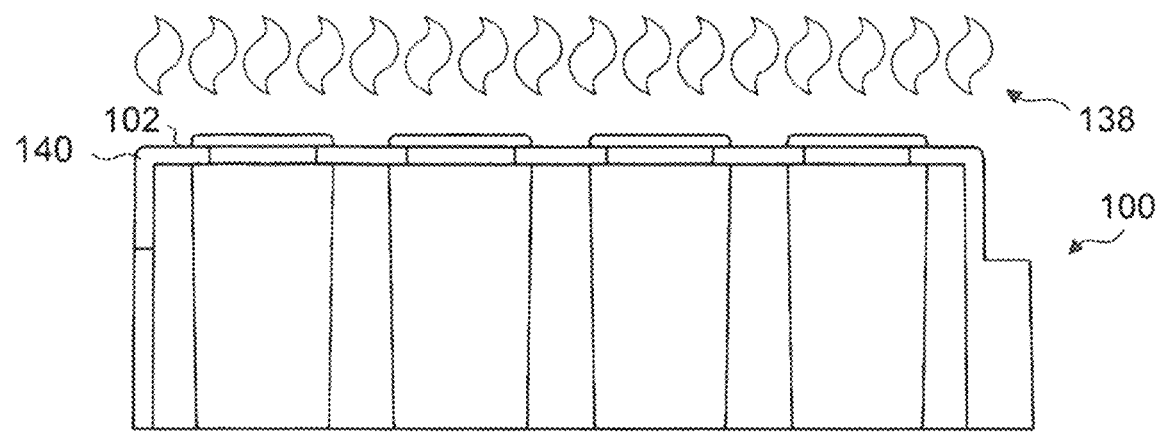
FIG. 9A is a schematic cross-section view of heat being applied to a plastic block.
Figure 9B:
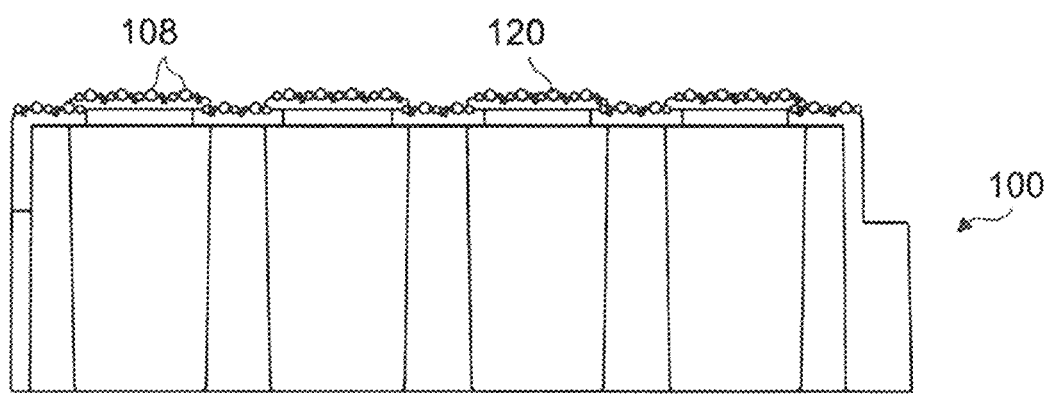
FIG. 9B is a schematic cross-section view of the plastic block of FIG. 9A coated with a coating of UV resistant material.

FIGS. 9A and 9B exemplify a method 130. Block 100 is shown in cross section. At step 132, an example of which is illustrated in FIG. 9A, heat 138 is used to treat block 100. In the illustrated example, heat 138 is applied to an outer face 102 of block 100. Applying heat 138 may include heating the outer face 102 to a temperature at which the UV resistant material 108 is embeddable in the outer face 102.

Heat 138 may be provided, directly to the block 100 itself, or to a material that is then used to heat the block 100. For example, heat may be applied to the block by exposing the block to an infrared source, an electric heater, and/or a flame. In some embodiments, heat is provided by a chemical reaction adjacent the UV resistant material 108, such as by mixing the UV resistant material with a reactant mixture. For example, sand may be mixed with iron powder and/or other materials, and a heat-releasing reaction triggered to heat the UV resistant material 108 and/or the outer face 102 if the reaction takes place on or adjacent the outer face 102. Alternately, the coating material itself may be heated and therefore, the coating material may itself be the agent that is used to heat the block.

In some embodiments, heating the outer face 102 includes heating to a temperature at which the UV resistant material 108 is embeddable in the outer face 102 but below the melting point of the plastic block 100. For example, the outer face 102 may be heated to a temperature which is from, e.g., 40° C. to 5° C., 30° C. to 5° C., 30° C. to 10° C. below the melting point of the plastic block. In other embodiment, the upper portion may be heated to a temperature above the melting point, e.g., 5, 10, 15, 20, 25° C. above the melting point of the plastic block.

Optionally, to heat only the upper portion 140 of the block 100, the heat may be applied rapidly. The length of time during which heat is applied will depend, inter alia, on the temperature of the heat source, the melting point of the upper portion and the proximity of the heat source to the upper surface. For example, the upper surface may be heated to a desired embedding temperature in 5, 10 or 15 seconds or less.

Heat 138 may result in a softened outer face 102 of plastic block 100 which may facilitate embedding a UV resistant material 108 into the outer face 102 of the plastic block 100. For example, less force may be required to embed UV resistant material 108 in a softened outer face 102 than would be required to embed UV resistant material 108 in an unsoftened outer face 102.

At step 134, an example of which is illustrated in FIG. 9B, UV resistant material 108 is then embedded is the outer face 102 of block 100. In some embodiments, step 134 includes providing the UV resistant material 108 on the outer face 102 once the outer face 102 has been heated to a temperature at which the UV resistant material is embeddable in the outer face. Once embedded, the UV resistant material 108 provides a coating 120 on the outer face 102.

Figure 10A:
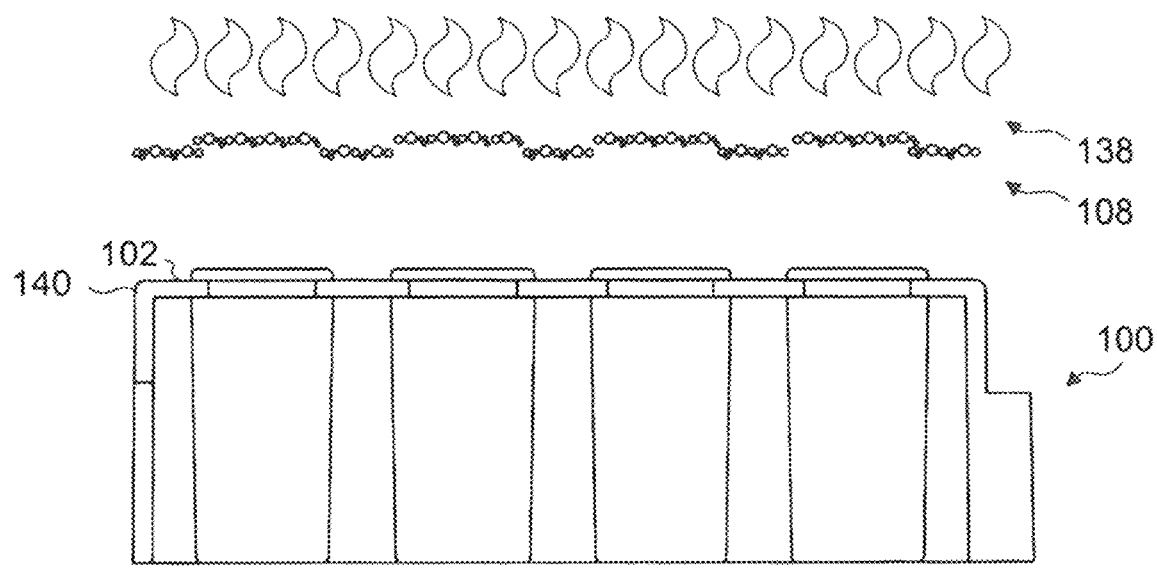
FIG. 10A is a schematic cross-section view of heat being applied to UV resistant material, which is to be embedded in a plastic block.
Figure 10B:
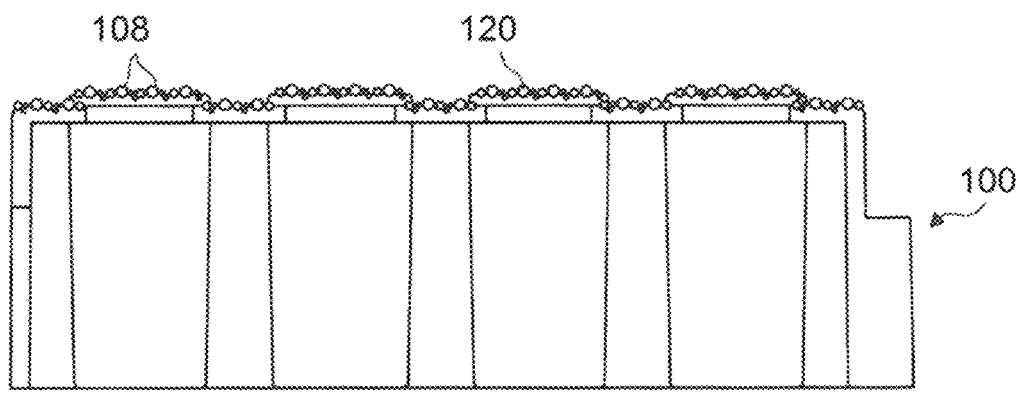
FIG. 10B is a schematic cross-section view of the plastic block of FIG. 10A coated with a coating of UV resistant material.

FIGS. 10A and 10B exemplify an alternative example of method 130 wherein the UV resistant material 108 is heated and the heated UV resistant material 108 is used to heat the upper surface of block 100. As illustrated in FIG. 10A, the UV resistant material 108 is heated to obtain heated UV resistant material 108. As illustrated in FIG. 10B, at steps 132 and 134 the heated UV resistant material is provided to the outer face and is embedded in outer face 102 to provide a coating 120.

While FIG. 10A illustrates UV resistant material 108 heated prior to being provided to outer face 102, UV resistant material may also or alternatively be heated as it is being provided to outer face 102 or after being provided to outer face 102. For example, in some embodiments UV resistant material 108 may be dropped onto outer face 102 and may pass through a heated space as it falls between a dispensing point and a point of contact with outer face 102.

In some embodiments UV resistant material 108 is heated to between 10° C. and 200° C., 10° C. and 100° C., 20° C. and 75° C., 30° C. and 60° C. above the melting point of the outer face 102. In some embodiments, supplying heat to outer face 102 during or before providing the UV resistant material may allow a lower temperature UV resistant material 108 to be used.

In some embodiments, block 100 may be carried on a conveyor under a dispensing location. UV resistant material 108 may be dispensed from the dispensing location and may fall through a heated space onto block 100 as block 100 passed beneath. In some embodiments, excess UV resistant material is gathered from around or on the conveyor and returned to the dispensing location to be re-dispensed.

In some embodiments the heated UV resistant material 108 provides at least 75% of the heat, and in some embodiments the heated UV resistant material 108 provides all or at least substantially all of the heat.

It will be appreciated that concurrently with, or subsequent to, providing the UV resistant material to the block 100 (whether the block 100 is heated prior to, during or subsequent to the UV resistant material being provided to the exposed surface of the block 100), the block 100 with the UV resistant material may be subjected to a compressive force so as to embed the UV resistant material into the exposed surface.

For example, the UV resistant material may be conveyed at a speed (under force) to the exposed surface such that the UV resistant material will be embedded into the exposed surface.

Figure 11:
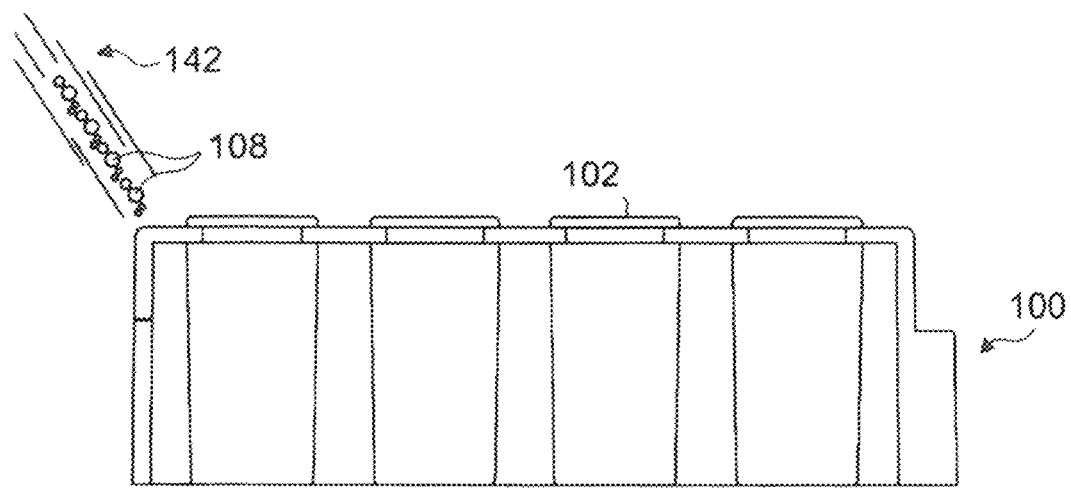
FIG. 11 is a schematic cross-section view of UV resistant material conveyed by an air stream to a plastic block.

As exemplified in FIG. 11, the UV resistant material 108 may be conveyed pneumatically (by an air stream 142) to the outer face. For example, an air stream 142 may be produced by a compressed gas. In some embodiments, an air stream 142 may be used to draw UV resistant material 108 from a supply container using, e.g., a venturi system in which air stream 142 is directed past an opening in the supply container. In some embodiments, heat 138 is supplied to the UV resistant material 108 as the material 108 is carried in air stream 142.

Figure 12:
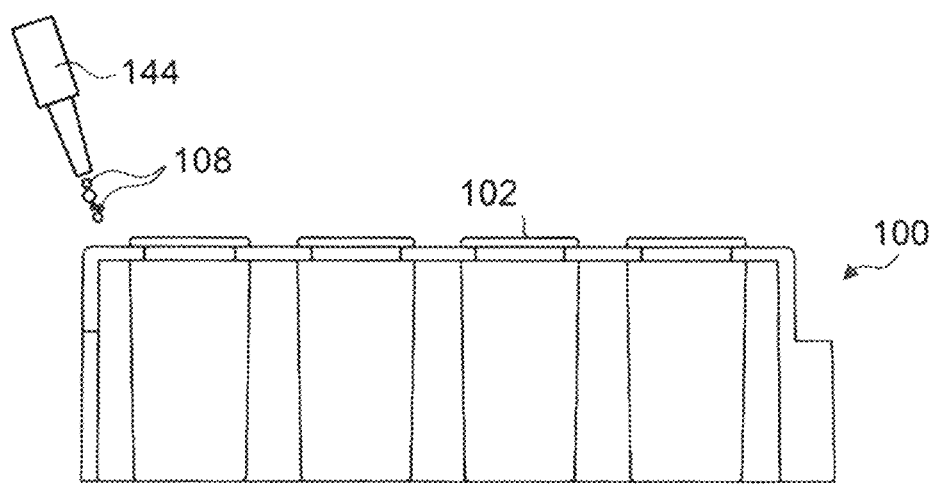
FIG. 12 is a schematic cross-section view of UV resistant material ejected by an apparatus towards a plastic block.

As exemplified in FIG. 12, the UV resistant material 108 may be ejected from an apparatus 144 towards the outer face 102. In the illustrated example, apparatus 144 is a nozzle. However, other apparatus 144 may also be used. For example, apparatus 144 may be a spinning disk on which UV resistant material 108 is placed, and the UV resistant material 108 may then be ejected from off an edge of the disc towards an outer face 102 of block 100. In some embodiments, heat 138 is supplied to the UV resistant material between apparatus 144 and block 100.

In some embodiments, a block 100 may be moving relative to a supply of UV resistant material 108. For example, a block may be on a moving belt while a stream of UV resistant material 108 is ejected from a stationary apparatus 144 above or beside block 100. In some embodiments, UV resistant material 108 may be provided across an entire width of an outer face 102 of a moving block 100 so that the entire face 102 is coated as block 100 moves through the supply of UV resistant material 108.

Figure 13:
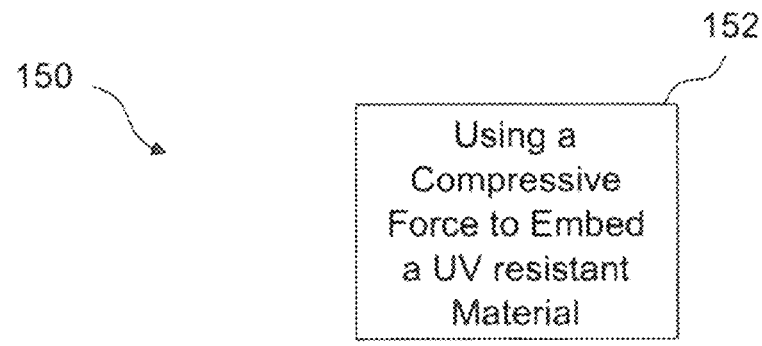
FIG. 13 is a flow diagram of a method of treating a plastic block using compressive force.
Figure 14:
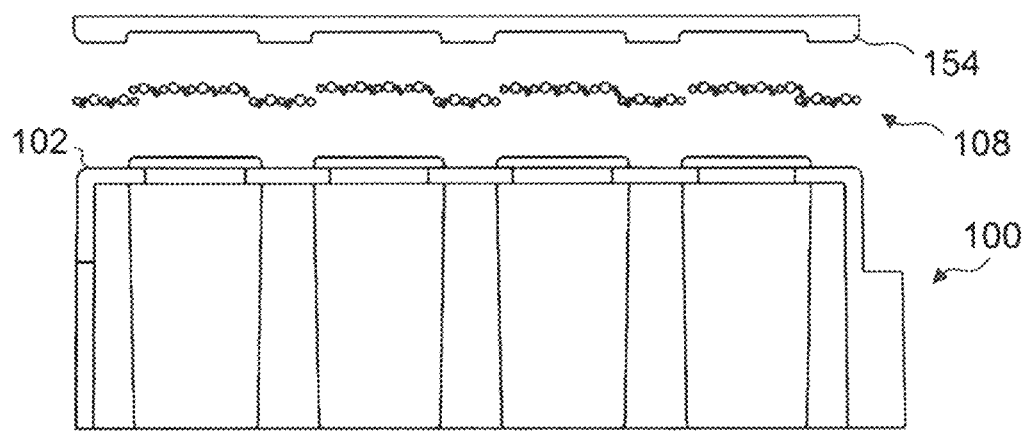
FIG. 14 is a schematic exploded cross-section view of UV resistant material compressively applied to a plastic block.

Alternately, or in addition, a compressive force may be applied to embed, or assist in embedding the UV resistant material 108 into the outer face once the UV resistant material 108 has been provided to the outer face. Accordingly, FIG. 13 exemplifies a method 150 for treating a plastic block 100 comprises using, at step 152, a compressive force to embed a UV resistant material into an outer face 102 of the plastic block wherein, once embedded, the UV resistant material 108 provides a coating 120 on the outer face 102. As exemplified in FIG. 14, a pressure surface 154 may be used to provide a compressive force to press UV resistant material 108 into face 102.

Figure 15:
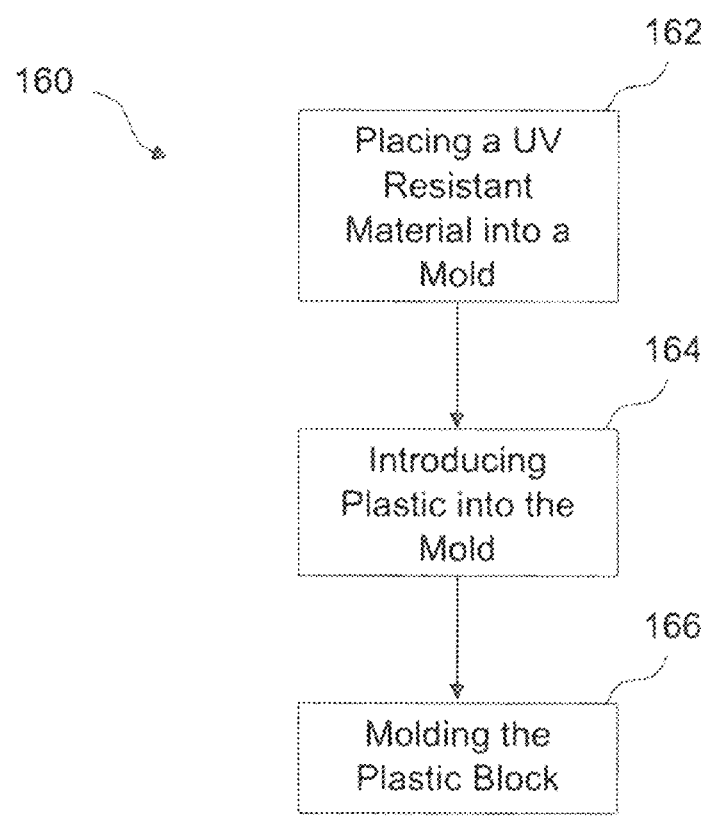
FIG. 15 is a flow diagram of a method of molding a plastic block.

Alternately, the UV resistant material 108 may be incorporated into a block 100 as the block is formed. FIG. 15 exemplifies a method 160 of molding a plastic block 100 wherein one side of a mold forms an outer face 102 of the plastic block 100.

Method 160 includes placing a UV resistant material into a mold at step 162, whereby the UV resistant material 108 is on the side of the mold that forms the outer face. Method 160 includes introducing plastic into the mold at step 164, molding the plastic block at step 166 such that the UV resistant material 108 forms a coating 120 on the outer face 102 of the plastic block 100 (e.g., it is the outer face of the block 100 as the block is removed from the mold).

Figure 16A:
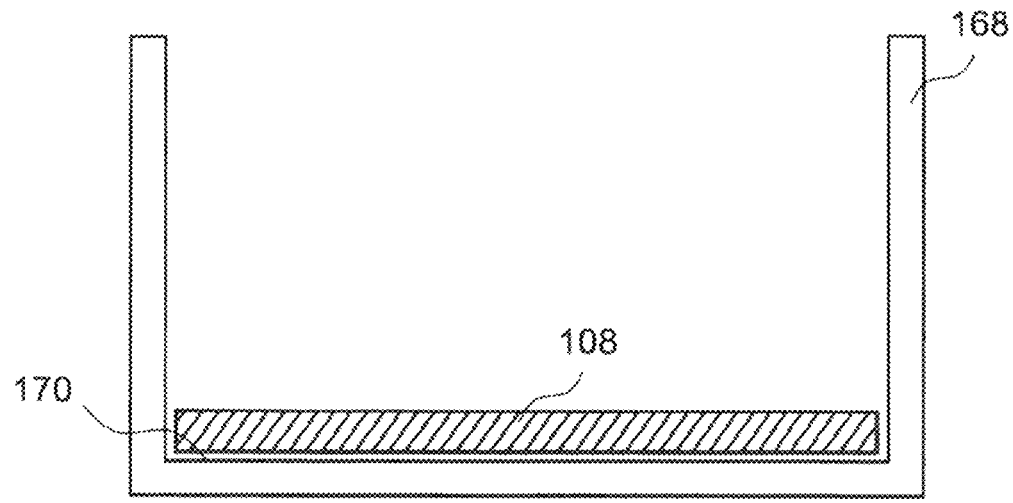
FIG. 16A is a schematic cross-section view of a mold containing UV resistant material.
Figure 16B:
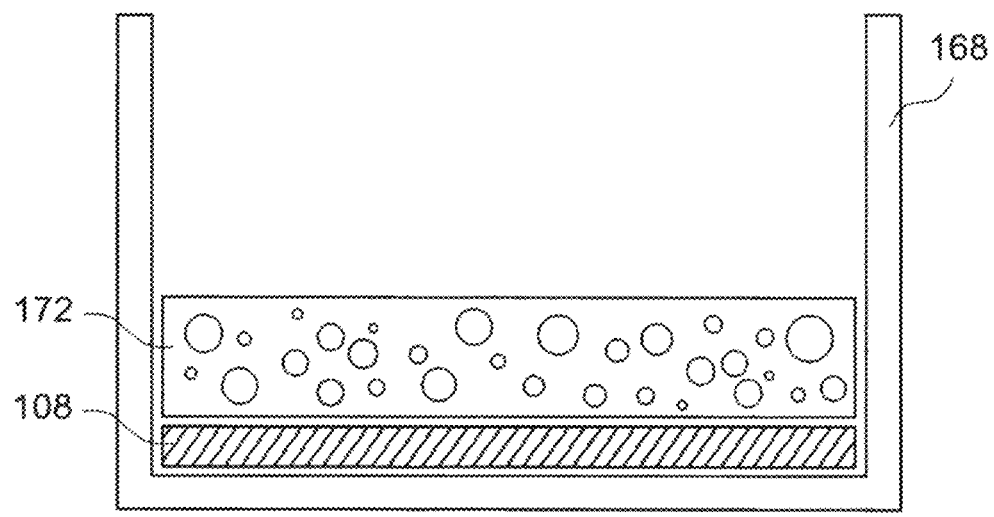
FIG. 16B is a schematic cross-section view of the mold of FIG. 16A containing UV resistant material and plastic.

Referring to FIG. 16A, in an example embodiment method 160 includes placing UV resistant material 108 into mold 168, such as a steel mold 168. UV resistant material 108 is on a side 170 of mold 168. In the illustrated example, side 170 is a floor of mold 168. Referring to FIG. 16B, plastic 172 is introduced into the mold 168. Optionally, the plastic is placed into the mold (poured, injected into, etc.) so as to not mix the UV resistant material 108 with all of the plastic introduced into the mold. For example, as exemplified, plastic 172 may be introduced to the mold 168 from a location above the UV resistant material. For example, plastic granules may be dropped into the mold 168 through an opening in the upper portion of the mold 168 to fall onto the UV resistant material 108 on the floor 170 of the mold 168.

The plastic block 100 is then molded with the UV resistant material 108 forming a coating 120 on an outer face 102 of the plastic block 100. For example, mold 168 may include two or more mold portions which together form a chamber shaped to form block 100. Mold 168 may also include a sprue through which plastic 170 may be injected in a heated fluid state into the chamber to be cooled into block 100. In some embodiments, UV resistant material 108 may be placed in the mold 168 prior to injection of plastic 170, and a sprue may be above the UV resistant material 108 in the mold 168. Mold 168 may then open to allow the block 100 to be ejected by mold 168 or otherwise removed.

During the molding process, pressure may be applied to the interior of the mold, such as by the plastic or other fluid being injected into the mold through the sprue (a compression packing cycle) or by inward movement of one or more mold members.

Figure 17A:
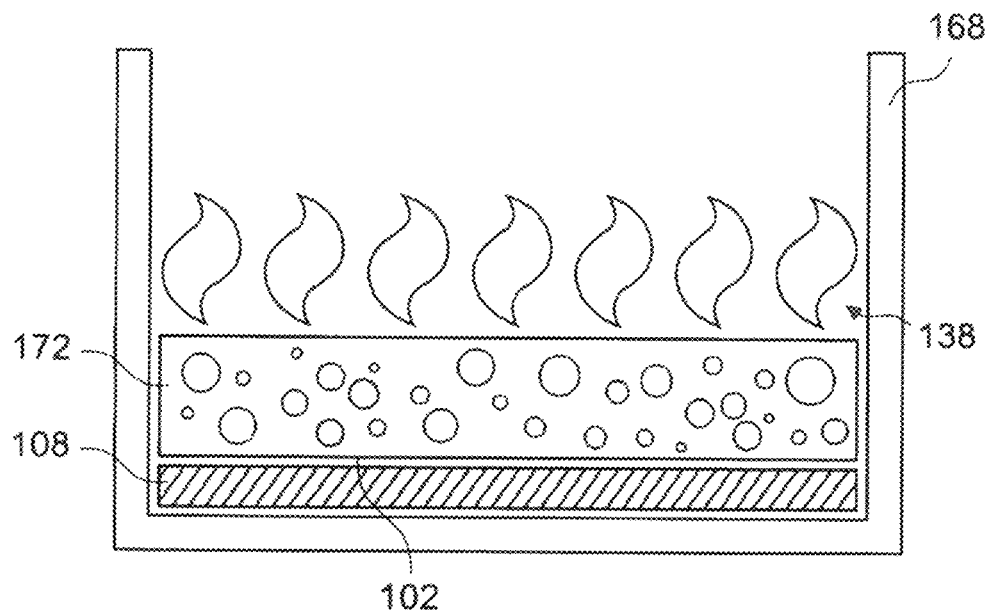
FIG. 17A is a schematic cross-section view of a mold containing UV resistant material and plastic to which heat is being applied.
Figure 17B:
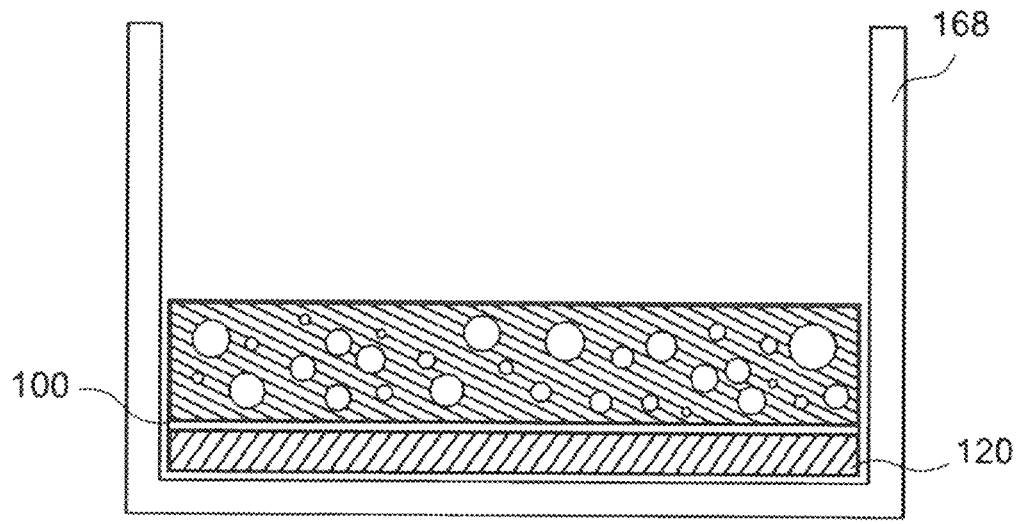
FIG. 17B is a schematic cross-section view of the mold of FIG. 17A containing a coated plastic block.

Prior to or concurrently with the plastic in the mold being compressed, heat may be applied, as exemplified in FIGS. 17A and 17B. For example, where plastic 172 in mold 168 is a powdered or granular plastic, applying heat may melt the plastic 172 which may then flow over UV resistant material 108 before being cooled sufficiently to be removed from mold 168. Compression may be applied prior to, during or after the heating cycle. Cooled plastic block 100 may then be removed from mold 168 and hardened.

In the embodiment illustrated in FIGS. 17A and 17B, heat 138 is applied to plastic 172 in the mold 168. However, in other embodiments, heat 138 may be used in other ways. For example, heat 138 may be applied to UV resistant material 108 prior to the introduction of plastic 172 into mold 168. In some embodiments, mold 168 is heated and heat is transferred from mold 168 to the contents of mold 168. Alternately, or in addition, the plastic may be heated if injection molding is used.

Figure 18:
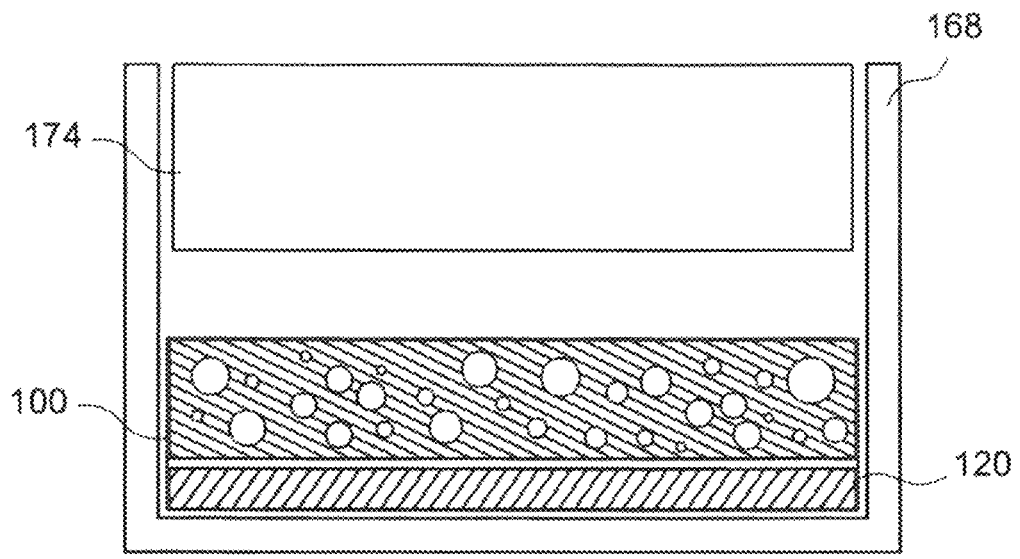
FIG. 18 is a schematic cross-section view of a compression mold containing a plastic block having a face coated with a UV resistant material.

Referring to FIG. 18, in the illustrated example molding the plastic block 100 includes compressing the plastic 172 in the mold 168 instead of or in addition to treating the plastic 172 with heat 138. For example, method 160 may include subjecting the plastic 172 to a pressure in the mold 168 at which the UV resistant material 108 is only partially embedded in the outer face 102 of the plastic block 100. The pressure to which the plastic 172 is subjected in the mold may be a pressure at which, e.g., up to 90% of the thickness of the UV resistant material is embedded in the outer face 102 of the plastic block 100.

In the illustrated example, pressure is applied by way of compression member 174. Compression member 174 may be moved into mold 168 to compress the contents of mold 168 and then withdrawn from mold 168, such as to facilitate removal of the compressed contents of mold 168. Compression member 174 is illustrated as a punch member, but in other embodiments other compression members, such as rollers, may be used.

Figure 19:
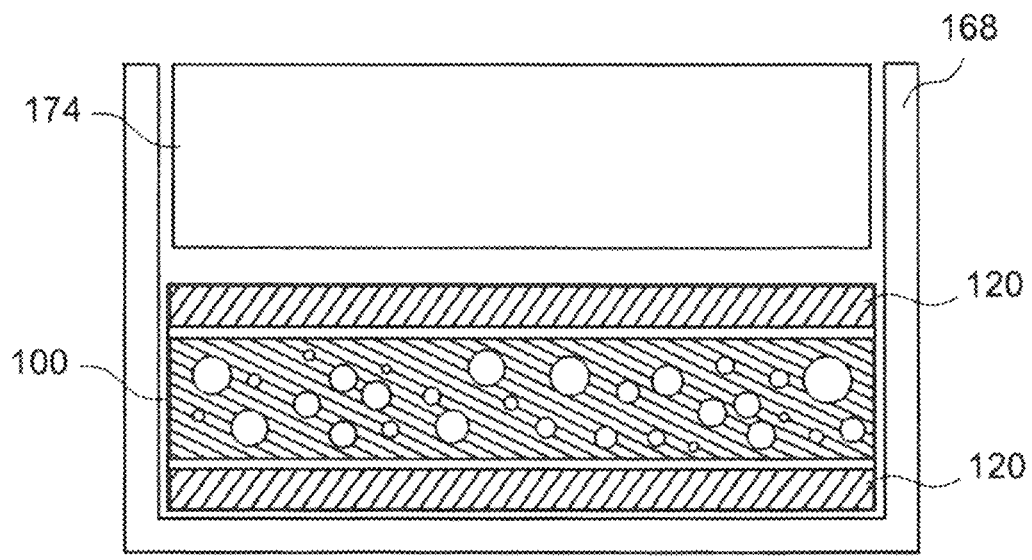
FIG. 19 is a schematic cross-section view of a compression mold containing a plastic block having two faces coated; and, FIG. 20 is a top perspective view of walking surface made from a plurality of coated plastic blocks.

Referring to FIG. 19, in some embodiments a coating 120 may also be applied to a second outer face 102 of block 100. For example, once block 100 has been formed the second outer face 102 may be heated and UV resistant material provided on the second outer face 102 and the compression member 174 used to recompress block 100 to form a block 100 having two surfaces coated with coating 120.

Drainage

In some embodiments, the paving block 100, also referred to as block 100, has at least one interior member subdividing the interior area into at least two interior regions. It will be appreciated that the interior member may subdivide the interior area into any number of interior regions. The interior member may provide a drainage channel for allowing drainage from the upper side of the block to the lower side of the block. The drainage mechanism may be used by itself or with any feature of any block disclosed herein.

FIGS. 21-43 exemplify a block having interior members that subdivide the block into four internal regions, thereby creating a plurality of interior members, each of which provides internal drainage. As exemplified, block 100 has an upper side 200 and a lower side 202, and an outer frame member 204 extending around a perimeter of the paving block 100. The outer frame member 204 may include the sidewalls 106. The paving block 100 has an interior area 114 defined by the perimeter of the outer frame member 204.

As exemplified in FIGS. 21-43, interior members 206, or dividing members 206, of block 100 subdivide the interior area 114 into four interior regions 208. It will be appreciated that the interior members 206 may subdivide the interior area 114 into any number of interior regions 208.

As exemplified, the dividing members 206 include first and second opposed spaced apart walls 210 and an upper connecting wall 212 that connects an upper end of each of the first and second opposed spaced apart walls 210. A volume 216 is provided between the first and second spaced apart walls 210. The volume 216 is a contiguous spaced between the opposed walls 210 with an open bottom. Therefore, volume 216 functions as a drainage channel 214. The upper connecting wall 212 has a plurality of drainage openings 112 communicating with the drainage channel 214. Accordingly, drainage openings 112 may be provided between adjacent interior regions 208. It will be appreciated that only one, or some, of the interior members 206 may be provided with drainage openings 112.

Drainage openings 112, or drainage holes 112, may allow rain or other liquid to flow through the drainage openings 112. The liquid passes from the upper side 200 of the block 100, through the drainage openings 112, and into the drainage channel 214. The liquid may then pass through the drainage channel 214 to the lower side 202 of the block 100.

One advantage of providing the drainage channel 214 interiorly, for example, between the first and second spaced apart walls 210, is that the spaced apart wall create an open region or channel through which water may drain that is spaced from a perimeter of the block. In some cases, water may tend to pool in the center of a paving stone or the like. This may occur if the central portion of the paver is depressed, which may occur if the paver is a molded plastic paver. As exemplified, if the drainage openings are provided on the interior of the block, then tendency for water to pool in the center of a block 100 is reduced.

It will be appreciated that the interior members 206 may be of any configuration. For example, if an interior member 206 does not have any drainage openings 112, then the interior member may be a single generally vertically extending wall. Alternately, if the interior member 206 is provided with one or more drainage opening, then it may be of any shape which will enable water to flow downwardly to the bottom of the block 100.

It will be appreciated that channel 214 may extend the full length of walls 210 from the interior of the center of the block 100 at which the walls 210 meet to the perimeter of the block 100. Alternately, the volume between the interior surfaces of spaced apart walls 210 may define a plurality of discrete channels 214, which may be adjacent each other or spaced apart.

If the volume 216 functions as a drainage channel 214, then volume 216 is provided with at least one drainage outlet for water to exit the drainage channel 214. The drainage outlet may be in the bottom of the drainage channel. For example, the volume 216 may have an open bottom as exemplified in FIGS. 21-43. Alternately, it will be appreciated that the bottom of volume 216 may have a plurality of drainage openings for allowing liquid to pass through the drainage opening 112, through the volume 216, and out the lower side 202 of the block 100.

As described previously, a plurality of blocks 100 may be used to provide a walking surface 118. It will be appreciated that the walking surface 118 refers to a surface on which any load may be placed. For example, the walking surface 118 may also be used as a patio to support furniture and outdoor appliances.

A possible advantage of the drainage channel 214 is that the interior drainage allows the block to provide a walking surface, or be filled with a material to provide a walking surface, while still allowing drainage through the block. In some embodiments, the interior region 208 may be filled with a material 218 to provide the walking surface 118. As exemplified in FIGS. 28A-30, the blocks 100 are filled with bricks 218 to provide the walking surface 118. When the interior regions 208 are filled with a walking surface material 218, the interior members 206 may still provide the drainage channel 214 for allowing liquid to pass from the upper side 200 to the lower side 202 of the block 100. Accordingly, the interior regions 208 may be filled with a liquid-impermeable material while still allowing for drainage through the block 100. It will be appreciated that the interior regions 208 may be filled with any material that is capable of providing the walking surface 118. For example, the interior regions 208 may be filled with, including, but not limited to: gravel, sand, grout, brick, plastic, cement, concrete, etc.

In some embodiments, the walking surface 118 may be provided by an upper surface 232 of the block 100, as exemplified in FIGS. 44-61C. In such embodiments, the material 218 may not be needed to provide the walking surface 118. To prevent damage to the block 100 when the upper surface 232 is walked upon, internal supports 116 may be used to provide support to the upper surface 232. As described previously, internal supports 116 may be of any shape.

As described previously, it will be appreciated that one or more internal supports 116 may be of any configuration such that the internal supports 116 are spaced apart to define flow channels 214 for liquid to pass from the upper side 200 of the block 100 to the lower side 202. For example, referring to FIGS. 2 and 44-61C, the internal supports 116 are exemplified as a plurality of single walls extending from the upper surface 232 defining drainage channels 214.

As exemplified, the internal supports 116 form a honeycomb-like structure beneath the upper surface 232 to provide support to the upper surface 232 while also providing drainage channels 214 from the upper side 200 of the block 100 to the lower side 202. In some embodiments, drainage openings 112 may be provided in the upper surface 232 between the internal supports 116, as exemplified in FIGS. 44-61C. In some embodiments, there may be one drainage opening 112 provided per honeycomb region formed by the internal supports 116, as exemplified in FIGS. 44-49C. It will be appreciated that there may be any number of drainage holes 112 providing an opening to the drainage channel 214. For example, FIGS. 50-55C show a block 100 with two drainage openings 112 per honeycomb region formed by the internal supports 116. As exemplified, the drainage openings 112 are shaped as slots to form the opening to the drainage channel 214.

It will be appreciated that if the upper surface 232 has one or more drainage openings 112, the outer frame 204 of the block 100 may include four single sidewalls 106, as exemplified in FIGS. 44-61C. The drainage openings 112 may allow for water to pass through the block 100, thereby preventing pooling on the upper surface 232 while also reducing the material required to manufacture the outer frame 204.

Block Engagement Members

In some embodiments, the paving block 100 may be secured together by at least one first engagement member 124 and at least one mating second engagement member 126. The first engagement member mates or inter-engages with the corresponding second engagement member to secure a first block 100 to a second block 100. The blocks 100 may be releasably secured together. Various types of engagement members will be described herein. The engagement mechanism may be used by itself or with any feature of any block disclosed herein.

The first and second engagement members 124, 126 may be male and female engagement members. The first and second engagement members 124, 126 may automatically inter engage when, e.g., a male engagement member is inserted into a female engagement member. This may occur as the blocks are positioned in the ground. For example, a first block 100 may be placed on the ground and then a second block may be placed on an abutting position, during the placement of the second block 100, the first and second engagement members may inter-engage, thereby releasably securing the first and second blocks together.

Figure 30:
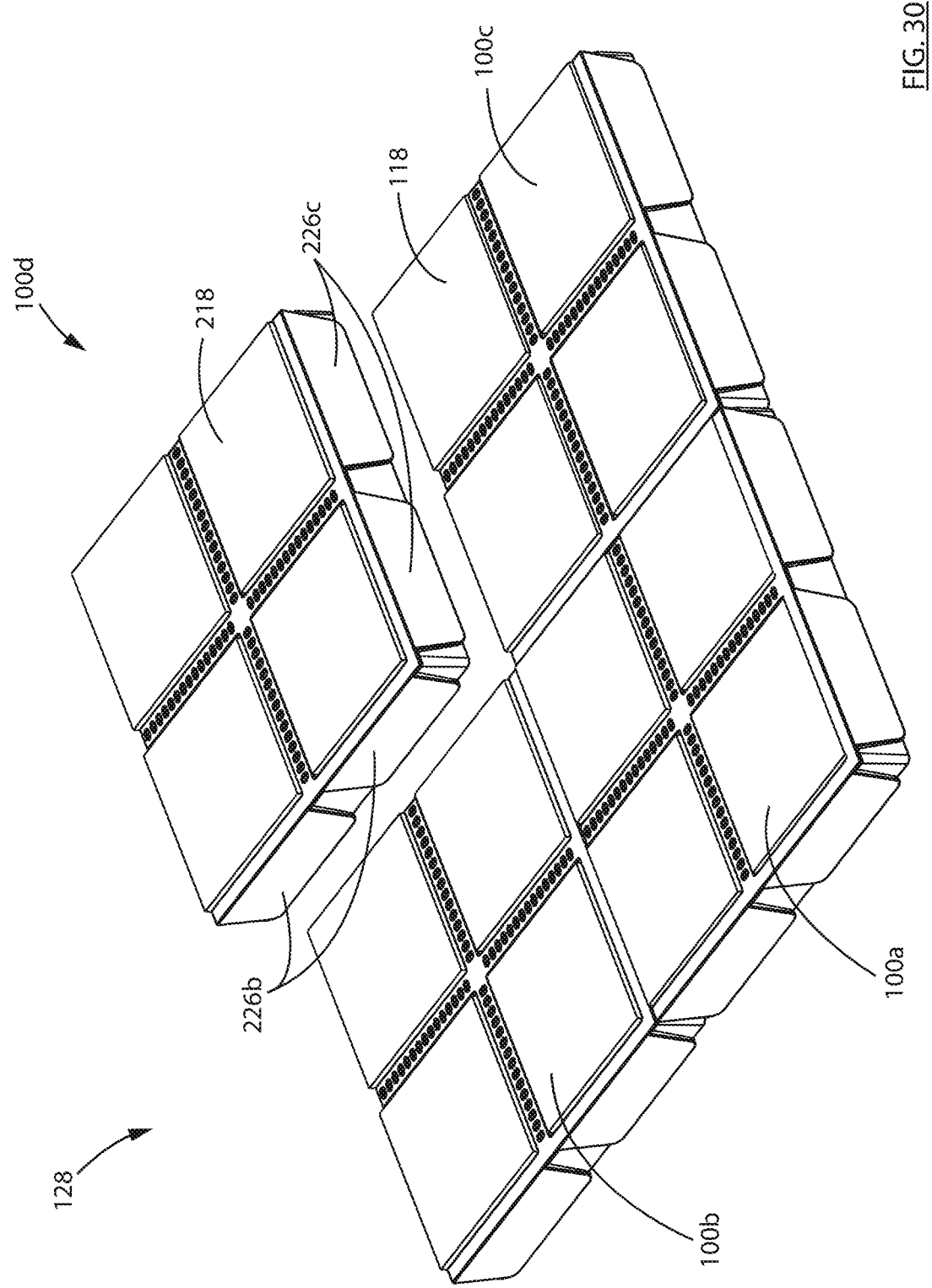
FIG. 30 is a top perspective view of an array of blocks of FIG. 21 with bricks inserted into the blocks.
Figure 34:
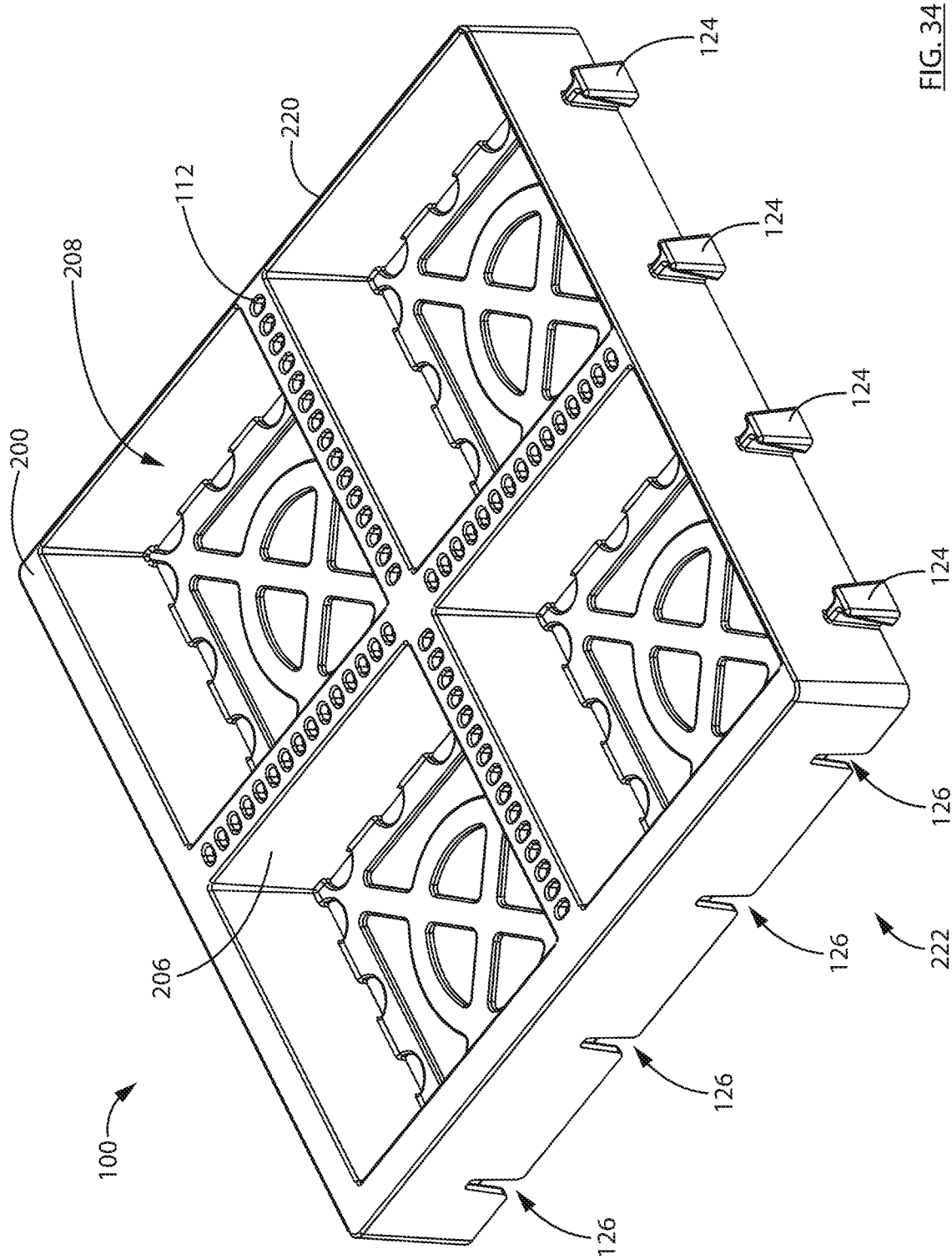
FIG. 34 is a top perspective view of another paving block.
Figure 38:
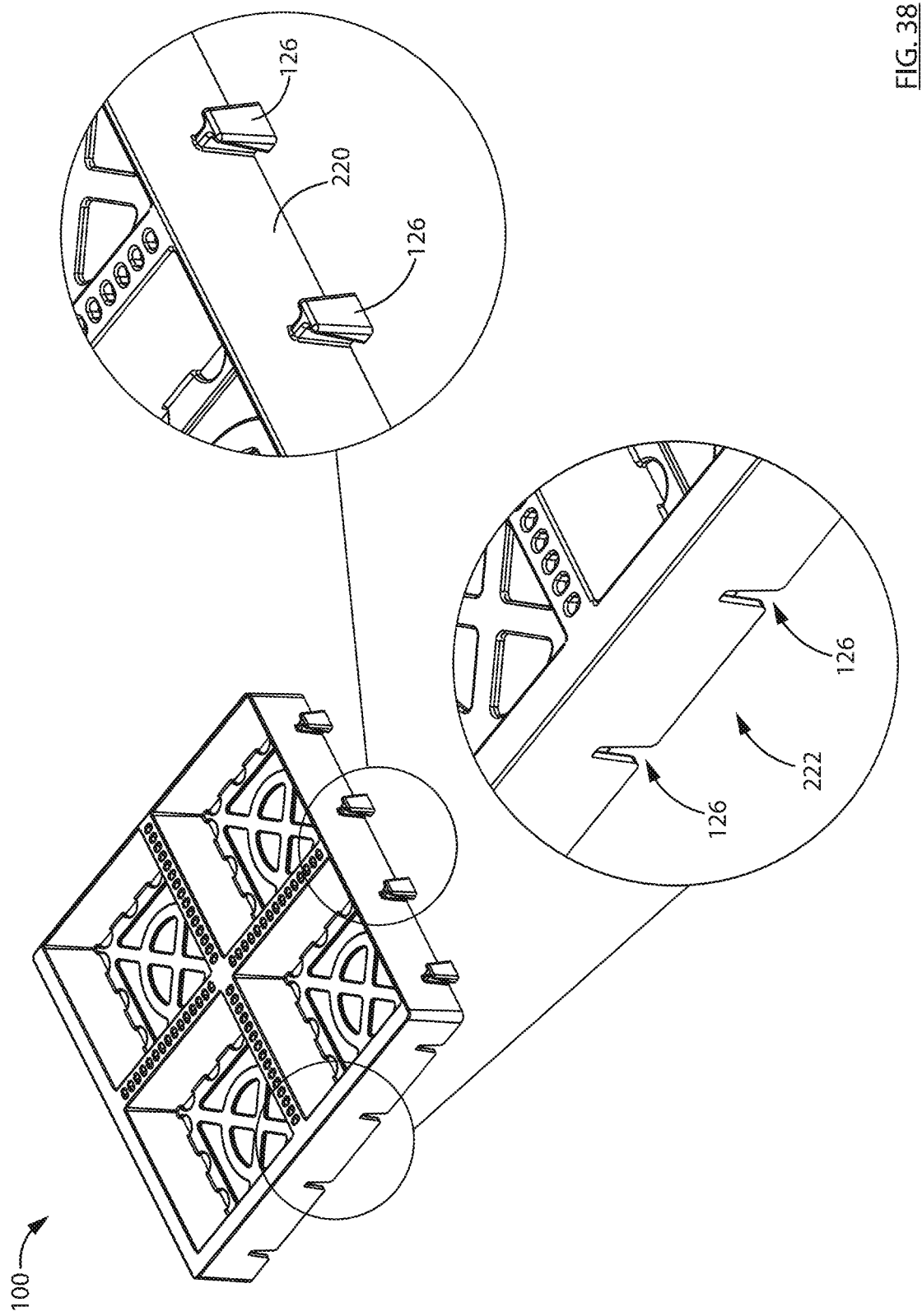
FIG. 38 is a perspective view of the block of FIG. 34 showing enlarged regions.
Figure 39:
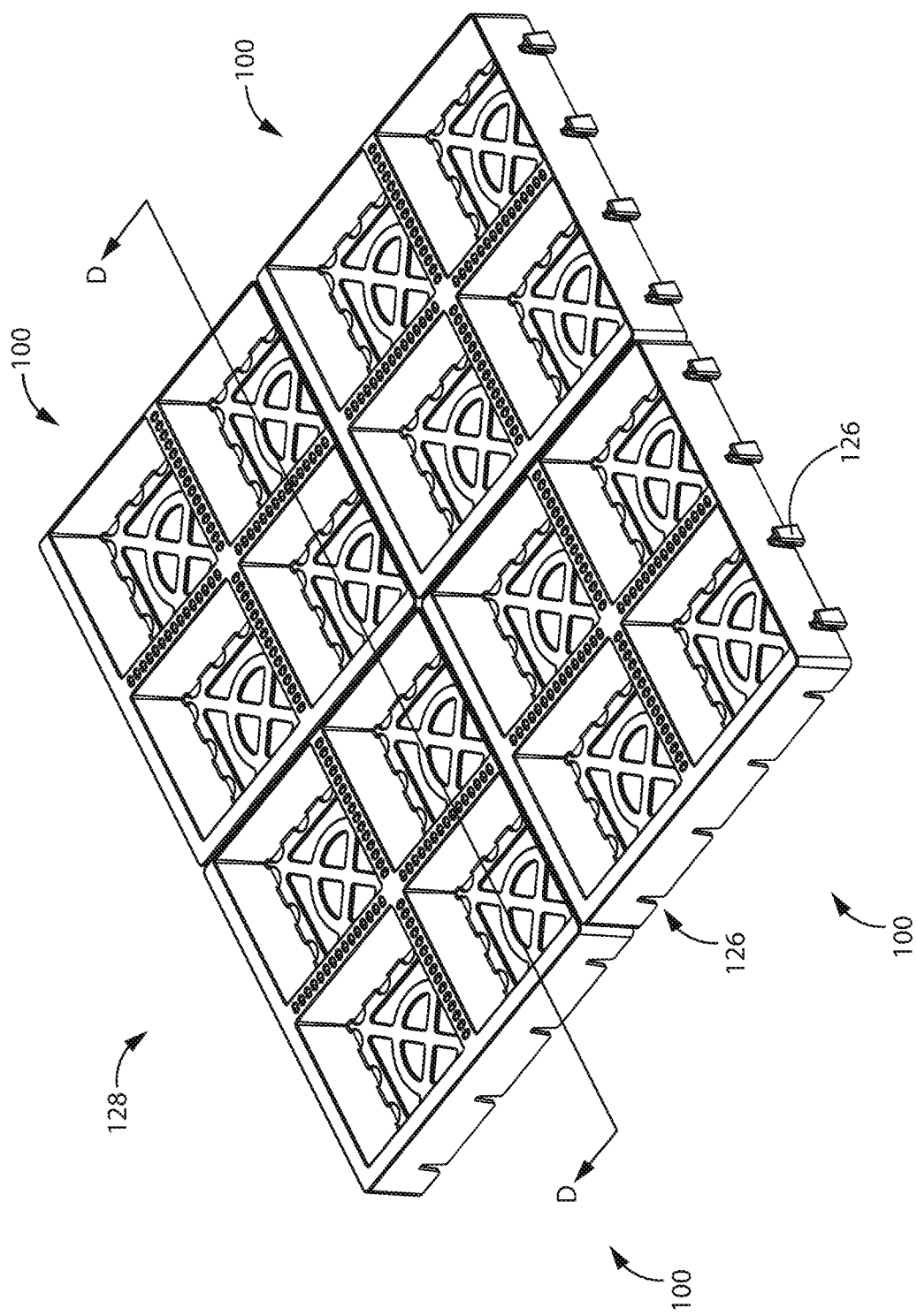
FIG. 39 is a top perspective view of an array of blocks of FIG. 34.
Figure 40:
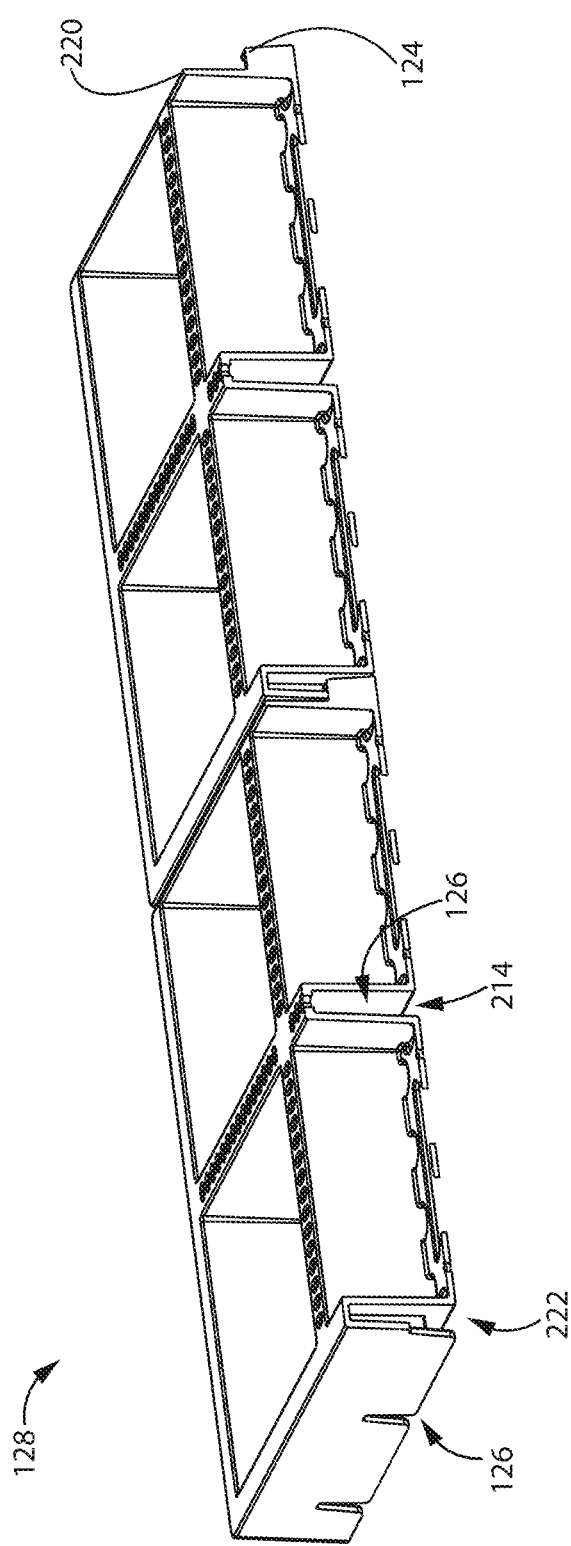
FIG. 40 is a sectional view of the array of blocks of FIG. 34 along the line D-D in FIG. 39.
Figure 41:
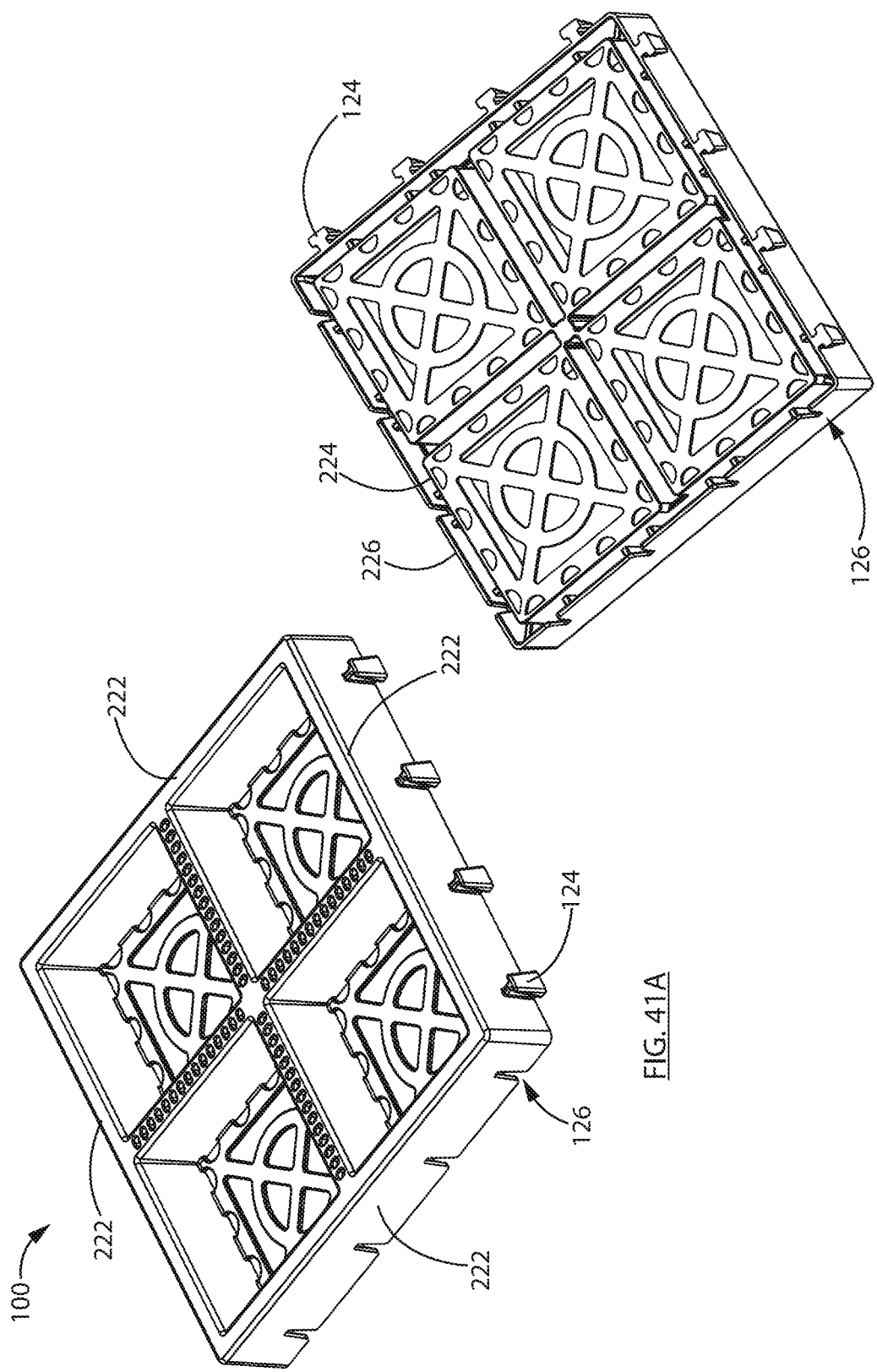
FIG. 41A is a top perspective view of another paving block.
FIG. 41B is a bottom perspective view of the block of FIG. 41A.
Figure 42:
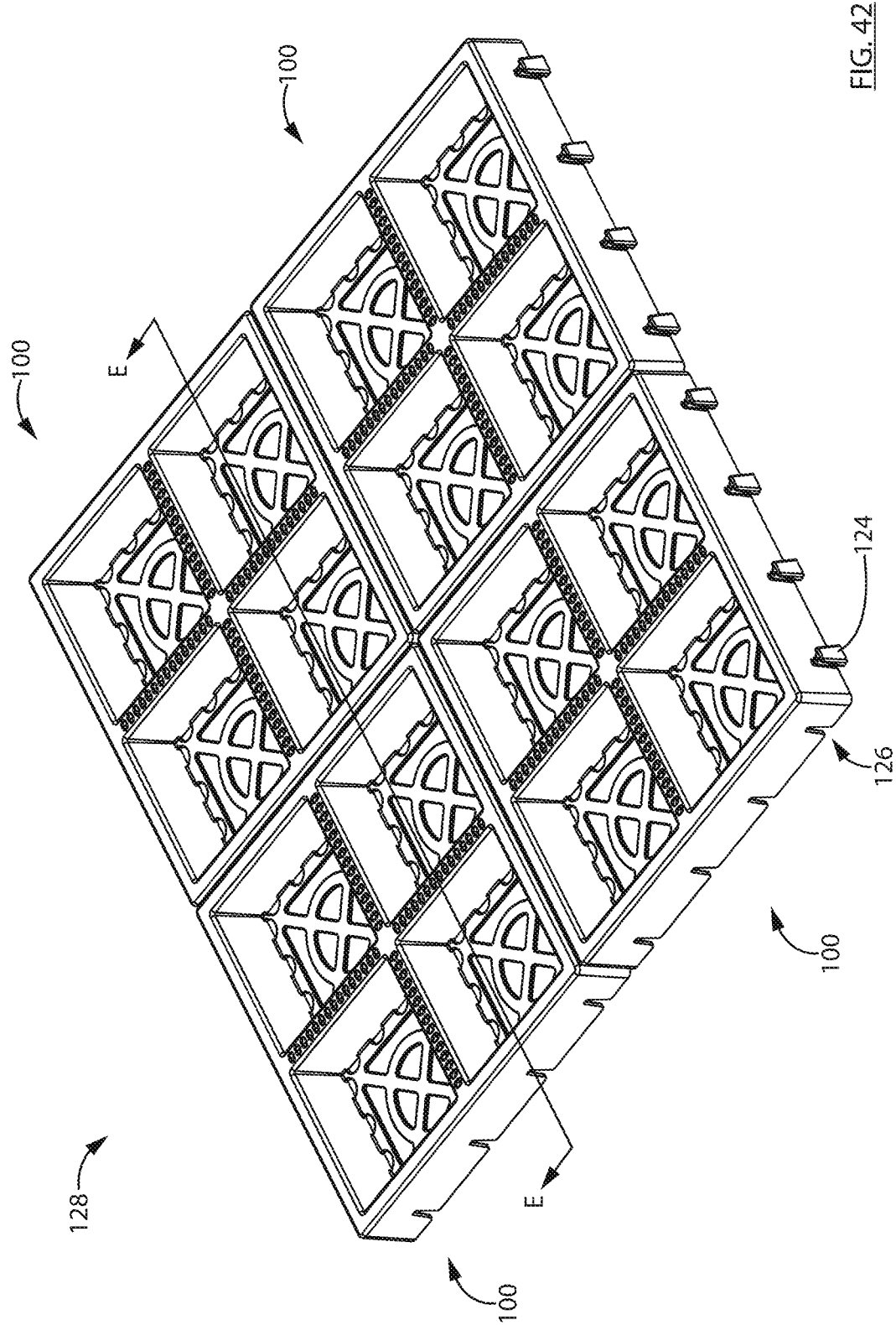
FIG. 42 is a top perspective view of an array of blocks of FIG. 41A.
Figure 43:
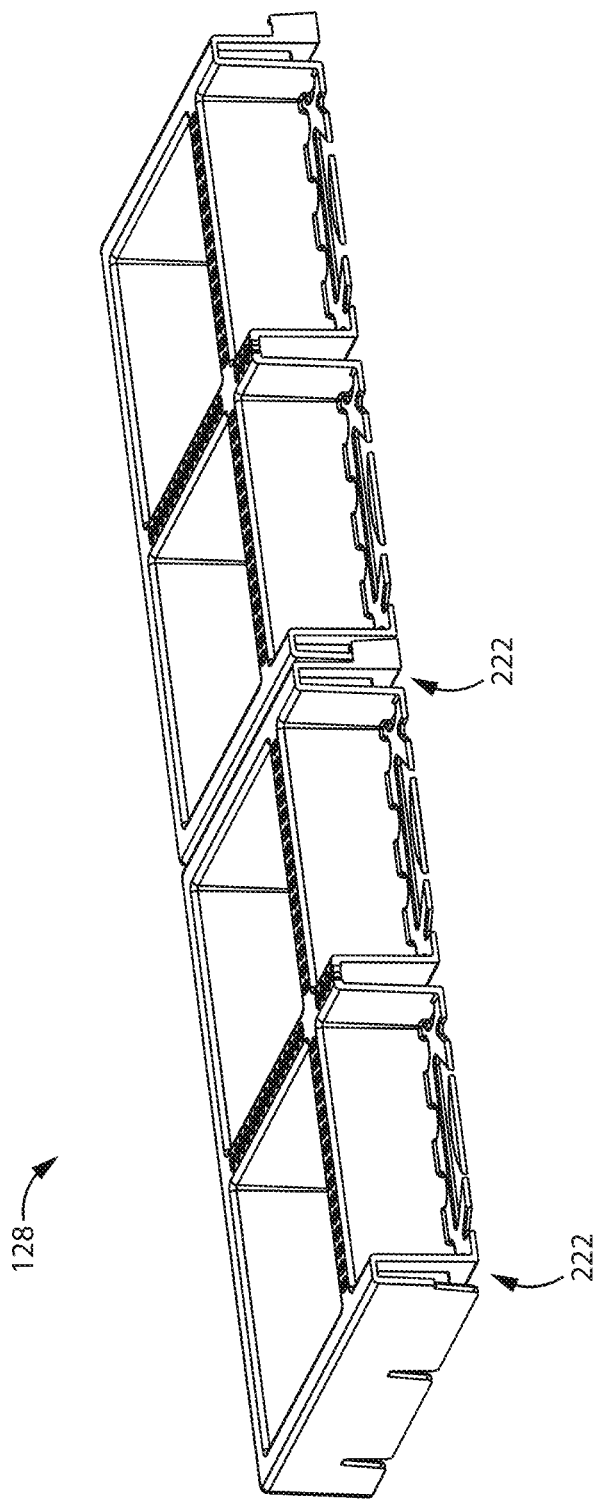
FIG. 43 is a sectional view of the array of blocks of FIG. 42 along the line E-E in FIG. 42.
Figure 44:
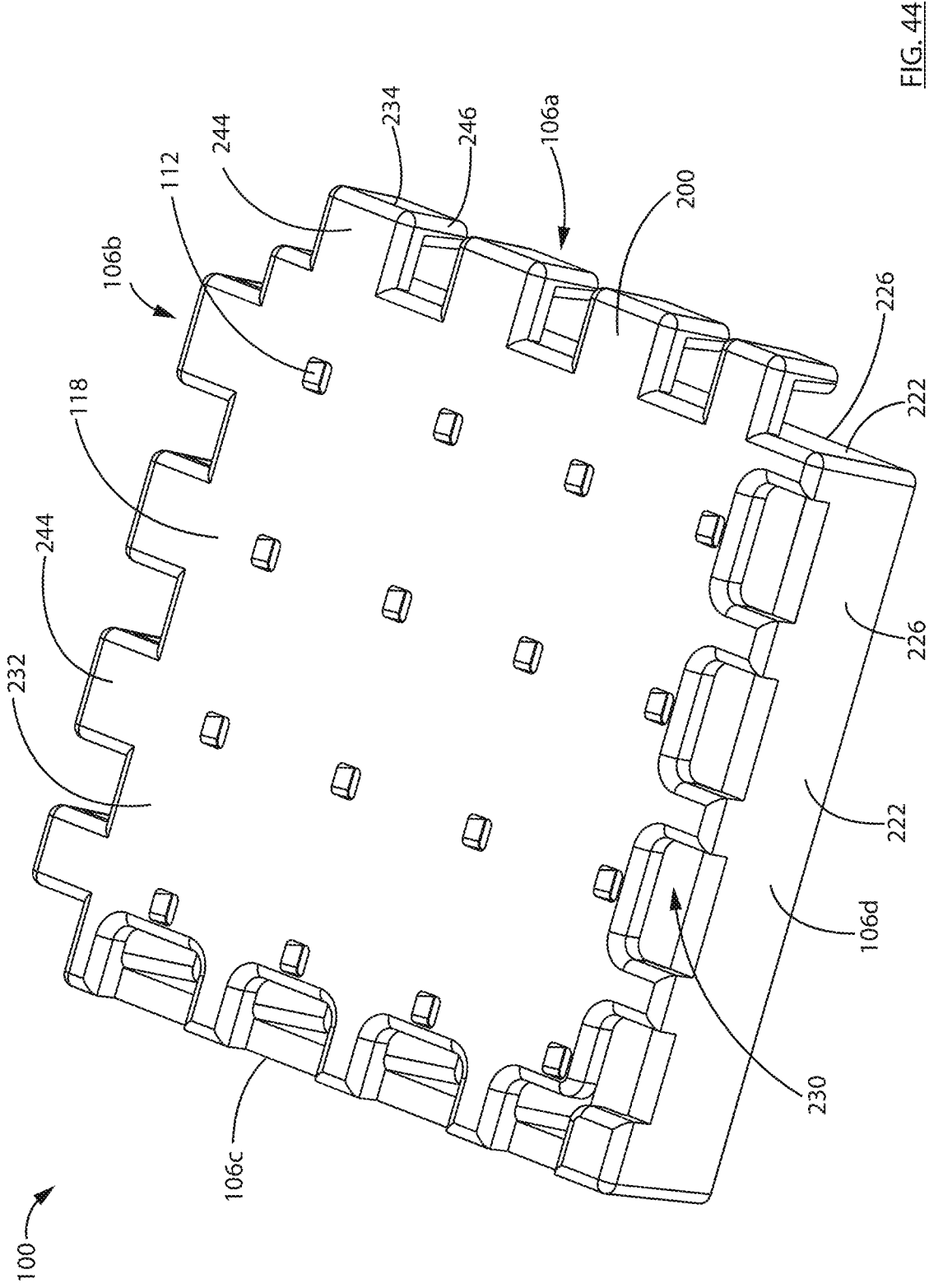
FIG. 44 is a top perspective view of another paving block.
Figure 45:
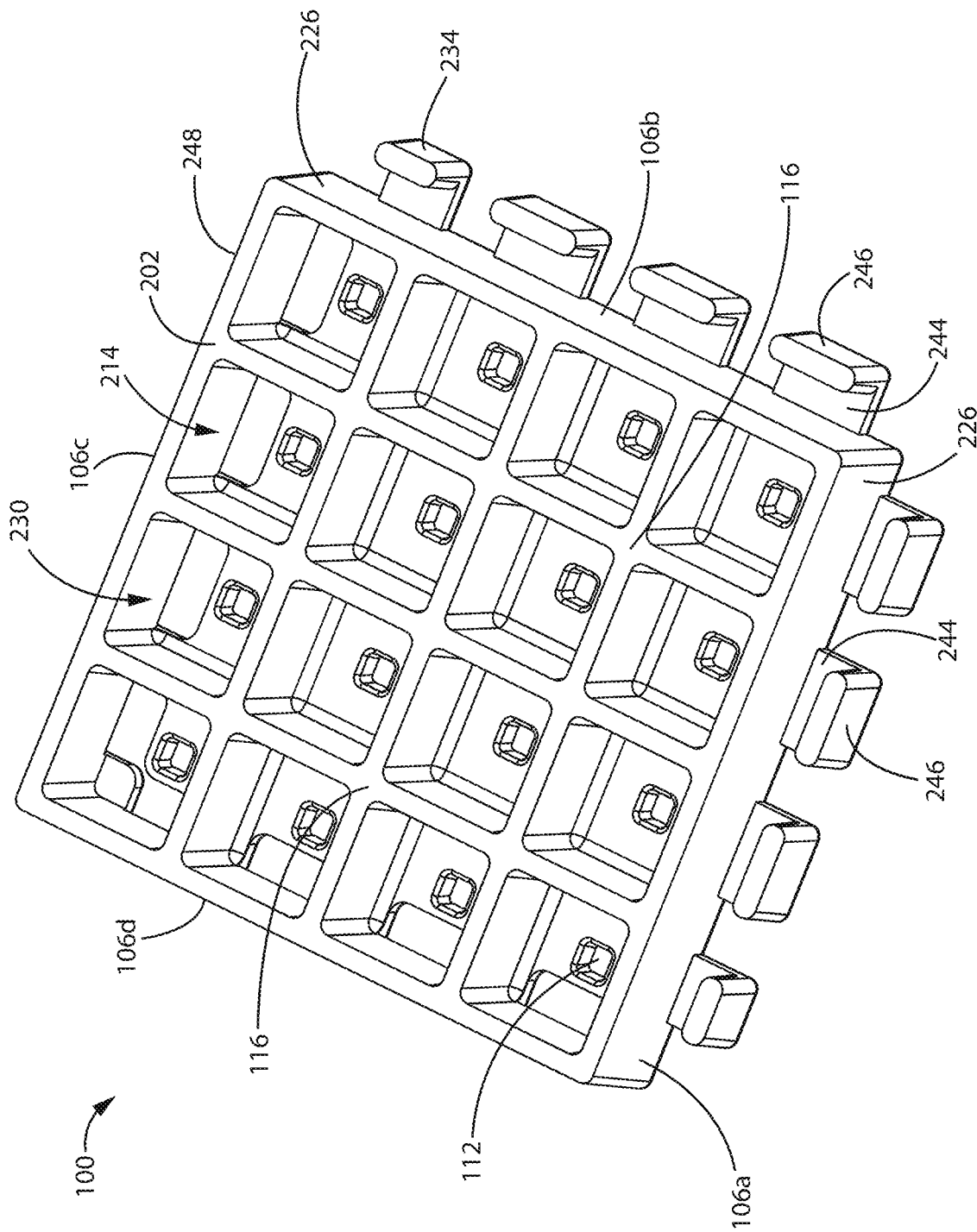
FIG. 45 is a bottom perspective view of the paving block of FIG. 44.
Figures 46A, 46B:
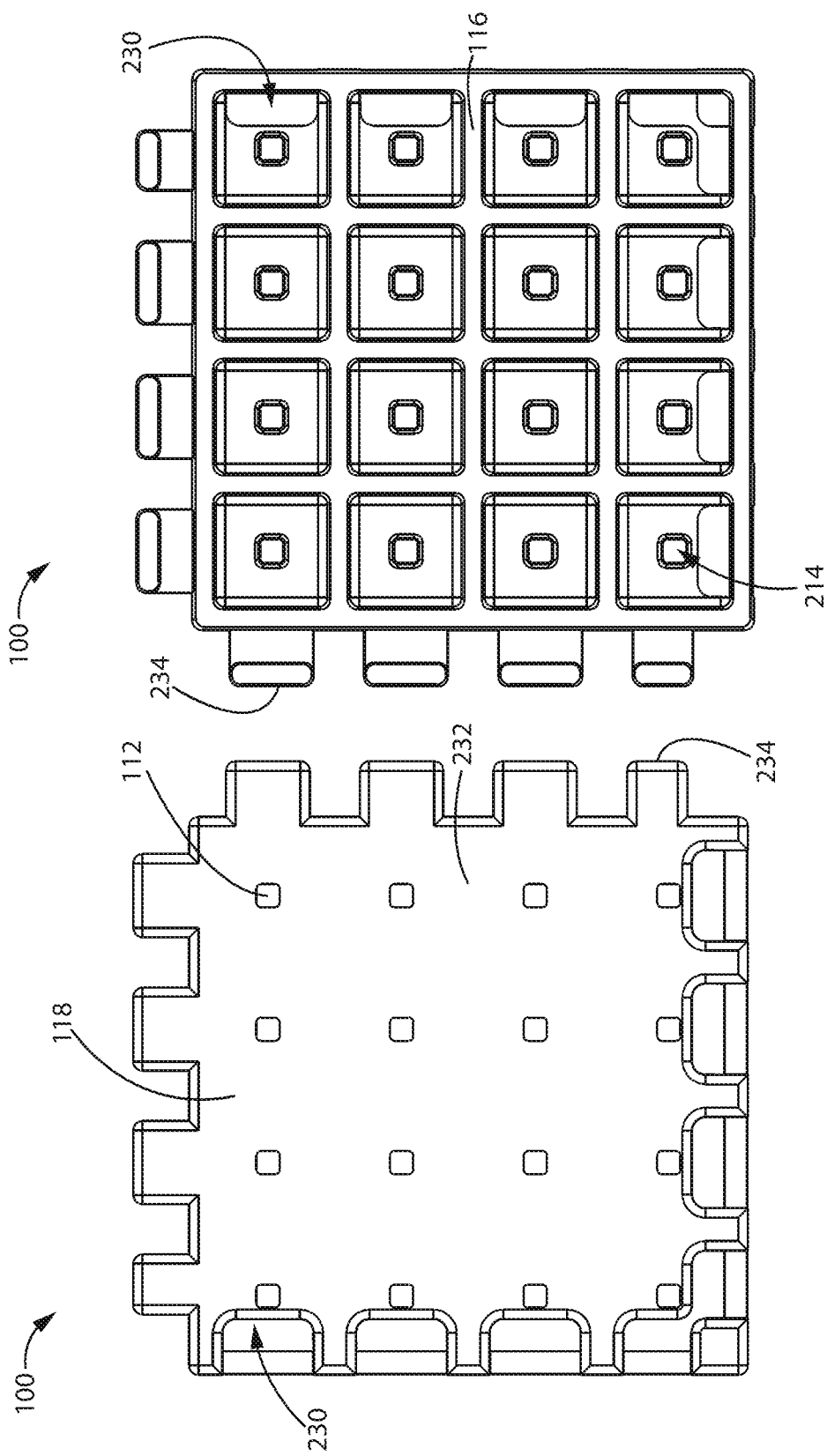
FIG. 46A is a top view of the block of FIG. 44.
FIG. 46B is a bottom view of the block of FIG. 44.
Figure 47A:
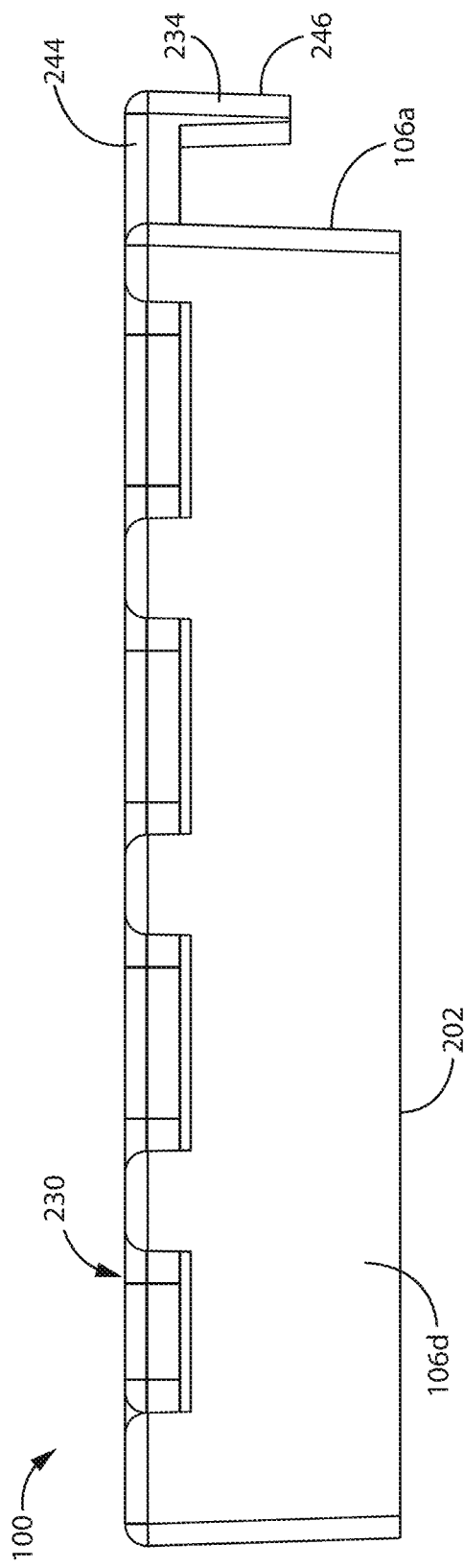
FIG. 47A is a first side view of the block of FIG. 44.
Figure 47B:
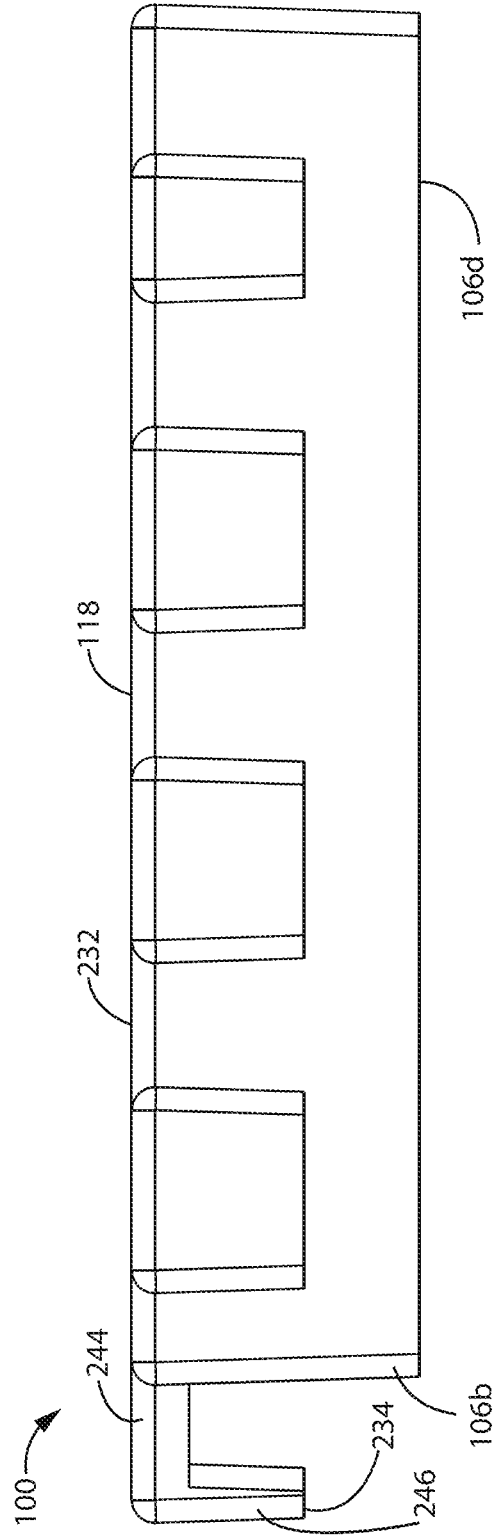
FIG. 47B is a second side view of the block of FIG. 44.
Figure 50:
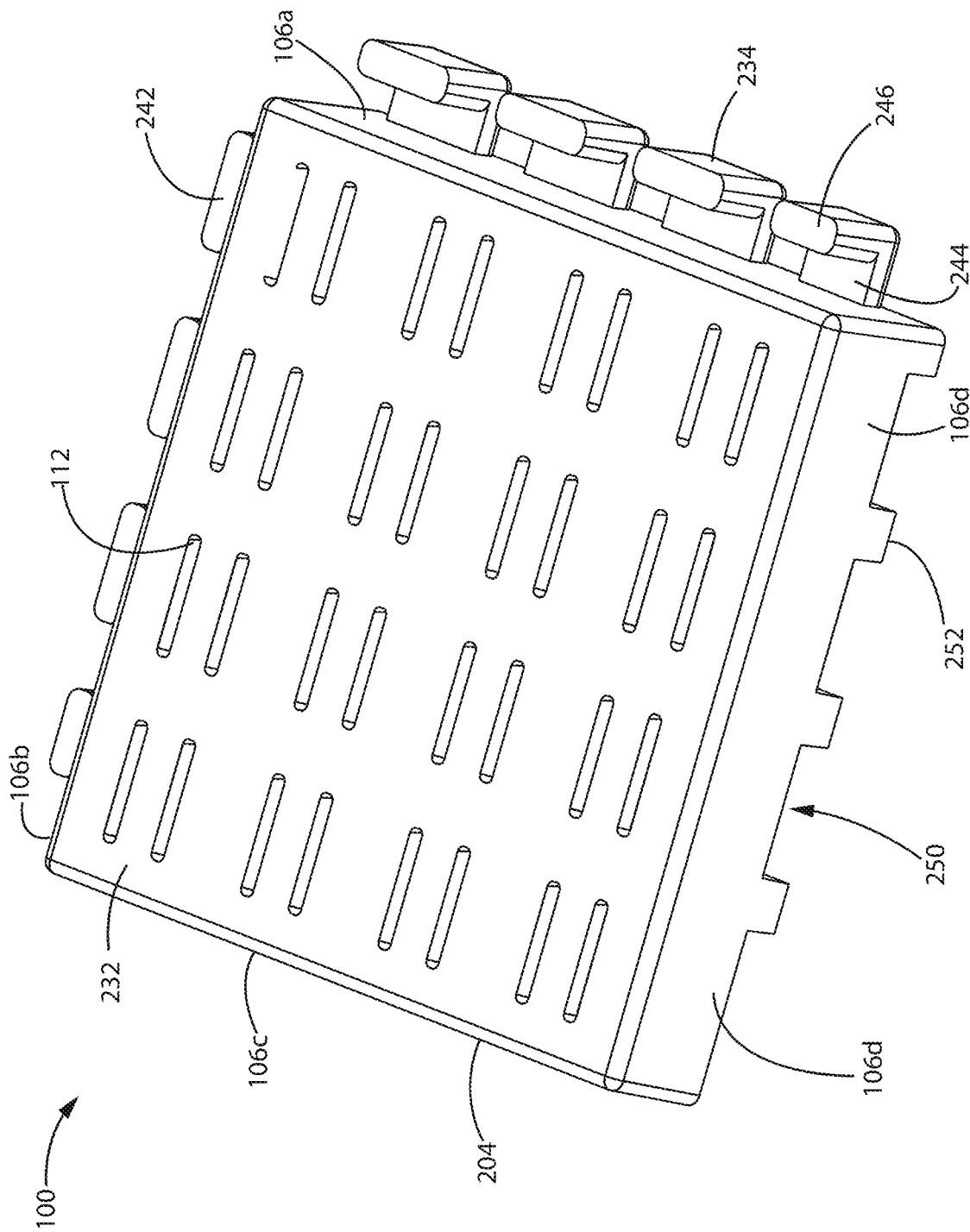
FIG. 50 is a top perspective view of another paving block.
Figure 51:
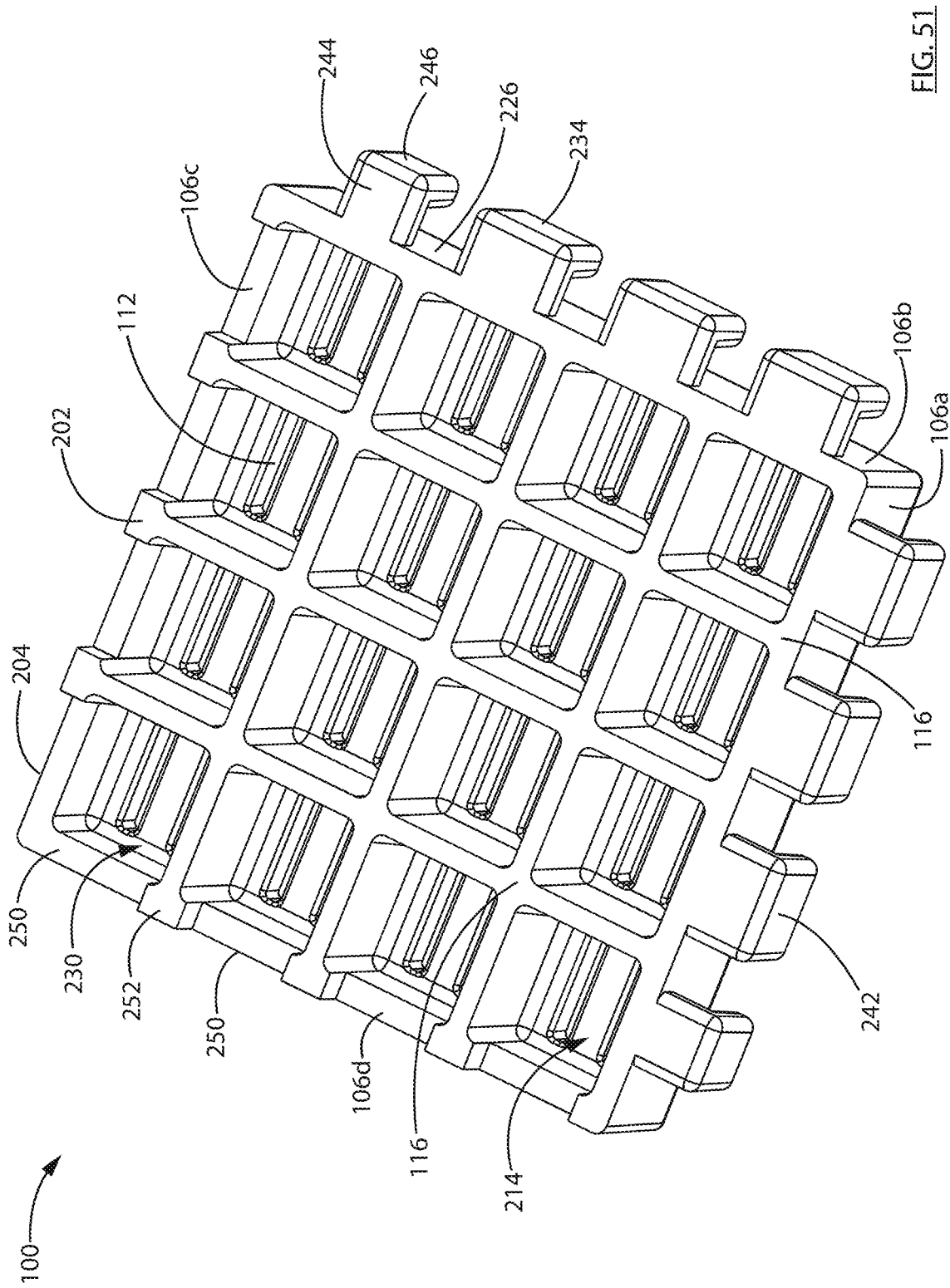
FIG. 51 is a bottom perspective view of the block of FIG. 50.
Figure 56:
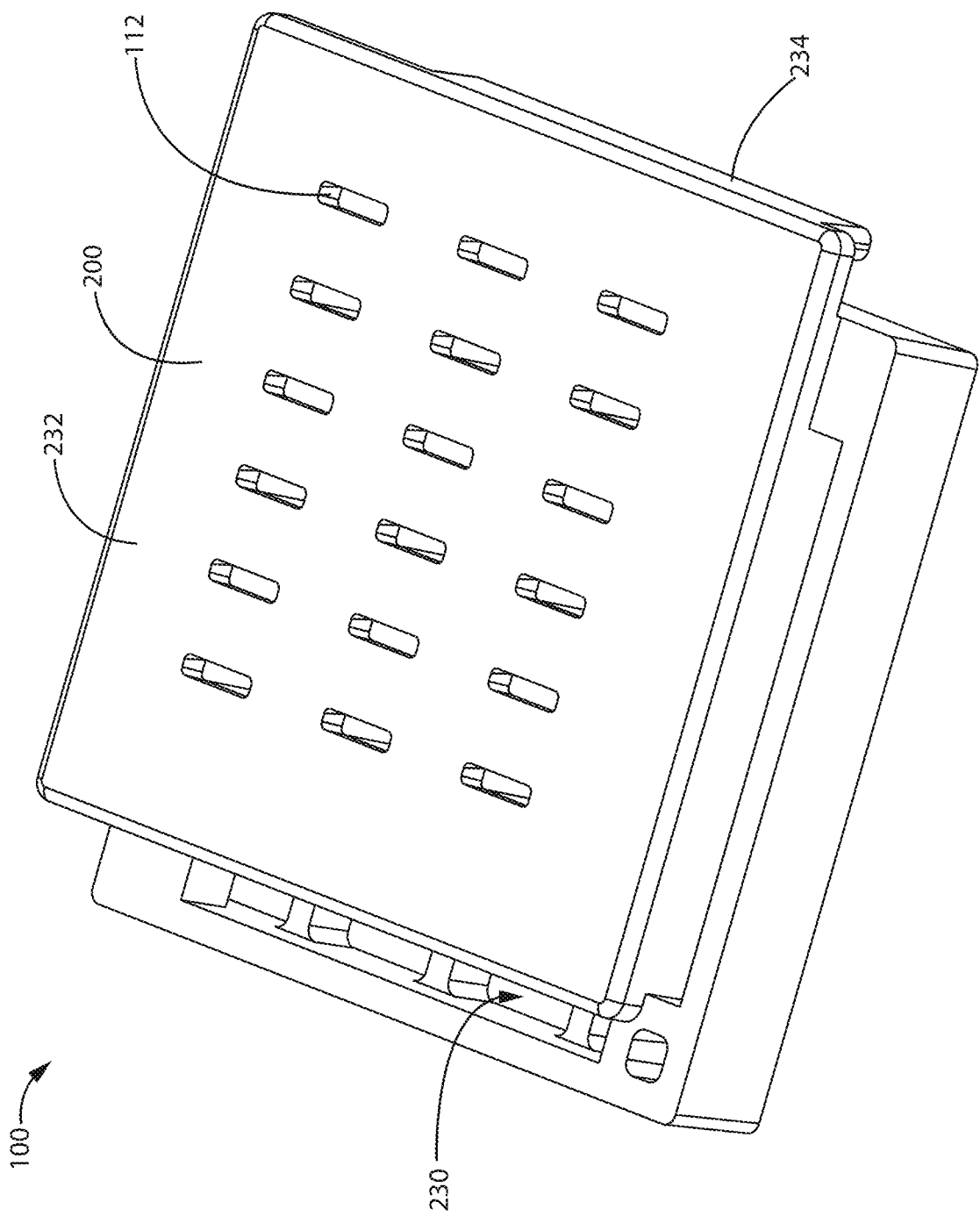
FIG. 56 is a top perspective view of another paving block.
Figure 57:
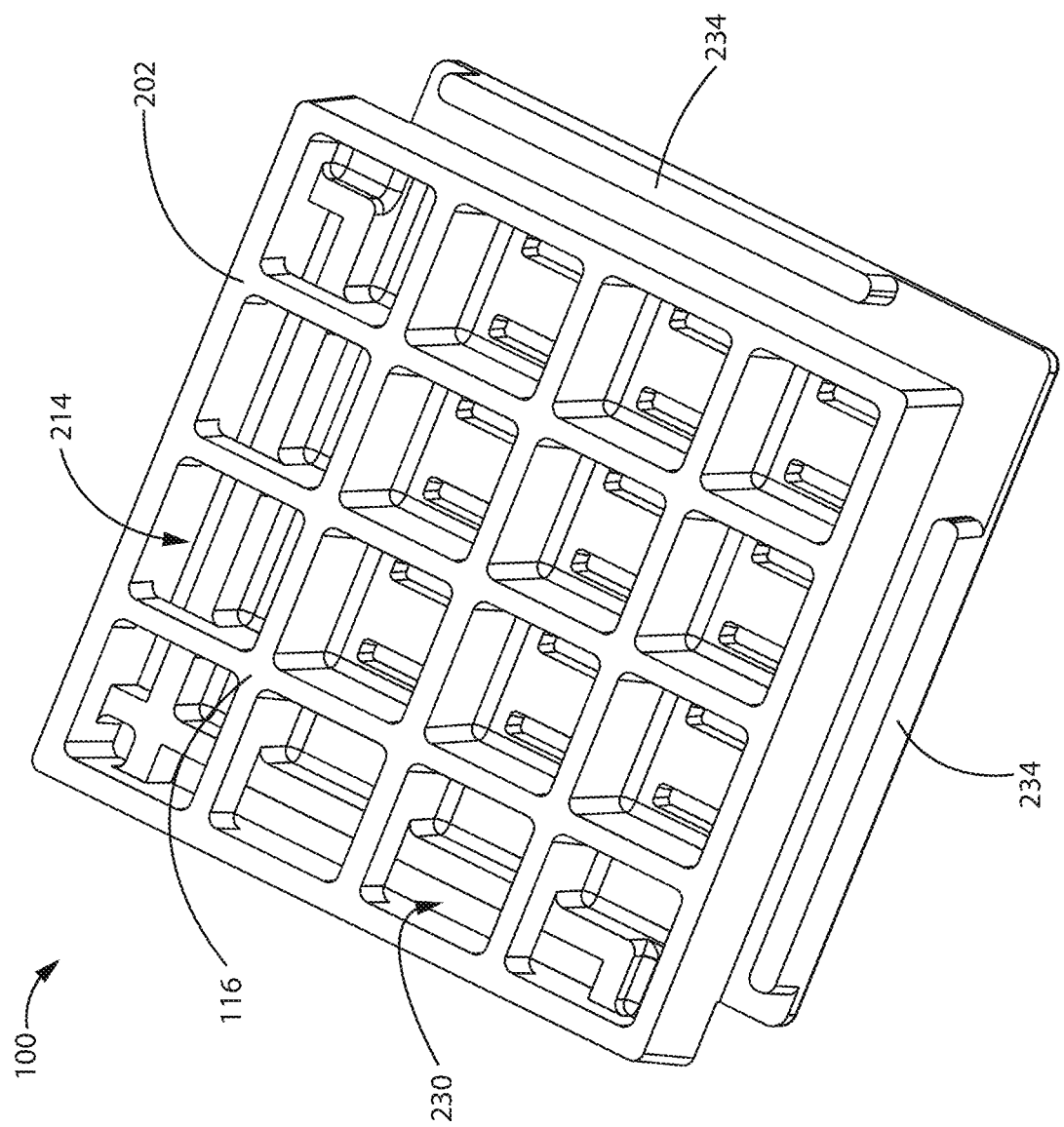
FIG. 57 is a bottom perspective view of the block of FIG. 56.

For example, FIG. 30 exemplifies four blocks 100 according to one embodiment. In FIG. 30, three of the blocks (blocks 100*a*, 100*b* and 100*c*) are positioned on a horizontal surface and secured together by flanges 226. A fourth block (block 100*d*) is being positioned. As the fourth block 100*d* is placed in position, flanges 226*b* will secure the fourth block 100*d* to block 100*b* and flanges 226*c* will secure the fourth block 100*d* to block 100*c*.

Each engagement member 124, 126 may be part of or attached to a wall 106 of a block 100. Alternately, an engagement member may be attached to another portion of block 100, such as the lower or the upper surface of a block 100.

A block 100 may have a single outer wall 106, a double outer wall 106 or a combination thereof. Accordingly, in some embodiments, at least a portion of the outer frame member 204 may include a single wall outer frame. In some embodiments, at least a portion of the outer frame member 204 may include a double walled outer frame. The blocks 100 exemplified in FIGS. 21, 31 and 34 have two sidewalls 106 having single wall outer frames 220 and two sidewalls 106 having double walled outer frames 222. In contrast, the blocks 100 exemplified in FIGS. 41, 44, 50 and 56 have four sidewalls 106 having double walled outer frames 222.

As exemplified in FIGS. 21-33, the double walled outer frame 222 comprises two spaced apart walls (inner wall 224 and outer wall 226) that are connected at their upper ends and open at the bottom so as to form the first engagement member 124. The first engagement member thereby has an open bottom and an interior volume 228 positioned between the two spaced apart walls 224, 226. The single wall outer frame 220 is shaped to seat within the interior volume 228 and defines the mating second engagement member 126.

Accordingly, as exemplified by FIG. 30, when a block 100*d* is placed on a horizontal surface beside one or more other blocks (blocks 100*b* and 100*c* as exemplified, single wall 106 of block 100*c* may seat within interior volume 228 between inner wall 224 and outer wall 266*c* of block 100*d* and single wall 106 of block 100*b* may seat within interior volume 228 between inner wall 224 and outer wall 266*b* of block 100*d*, Accordingly, the single wall functions as a male engagement member and the double wall functions as a female engagement member. Using a single wall for at least a portion of the outer frame 204 may reduce the material required to create the block 100, while still allowing for an engagement mechanism to couple a plurality of blocks 100 together.

As exemplified in FIGS. 34-40, the first engagement member, which is in the form of a T-shaped protrusion, comprises a male engagement member 124 that is provided on a sidewall 106 and the mating second engagement member is a recess provided on outer wall 226, Engagement member 126 receives therein male engagement member and therefore is a female engagement member 126. It will be appreciated that the male engagement member may be provided on a double walled or, as exemplified, a singled walled side, Similarly, it will be appreciated that the female engagement member may be provided on a single walled or, as exemplified, a doubled walled side. Using a double walled side provides an interior volume 228 in the which the T portion of the male engagement member 124 may be received. Similar engagement members are exemplified in the embodiments of FIG. 1 and FIG. 41A.

As exemplified in FIGS. 44-49C, the first engagement member comprises a plurality of openings 230 located in an upper surface 232 of the paving block 100 and the mating second engagement member comprises a plurality of downwardly extending flanges 234 receivable in the openings 230 of the second paving block 100. Flange 234 includes an outwardly extending first portion 244 that extends outwardly from the upper surface 232 and an outer downwardly extending portion 246. Outwardly extending first portion 244 extends sufficiently outwardly such that downwardly extending portion 246 is positioned to seat within a recess 230 when the blocks are connected together. Recess 230 may be an opening provided in upper surface 232 that is bordered on the outer side of recess 230 by wall 106*c*, 106*d*.

As exemplified, male engagement members or flanges 234 are provided on adjacent sides 106*a* and 106*b*. Similarly, mating female engagement members or recesses 230 are provided on adjacent sides 106*c* and 106*d*.

It will be appreciated that block 100 may have any number of downwardly extending flanges 234 receivable in a corresponding number of openings 230. It will also be appreciated that the flanges 234 and openings 230 may be of any size and shape. For example, as exemplified in FIGS. 56-61C the first engagement member may be a single downwardly extending flange 234 receivable in a single opening 230, FIGS. 56-61C.

It will also be appreciated that, in this embodiment, any of sides 106*a*, 106*b*, 106*c* and 106*d* may be single walled or double walled.

Alternately, or in addition, it will be appreciated that the male engagement members may be provided on opposed surfaces 106*a* and 106*c* and that the female engagement members may be provided on opposed sides 106*b* and 106*d*.

Alternately, or in addition, as exemplified in FIGS. 50-55C, it will be appreciated that the engagement members may be provided on the lower end of block 100 and not the upper end. As exemplified in FIGS. 50-55C, flange 234 includes an outwardly extending first portion 244 that extends outwardly from the lower surface 252 and an outer upwardly extending portion 246.

The outwardly extending first portion 244 extends outwardly from lower surface 252 and recess 230 is provided in lower surface 252. As exemplified, lower surface may be essentially open to provide drainage channels 214. Accordingly, a drainage channel may function as part or all of a recess 230 and the recess may be part of interior area 114. The outer wall of lower surface 252 may have a recess 250 (see FIGS. 50 and 51) sized to have a thickness of the outwardly extending first portion 244. Accordingly, the outwardly extending first portion 244 may seat in a recess 250 of a second paving block 100.

In some embodiments, the outer frame 204 may have four double walled outer frames 222. As exemplified in FIGS. 41A-43, two of the double walled outer frames 222 have male engagement members 124 and two of the doubled walled outer frames 222 have female engagement members 126. Double walled outer frames 222 may provide additional structural support to the block 100 for applications of increased load on the walking surface 118.

As described previously, it will be appreciated that an array 128 of blocks 100 may include two or more blocks 100. As exemplified in FIGS. 28B, 49A, 49B, 55A, 55B, 61A, and 61B, two blocks 100 are interconnected, with first engagement members of one block 100 coupled to mating second engagement members of the other block 100. It will be appreciated that further blocks 100 may be added to the edges of array 128 to increase the size of the array 128 and the available walking surface 118. As exemplified in FIGS. 26A, 26B, 33A, 39, and 42, four blocks 100 are engaged with one another to form a larger array 128. Additional blocks 100 may be attached using the same or a different method.

It will be appreciated that the outer frame 204 of the blocks 100 in the array 128 may be altered depending on their position in the array. For example, a corner block 100 may have two walls with engagement members and two walls without engagement members to provide a flush corner surface of the array 128. Similarly, an external side block 100 in the array 128 may have three walls with engagement members and one wall without engagement members to provide an external wall with a flush surface.

Edge Blocks

In accordance with this aspect, which may be used by itself or in combination with one or more other aspects, there is provided one or more edge paving blocks 300. The edge paving blocks 300 may be used in combination with interior paving blocks 100 to provide a finished edge to the interior paving blocks 100. In other words, one or more edge paving blocks may be coupled to one or more interior paving blocks to form an array of both interior paving blocks and edge paving blocks. The edge paving blocks may be used to protect the sides and/or engagement members of the interior paving blocks. Accordingly, the majority of the surface area of the array of paving blocks may be formed by interior paving blocks, while the edge paving blocks may be used to finish the edges of the array, protect the interior paving blocks, and/or be used to alter the shape of the array to fit the desired use.

It will be appreciated that the edge paving blocks may be separate from the interior paving blocks, or may be included with the interior paving blocks as a kit. For example, in some embodiments, a kit may include a plurality of interior paving blocks and a plurality of edge paving blocks. A kit may allow a user to design the array 128 in various shapes and/or sizes depending on the desired use.

Referring to FIGS. 62-74, shown therein are exemplary embodiments of interior paving blocks 100 and edge paving blocks 300. As exemplified, the edge paving blocks 300 may include a similar structure to blocks 100. For example, as exemplified, each edge paving block 300 has an upper side 200 having a walking surface 118 and a lower surface 202. The edge paving blocks 300 have an inner side 302 and an opposed outer side 304 extending between the upper side 200 and the lower side 202.

The outer side 304 of the edge paving blocks 300 may have any particular profile and surface pattern (texture) which may be desired for an outer surface. For example, as exemplified, the outer surface may have a smooth texture in FIGS. 62-74.

The profile of the outer surface 304 may provide a vertical wall when installed. For example, as exemplified in FIGS. 62-70, 72 and 74 the outer sides 304 may be at a 90-degree angle with respect to the ground surface. Alternately, as exemplified in FIGS. 71 and 73, the outer side 304 may be angled with respect to the ground surface. Alternately, or in addition, as exemplified in FIGS. 73 and 74, the outer side 304 may include a first portion 305 that is parallel to the ground surface and a second portion 306 that is at an angle to the ground. The first portion 305 may be aesthetic, and/or may provide additional functionality such as forming a drainage surface.

The edge paving blocks 300 are connectable and, optionally, releasably connectable to the interior paving blocks 100. As exemplified in FIGS. 62-74, the interior paving blocks 100 may include first engagement members 124 while the edge paving blocks may include second engagement members 126 that are inter-engageable with the first engagement members 124. As exemplified, the interior paving blocks 100 include first engagement members 124 located on the outer frame 204 while the edge paving blocks 300 include mating second engagement members 126 located on the inner side 302. Accordingly, the outer side 304 of the edge paving blocks 300 may provide the finished surface of an array 128, while the inner side 302 may provide the engagement member for inter-engaging with the interior paving blocks 100.

As exemplified in FIGS. 62-74, the first engagement members 124 may be male engagement members while the second engagement members 126 may be female engagement members, as described previously. It will be appreciated that, in some embodiments, the first engagement members 124 may be female engagement members while the second engagement members 126 may be male engagement members. In some embodiments, the first and second engagement members 124, 126 may be a combination of male and female engagement members, as exemplified in FIGS. 63, 69, and 71-74. Accordingly, a first inner side 302 of the edge paving block 300 may include male engagement members 126 while a second inner side 302 may include female engagement members 126.

The first and second engagement members may be of any design and, optionally, a design wherein the first and second engagement members inter-engage when a block is placed in position in a downwards direction. As exemplified in FIG. 63B the second engagement members 126 may include generally V-shaped recesses. As exemplified in FIG. 63B, the second engagement members 126 of the edge paving blocks 300 may inter-engage in a downward direction when one of the interior paving blocks 100 is positioned on the ground, as illustrated by the downward arrows (see the straight edge paving blocks 300). Alternately, it will be appreciated that, one or more sides of the interior paving blocks 100 may inter-engage in a downward direction, as exemplified in by the side of the interior paving block 100 that engages with the L shaped edge paving block 300 on the left side of FIG. 63B. In other words, the block 100 or 300 that has the female engagement members 124 or 126 may engage with the corresponding male engagement member 124 or 126 in a downward direction, as exemplified in FIGS. 63, 69, and 71-74. It will be appreciated that one block may have only male or female engagement members or both male and female engagement members.

The inner side 302 of one or more of the edge paving blocks 300 may be longer than the corresponding sidewall 106 of the interior paving block 100, as exemplified in FIGS. 63B and 63C. Alternately, the inner side 302 of one or more edge paving blocks 300 may be the same length as the corresponding (mating) sidewall 106 of the interior paving block 100. Accordingly, the edge paving blocks 300 with a longer inner side 302 may extend past the sidewall 106 of the interior paving block 100. The edge paving block 300 with the same length as the sidewall 106 of the interior paving block 100 may be used as a cap for the longer edge paving blocks 300 to provide a flush outer finish to the array 128.

Figure 67:
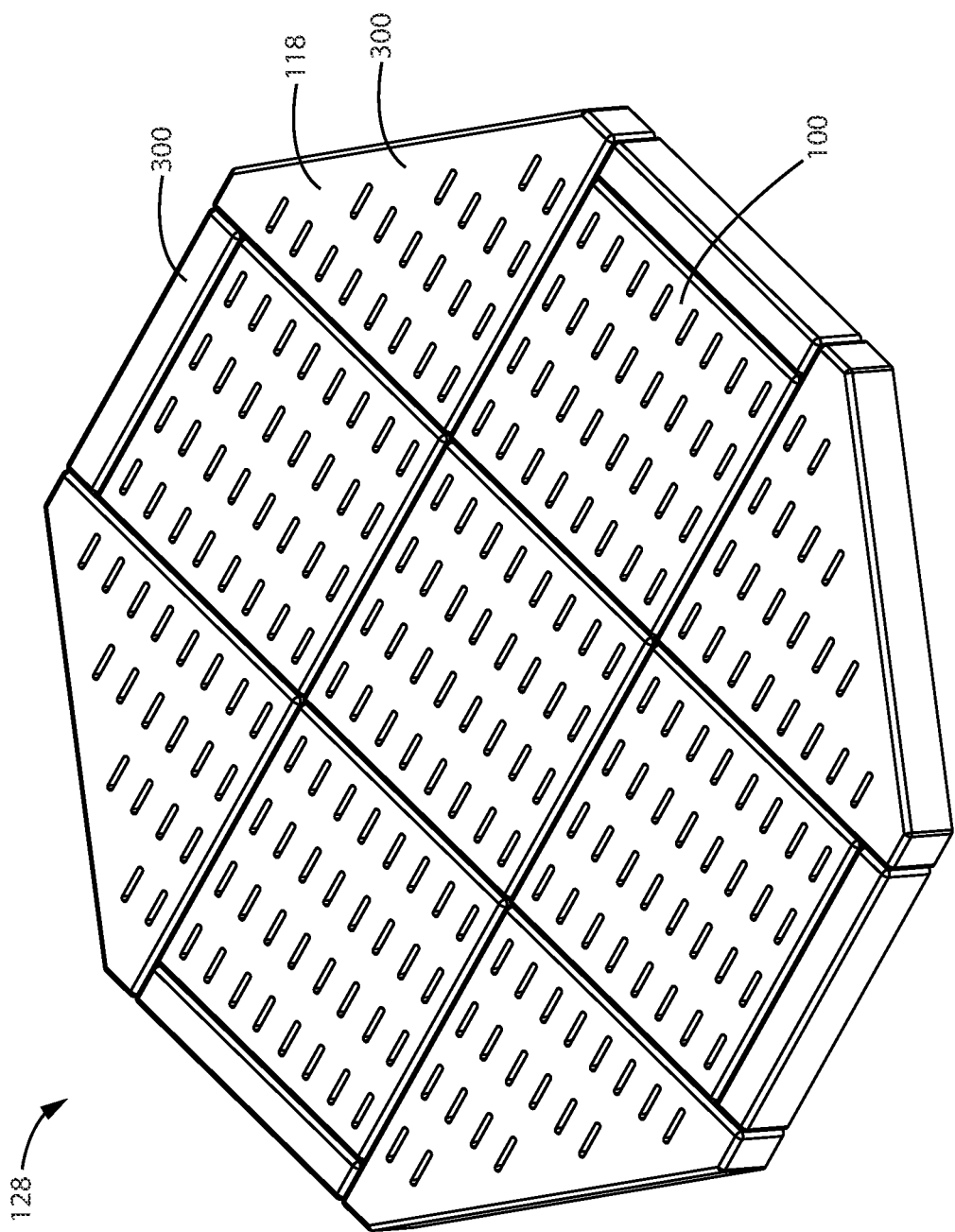
FIG. 67 is a top perspective view of another example embodiment of an array of a plurality of interior blocks and a plurality of edge paving blocks.
Figure 69:
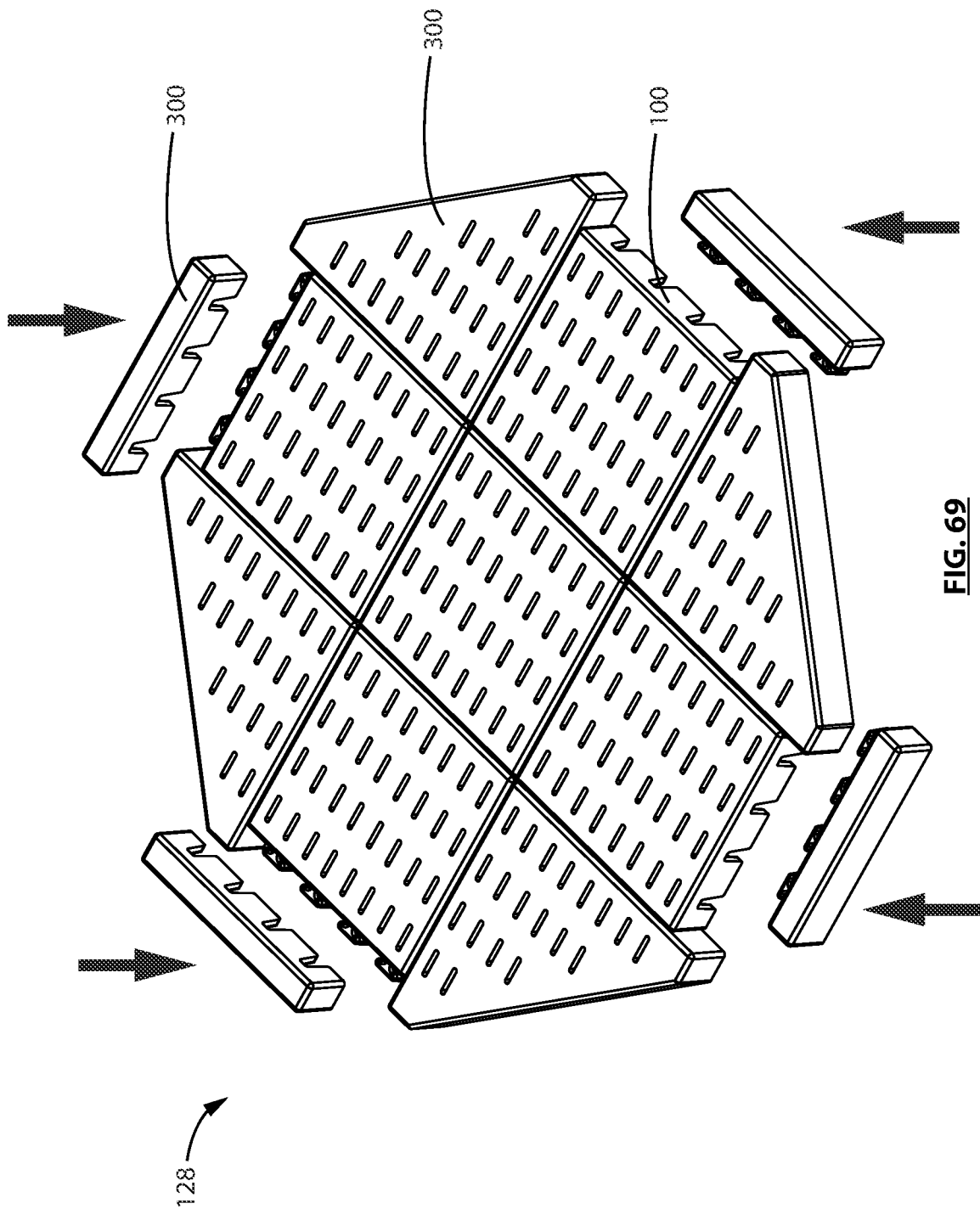
FIG. 69 shows the array of FIG. 62 in a further state of assembly.
Figure 70:
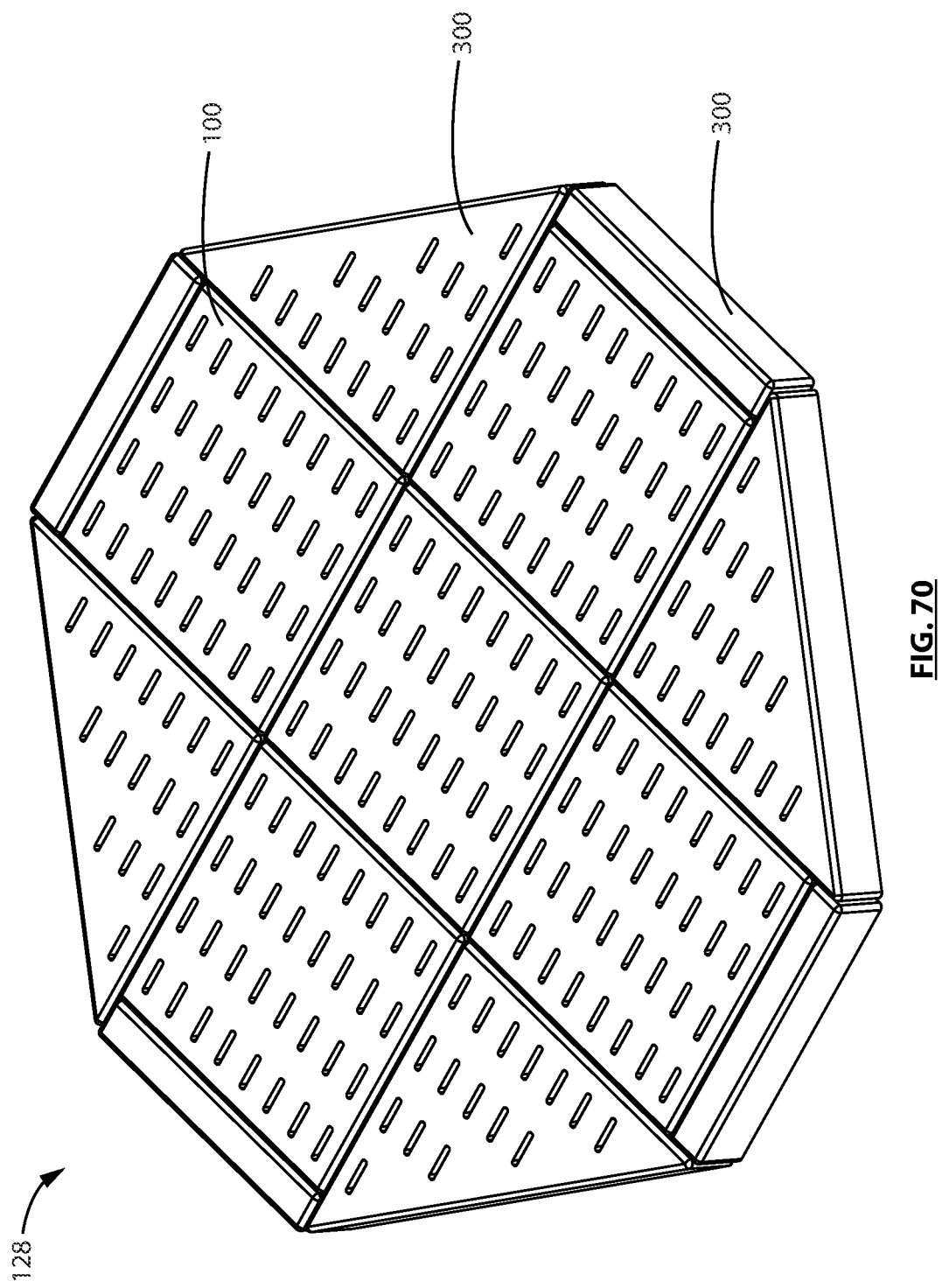
FIG. 70 is a top perspective view of another embodiment of an array of a plurality of interior blocks and a plurality of edge paving blocks.
Figure 72B:
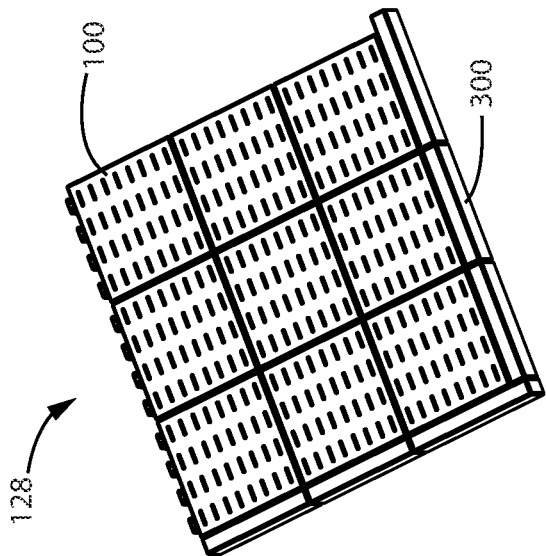
Figure 72A:
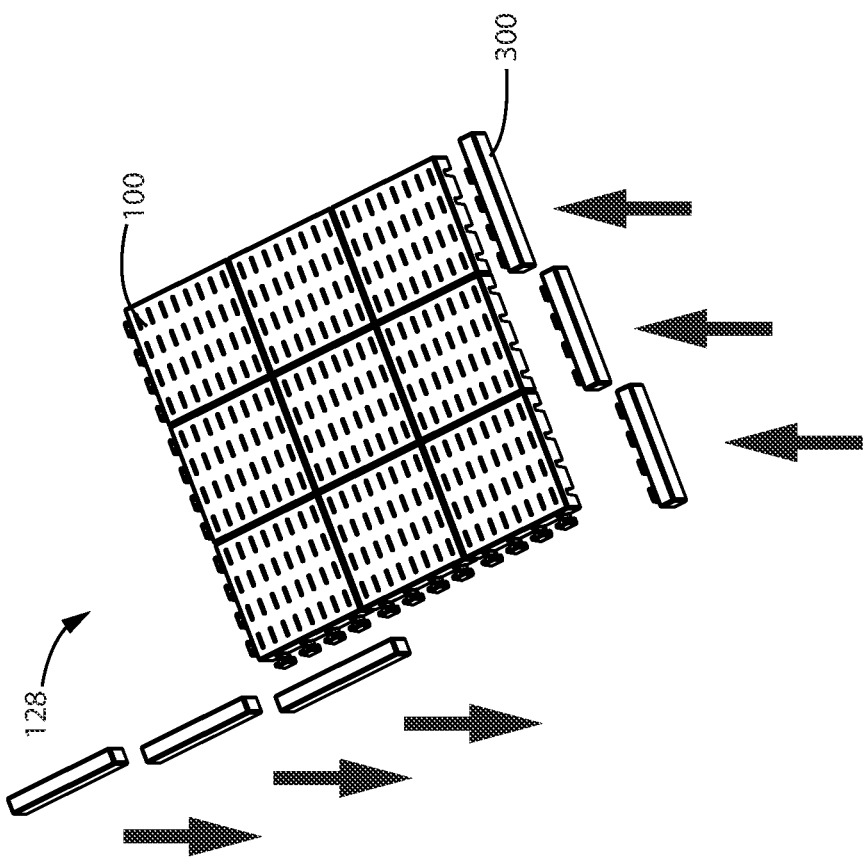
Figure 73B:
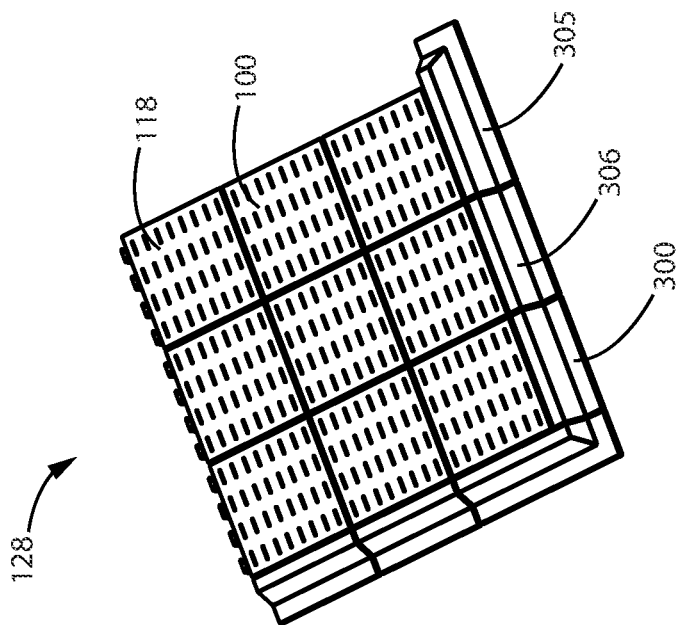
FIGS. 73A-73B are top perspective views of another embodiment of an array of a plurality of interior blocks and a plurality of edge paving blocks in various states of assembly.
Figure 73A:
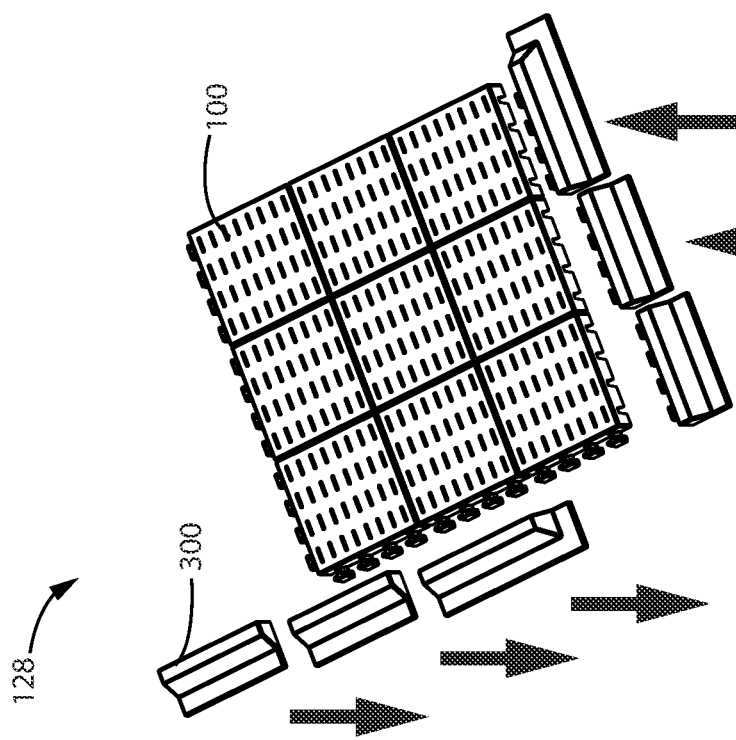
Figure 74B:
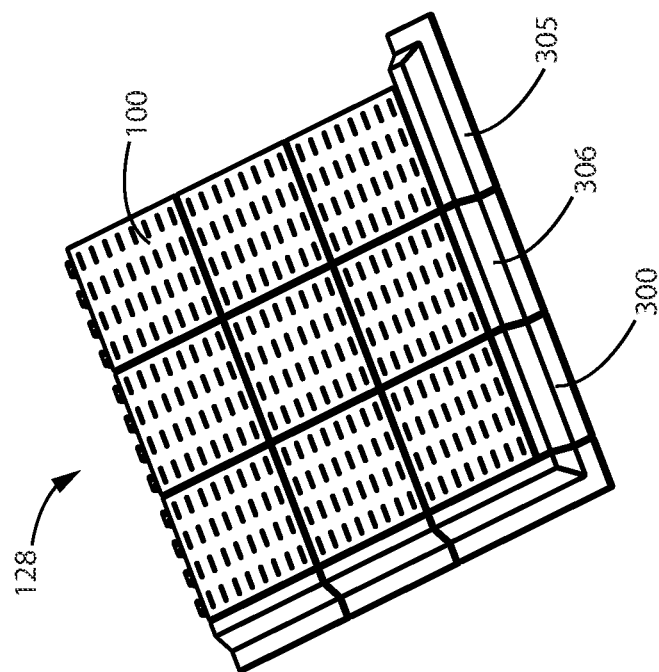
FIGS. 74A-74B are top perspective views of another embodiment of an array of a plurality of interior blocks and a plurality of edge paving blocks in various states of assembly.
Figure 74A:
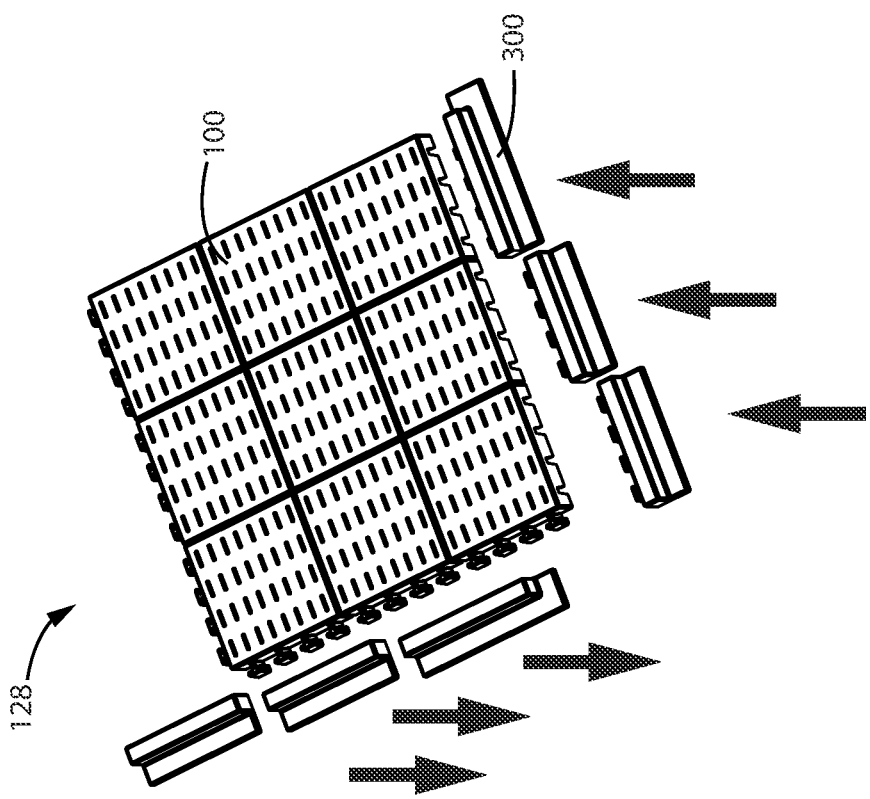

It will be appreciated that, depending upon the design of the surface created by the blocks 100, 300, one or more of the edge paving blocks 300 may have a walking surface 118 with increased surface area, as exemplified in FIG. 67. The larger walking surface 118 may be used to provide additional design flexibility for an array 118. As exemplified, the edge paving block 300 is triangular in shape. It will be appreciated that the edge paving blocks 300 may be any shape, including, but not limited to, triangular, rectangular, arcuate, hexagonal, etc. In some embodiments, the edge paving blocks 300 with increased walking surface 118 may include the longer inner side 302, as exemplified in FIGS. 67-70.

Figure 62:
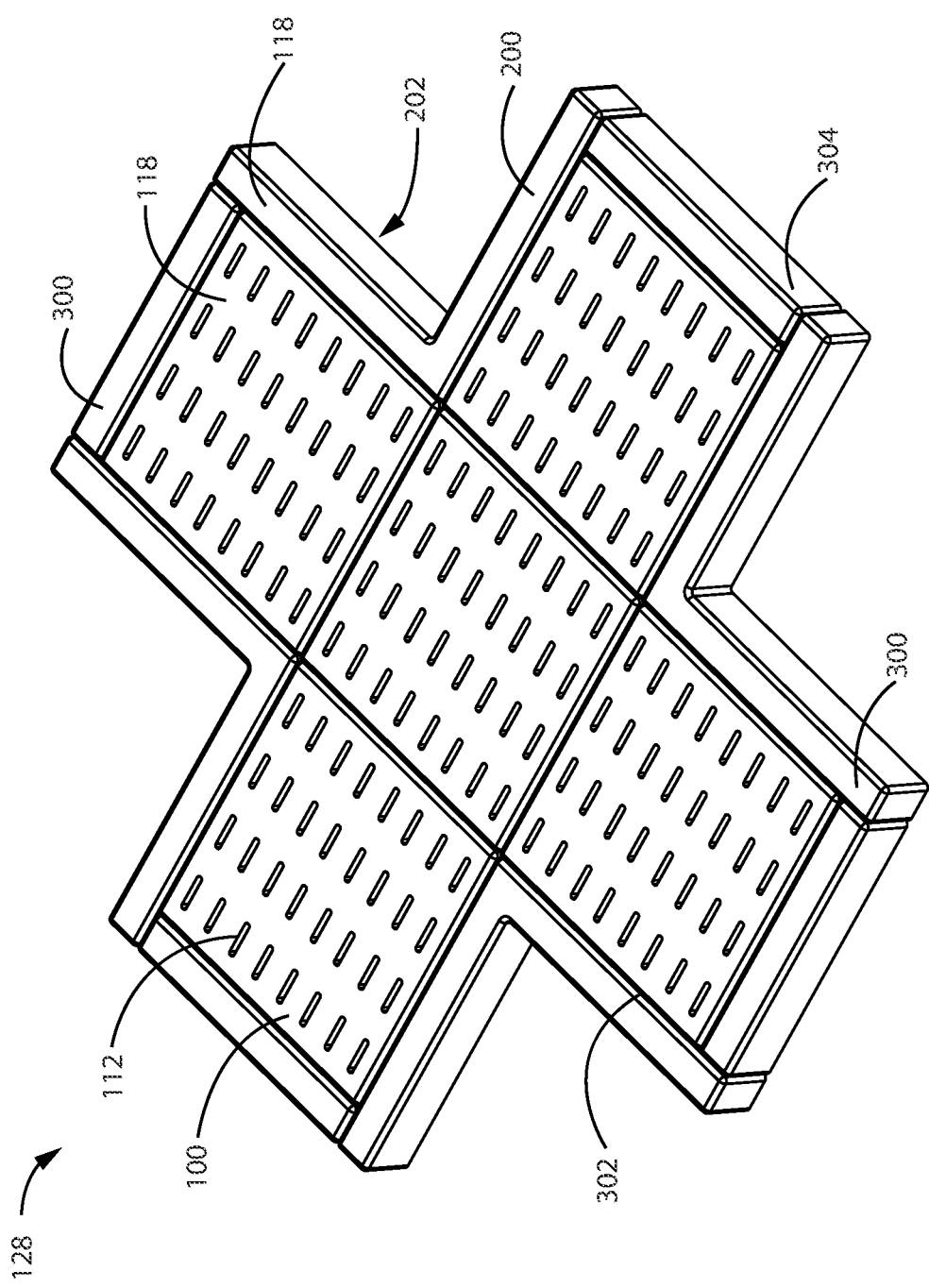
FIG. 62 is a top perspective view of an example embodiment of an array of a plurality of interior paving blocks and a plurality of edge paving blocks.

Referring to FIGS. 63-66, shown therein is an exemplary assembly of interior paving blocks 100 and edge paving blocks 300 to form the array 128 shown in FIG. 62. As exemplified in FIGS. 63A-63C, a first interior paving block 100 is positioned on the ground. Next, the second engagement members 126 of the edge paving blocks 300 are inter-engaged with the first engagement members 124 of the interior paving block 100. As exemplified in FIG. 63B, the female second engagement members 126 of the edge paving blocks 100 are inter-engaged with the first engagement members 124 of the interior paving block 100 in a downward direction, while the male second engagement members 126 are inter-engaged in an upward direction.

Figure 64B:
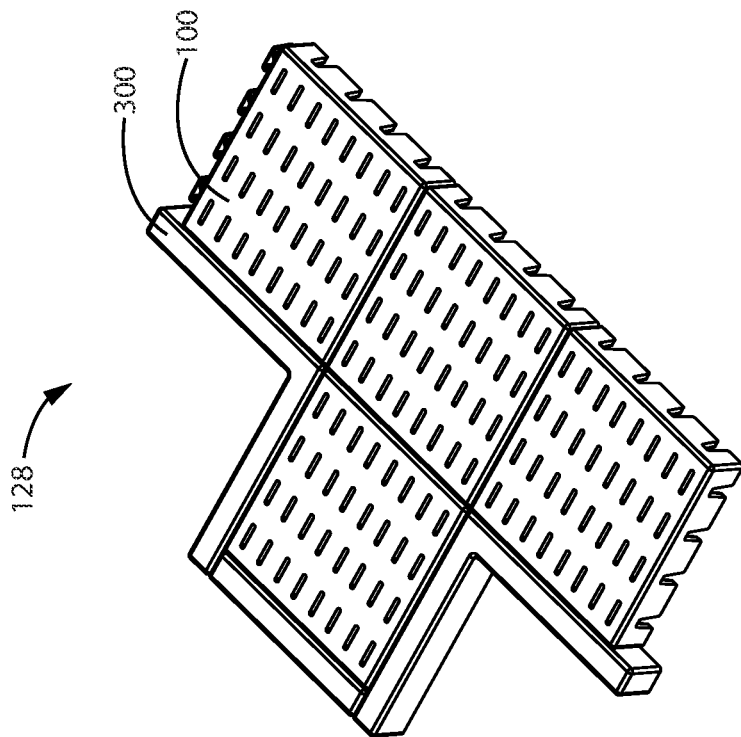
FIGS. 64A-64B show the array of FIG. 62 in further various states of assembly.
Figure 64A:
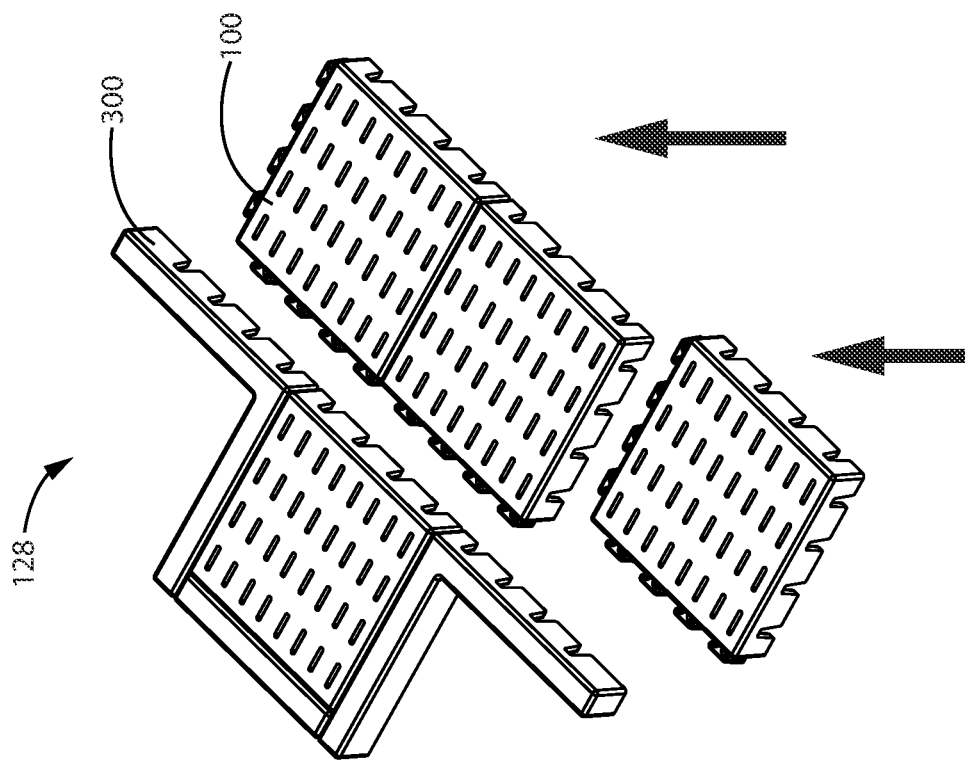

Next, as exemplified in FIGS. 64A and 64B, additional interior paving blocks 100 are inter-engaged with both the first interior paving block 100 and the edge paving blocks 300.

Then, as exemplified in FIGS. 65A-65D, the remaining interior paving block 100 is inter-engaged with the additional interior paving blocks 100 and the edge paving blocks 300 are inter-engaged with the interior paving blocks 100.

Finally, as exemplified in FIGS. 66A-66C, the last edge paving members 300 are inter-engaged with the interior paving blocks 100 to provide a flush and/or finished outer edge of the array 128.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A kit comprising:
   (a) a plurality of interior paving blocks, each interior paving block having an upper side having a walking surface, a lower side and an outer frame member extending between the upper and lower sides, the outer frame member extending around a perimeter of the paving block, the outer frame member having first engagement members; and,
   (b) a plurality of edge paving blocks, each edge paving block having an upper side having a walking surface, a lower side, an inner side and an opposed outer side, each of the inner and outer side extending between the upper and lower sides of the edge paving block, the outer side has a smooth surface and the inner side comprises mating second engagement members whereby the first engagement members of one of the interior paving blocks is inter-engageable with the mating second engagement members of one of the edge paving blocks
      wherein the inner side of at least one edge paving block of the plurality of edge paving blocks has a first portion and a second portion, each of the first and second portions having mating second engagement members wherein the second portion extends at an angle to the first portion.

2. The kit of claim 1 wherein the mating second engagement members of one of the edge paving blocks inter-engages in a downward direction when one of the interior paving blocks is positioned on the ground.

3. The kit of claim 2 wherein the first engagement members comprise male engagement members and the mating second engagement members comprise female engagement members.

4. The kit of claim 3 wherein the mating second engagement members comprise generally V-shaped recesses.

5. The kit of claim 1 wherein the outer frame of one of the interior paving blocks comprises a side face that inter-engages with the inner side of one of the edge paving blocks and the inner side of one of the edge paving blocks is longer than the side face.

6. The kit of claim 1 wherein the first engagement members comprise male engagement members and the mating second engagement members comprise female engagement members.

7. The kit of claim 1 wherein the first engagement members comprise female engagement members and the mating second engagement members comprise male engagement members.

8. The kit of claim 7 wherein the mating second engagement members comprise generally V-shaped recesses.

9. A kit comprising:
   (a) a plurality of interior paving blocks, each interior paving block having an upper side having a walking surface, a lower side and an outer frame member extending between the upper and lower sides, the outer frame member extending around a perimeter of the paving block, the outer frame member having first engagement members; and,
   (b) a plurality of edge paving blocks, each edge paving block having an upper side having a walking surface, a lower side, an inner side and an opposed outer side, each of the inner and outer side extending between the upper and lower sides of the edge paving block, the inner side comprises mating second engagement members whereby the first engagement members of one of the interior paving blocks is inter-engageable with the mating second engagement members of one of the edge paving blocks, wherein the outer frame of one of one of the interior paving blocks comprises a side face that inter-engages with the inner side of one of the edge paving blocks and the inner side of one of the edge paving blocks is longer than the side face and wherein the inner side of at least one edge paving block of the plurality of edge paying blocks extends non-linearly.

10. The kit of claim 9 wherein the mating second engagement members of one of the edge paving blocks inter-engages in a downward direction when one of the interior paving blocks is positioned on the ground.

11. The kit of claim 10 wherein the first engagement members comprise male engagement members and the mating second engagement members comprise female engagement members.

12. The kit of claim 11 wherein the mating second engagement members comprise generally V-shaped recesses.

13. The kit of claim 9 wherein the first engagement members comprise male engagement members and the mating second engagement members comprise female engagement members.

14. The kit of claim 9 wherein the first engagement members comprise female engagement members and the mating second engagement members comprise male engagement members.

15. The kit of claim 14 wherein the mating second engagement members comprise generally V-shaped recesses.

16. The kit of claim 1 wherein the second portion extends at about a 90° angle to the first portion.

17. The kit of claim 9 wherein the inner side of the at least one edge paving block of the plurality of edge paving blocks that extends non-linearly has a first portion that extends in a non-linear direction to a second portion of the inner surface and the mating second engagement members are provided on the first and second portions.

18. The kit of claim 17 wherein the second portion extends at about a 90° angle to the first portion.

* * * * *

UNITED STATES PATENT AND TRADEMARK OFFICE
CERTIFICATE OF CORRECTION

PATENT NO. : 11,499,272 B2
APPLICATION NO. : 16/987761
DATED : November 15, 2022
INVENTOR(S) : Wayne Ernest Conrad, Nina Conrad and Dave Petersen It is certified that error appears in the above-identified patent and that said Letters Patent is hereby corrected as shown below:

In the Claims

In Claim 9, Column 27, Line 5, the term "of one of one of" should read --- of one of ---

Signed and Sealed this
Seventh Day of February, 2023

Katherine Kelly Vidal
*Director of the United States Patent and Trademark Office*